US012046434B2

(12) United States Patent
Yoo et al.

(10) Patent No.: US 12,046,434 B2
(45) Date of Patent: Jul. 23, 2024

(54) ARC PATH GENERATION UNIT AND DIRECT CURRENT RELAY INCLUDING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/013,483

(22) PCT Filed: Jun. 21, 2021

(86) PCT No.: PCT/KR2021/007740
§ 371 (c)(1),
(2) Date: Dec. 28, 2022

(87) PCT Pub. No.: WO2022/005080
PCT Pub. Date: Jan. 6, 2022

(65) Prior Publication Data

US 2023/0290598 A1 Sep. 14, 2023

(30) Foreign Application Priority Data

Jun. 29, 2020 (KR) ........................ 10-2020-0079611
Jun. 29, 2020 (KR) ........................ 10-2020-0079615

(51) Int. Cl.
*H01H 50/38* (2006.01)
*H01H 9/44* (2006.01)
*H01H 50/60* (2006.01)

(52) U.S. Cl.
CPC ............ *H01H 50/38* (2013.01); *H01H 9/443* (2013.01); *H01H 50/60* (2013.01)

(58) Field of Classification Search
None
See application file for complete search history.

(56) References Cited

U.S. PATENT DOCUMENTS

2011/0240603 A1* 10/2011 Hoffmann .............. H01H 9/443 218/26
2012/0175345 A1* 7/2012 Tachikawa ............. H01H 9/443 218/26
(Continued)

FOREIGN PATENT DOCUMENTS

JP 2012146634 A 8/2012
JP 2014086206 A 5/2014
(Continued)

OTHER PUBLICATIONS

International Search Report for related International Application No. PCT/KR2021/007740; action dated Jan. 6, 2022; (5 pages).
(Continued)

*Primary Examiner* — Bernard Rojas
(74) *Attorney, Agent, or Firm* — K&L Gates LLP

(57) ABSTRACT

Disclosed are an arc path generation unit and a direct current relay including the same. An arc path generation unit according to various exemplary embodiments of the present disclosure comprises a Halbach array or a magnet part which forms a magnetic field in a space part for accommodating fixed contacts. The formed magnetic field forms an electromagnetic force, together with the current flowing a direct current relay. The formed electromagnetic force may induce generated arcs. The electromagnetic force formed near each fixed contact is formed in a direction going away from each fixed contact. Therefore, the generated arcs do not meet each other, and thus can be effectively suppressed and discharged.

31 Claims, 24 Drawing Sheets

(56) References Cited

U.S. PATENT DOCUMENTS

| | | | | |
|---|---|---|---|---|
| 2012/0181860 | A1* | 7/2012 | Hsu | H01H 9/443 218/24 |
| 2015/0042424 | A1 | 2/2015 | Maruyama et al. | |
| 2016/0133404 | A1* | 5/2016 | Zhong | H01H 50/546 335/201 |

FOREIGN PATENT DOCUMENTS

| | | | |
|---|---|---|---|
| JP | 2019036431 | A | 3/2019 |
| KR | 102009875 | B1 | 8/2019 |

OTHER PUBLICATIONS

Written Opinion for related International Application No. PCT/KR2021/007740; action dated Jan. 6, 2022; (7 pages).
Office Action for related Korean Application No. 10-2020-0076915; action dated Mar. 8, 2022; (4 pages).
Office Action for related Korean Application No. 10-2020-0076911; action dated Mar. 8, 2022; (5 pages).

* cited by examiner (a)

(b)

(a)

(b)

(a)

(b)

(a)

(b)

(a)

(b)

ARC PATH GENERATION UNIT AND DIRECT CURRENT RELAY INCLUDING SAME

CROSS-REFERENCE TO RELATED APPLICATION

The present application is a National Stage of International Application No. PCT/KR2021/007740 filed on Jun. 21, 2021, which claims priority to and the benefit of Korean Utility Model Application No. 10-2020-0079611, filed on Jun. 29, 2020 and Korean Utility Model Application No. 10-2020-0079615, filed on Jun. 29, 2020, the disclosures of which is incorporated herein by reference in its entirety.

FIELD

The present disclosure relates to an arc path generation unit and a direct current relay including the same, and more specifically to an arc path generation unit having a structure capable of effectively inducing a generated arc to the outside and a direct current relay including the same.

BACKGROUND

A direct current (DC) relay is a device that transmits a mechanical drive or current signal by using the principle of an electromagnet. The direct current relay is also called a magnetic switch and is generally classified as an electrical circuit switch.

The direct current relay includes a fixed contact and a movable contact. The fixed contact is electrically connected to an external power source and load. The fixed contact and the movable contact may be in contact with each other or may be spaced apart from each other.

By the contact and separation of the fixed contact and the movable contact, the conduction through the DC relay is allowed or blocked. The movement is achieved by a drive unit that applies a drive force to the movable contact.

When the fixed contact and the movable contact are spaced apart, an arc is generated between the fixed contact and the movable contact. An arc is a flow of high-pressure, high-temperature current. Accordingly, the generated arc must be rapidly discharged from the DC relay through a preset path.

The discharge path of arc is formed by a magnet provided in the DC relay. The magnet forms a magnetic field in the space where the fixed contact and the movable contact are in contact. The discharge path of arc may be formed by the formed magnetic field and the electromagnetic force generated by the flow of current.

Referring to FIG. 1, a space in which a fixed contact 1100 and a movable contact 1200 provided in a DC relay 1000 according to prior art are in contact with each other is illustrated. As described above, a permanent magnet 1300 is provided in the space.

The permanent magnet 1300 includes a first permanent magnet 1310 positioned on the upper side and a second permanent magnet 1320 positioned on the lower side.

A plurality of first permanent magnets 1310 are provided, and the polarities of each surface facing the second permanent magnet 1320 are magnetized with different polarities. The lower side of the first permanent magnet 1310 located on the left side of FIG. 1 is magnetized to the N pole, and the second permanent magnet 1310 located on the right side of FIG. 1 is magnetized to the S pole.

In addition, a plurality of second permanent magnets 1320 are also provided, and the polarities of each surface facing the first permanent magnet 1310 are magnetized with different polarities. The upper side of the second permanent magnet 1320 positioned on the left side of FIG. 1 is magnetized to the S pole, and the upper side of the second permanent magnet 1320 positioned on the right side of FIG. 1 is magnetized to the N pole.

(a) of FIG. 1 illustrates a state in which current flows in through the fixed contact 1100 on the left side and flows out through the fixed contact 1100 on the right side. According to Fleming's Left-Hand Rule, the electromagnetic force is formed like a hatched arrow.

Specifically, in the case of the fixed contact 1100 located on the left side, the electromagnetic force is formed toward the outside. Accordingly, the arc generated at the position may be discharged to the outside.

However, in the case of the fixed contact 1100 located on the right side, the electromagnetic force is formed toward the inner side, that is, the central portion of the movable contact 1200. Accordingly, the arc generated at the corresponding position is not immediately discharged to the outside.

In addition, (b) of FIG. 1 illustrates a state in which current flows in through the fixed contact 1100 on the right side and flows out through the fixed contact 1100 on the left side. According to Fleming's Left-Hand Rule, the electromagnetic force is formed with a hatched arrow.

Specifically, in the case of the fixed contact 1100 located on the right side, the electromagnetic force is formed toward the outside. Accordingly, the arc generated at the position may be discharged to the outside.

However, in the case of the fixed contact 1100 located on the left side, the electromagnetic force is formed toward the inside, that is, the central portion of the movable contact 1200. Accordingly, the arc generated at the position is not immediately discharged to the outside.

In the central portion of the DC relay 1000, that is, in the space between each fixed contact 1100, various members for driving the movable contact 1200 in the vertical direction are provided. For example, a shaft, a spring member inserted through the shaft and the like are provided at the position.

Therefore, when the arc generated as shown in FIG. 1 is moved toward the central portion, and if the arc moved to the center (C) cannot be moved to the outside immediately, there is a risk that various members provided at the position may be damaged by the energy of the arc.

In addition, as illustrated in FIG. 1, the direction of the electromagnetic force formed inside the DC relay 1000 according to prior art depends on the direction of the current flowing through the fixed contact 1200. That is, the position of the electromagnetic force formed in the inward direction among the electromagnetic forces generated at each fixed contact point 1100 is different depending on the direction of the current.

In other words, the user must consider the direction of current whenever using a DC relay. This may cause inconvenience to the use of the DC relay. In addition, regardless of the intention of the user, a situation in which the direction of the current applied to the DC relay is changed due to inexperienced operation or the like cannot be excluded.

In this case, the members provided in the central portion of the DC relay may be damaged by the generated arc. Accordingly, the durability life of the DC relay is reduced, and there is a risk that safety accidents may occur.

Korean Registered Patent No. 10-1696952 discloses a DC relay. Specifically, it discloses a DC relay having a structure capable of preventing the movement of a movable contact by using a plurality of permanent magnets.

However, the DC relay having the above-described structure can prevent the movement of a movable contact by using a plurality of permanent magnets, but there is a limitation in that there is no consideration of a method for controlling the direction of the arc discharge path.

Korean Registered Patent No. 10-1216824 discloses a DC relay. Specifically, it discloses a DC relay having a structure capable of preventing arbitrary separation between a movable contact and a fixed contact by using a damping magnet.

However, the DC relay having the above-described structure proposes only a method for maintaining the contact state between the movable contact and the fixed contact. That is, there is a limitation in that it cannot propose a method for forming an arc discharge path generated when the movable contact and the fixed contact are spaced apart.

(Patent Document 1) Korean Registered Patent No. 10-1696952 (Jan. 16, 2017)

(Patent Document 2) Korean Registered Patent No. 10-1216824 (Dec. 28, 2012)

SUMMARY

An object of the present disclosure is to provide an arc path generation unit having a structure capable of solving the above-described problems, and a DC relay including the same.

First, an object of the present disclosure is to provide an arc path generation unit having a structure capable of rapidly extinguishing and discharging an arc generated as current is cut off, and a DC relay including the same.

In addition, an object of the present disclosure is to provide an arc path generation unit having a structure capable of strengthening the magnitude of the force for inducing the generated arc, and a DC relay including the same.

In addition, an object of the present disclosure is to provide an arc path generation unit having a structure capable of preventing damage to components for energization by the generated arc, and a DC relay including the same.

In addition, an object of the present disclosure is to provide an arc path generation unit having a structure in which arcs generated at a plurality of positions can proceed without meeting each other, and a DC relay including the same.

In addition, an object of the present disclosure is to provide an arc path generation unit having a structure capable of achieving the above-described objects without excessive design changes, and a DC relay including the same.

In order to achieve the above objects, the present disclosure provides an arc path generation unit, including a magnetic frame having a space part in which a plurality of fixed contacts and a movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array includes a plurality of blocks which are arranged side by side in the one direction and formed of a magnetic material, and is provided in plurality, and a plurality of Halbach arrays are positioned adjacent to any one or more surfaces of the first surface and the second surface, and wherein the magnet part extends in the other direction and is provided in plurality, and a plurality of magnet parts are disposed adjacent to any one or more surfaces of the third surface and the fourth surface.

In addition, each surface on which the plurality of Halbach arrays of the arc path generation unit face each other may be magnetized with the same polarity, and wherein each surface on which the plurality of magnet parts face each other may be magnetized with a polarity different from the polarity.

In addition, the Halbach array of the arc path generation unit may include a first Halbach array which is positioned adjacent to any one surface of the first surface and the second surface; and a second Halbach array which is positioned adjacent to the other one surface of the first surface and the second surface, and wherein the magnet part may include a first magnet part which is positioned adjacent to any one surface of the third surface and the fourth surface; and a second magnet part which is positioned adjacent to the other one surface of the third surface and the fourth surface.

In addition, the first Halbach array and the second Halbach array of the arc path generation unit may respectively include a first block which is positioned to be biased toward the any one surface of the third surface and the fourth surface; a third block which is positioned to be biased toward the other one surface of the third surface and the fourth surface; and a second block which is positioned between the first block and the third block.

In addition, each surface on which the second block of the first Halbach array of the arc path generation unit and the second block of the second Halbach array face each other may be magnetized with the same polarity, and wherein each surface on which the first magnet part and the second magnet part face each other may be magnetized with a polarity different from the polarity.

In addition, the Halbach array of the arc path generation unit may include a first block which is positioned to be biased toward any one surface of the third surface and the fourth surface; a fifth block which is positioned to be biased toward the other one surface of the third surface and the fourth surface; a third block which is positioned between the first block and the fifth block; a second block which is positioned between the first block and the third block; and a fourth block which is positioned between the third block and the fifth block.

In addition, each surface on which the third block of the first Halbach array of the arc path generation unit and the third block of the second Halbach array face each other may be magnetized with the same polarity, and wherein each surface on which the first block of the first Halbach array and the first block of the second Halbach array face each other, each surface on which the fifth block of the first Halbach array and the fifth block of the second Halbach array face each other and each surface on which the first magnet part and the second magnet part face each other may be magnetized with a polarity different from the polarity.

In addition, the present disclosure provides an arc path generation unit, including a magnetic frame having a space part in which a plurality of fixed contacts and a movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array includes a plurality of blocks which are arranged side by side in the other direction and formed of a magnetic material, and is provided in plurality, and a plurality of Halbach arrays are positioned adjacent to any one or more surfaces of the third surface and the fourth surface, and wherein the magnet part extends in the one direction and is provided in plurality, and a plurality of magnet parts are disposed adjacent to any one or more surfaces of the first surface and the second surface.

In addition, each surface on which the plurality of Halbach arrays of the arc path generation unit face each other may be magnetized with the same polarity, and wherein each surface on which the plurality of magnet parts face each other may be magnetized with a polarity different from the polarity.

In addition, the Halbach array of the arc path generation unit may include a first Halbach array which is positioned adjacent to any one surface of the third surface and the fourth surface; and a second Halbach array which is positioned adjacent to the other one surface of the third surface and the fourth surface, and wherein the magnet part includes a first magnet part which is positioned adjacent to any one surface of the first surface and the second surface; and a second magnet part which is positioned adjacent to the other one surface of the first surface and the second surface.

In addition, the first Halbach array and the second Halbach array of the arc path generation unit may respectively include a first block which is positioned to be biased toward the any one surface of the first surface and the second surface; a third block which is positioned to be biased toward the other one surface of the first surface and the second surface; and a second block which is positioned between the first block and the third block.

In addition, each surface on which the second block of the first Halbach array of the arc path generation unit and the second block of the second Halbach array face each other may be magnetized with the same polarity, and wherein each surface on which the first magnet part and the second magnet part face each other may be magnetized with a polarity different from the polarity.

In addition, the present disclosure provides a direct current relay, including a plurality of fixed contacts which are positioned to be spaced apart in one direction; a movable contact which is in contact with or spaced apart from the fixed contact; a magnetic frame having a space part in which the plurality of fixed contacts and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array includes a plurality of blocks which are arranged side by side in the one direction and formed of a magnetic material, and is provided in plurality, and a plurality of Halbach arrays are positioned adjacent to any one or more surfaces of the first surface and the second surface, and wherein the magnet part extends in the one direction and is provided in plurality, and a plurality of magnet parts are disposed adjacent to any one or more surfaces of the third surface and the fourth surface.

In addition, each surface on which the plurality of Halbach arrays of the direct current relay face each other may be magnetized with the same polarity, and wherein each surface on which the plurality of magnet parts face each other may be magnetized with a polarity different from the polarity.

In addition, the present disclosure provides a direct current relay, including a plurality of fixed contacts which are positioned to be spaced apart in one direction; a movable contact which is in contact with or spaced apart from the fixed contact; a magnetic frame having a space part in which the plurality of fixed contacts and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array includes a plurality of blocks which are arranged side by side in the other direction and formed of a magnetic material, and is provided in plurality, and a plurality of Halbach arrays are positioned adjacent to any one or more surfaces of the third surface and the fourth surface, and wherein the magnet part extends in the one direction and is provided in plurality, and a plurality of magnet parts are disposed adjacent to any one or more surfaces of the first surface and the second surface.

In addition, each surface on which the plurality of Halbach arrays of the direct current relay face each other may be magnetized with the same polarity, and wherein each surface on which the plurality of magnet parts face each other may be magnetized with a polarity different from the polarity.

In addition, the present disclosure provides an arc path generation unit, including a magnetic frame having a space part in which a fixed contact and a movable contact are accommodated; and a Halbach array which is positioned in the space part of the magnetic frame to form a magnetic field in the space part, wherein the space part has a length in one direction formed to be longer than a length in the other direction, wherein the magnetic frame includes a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the fixed contact is provided in plurality, and a plurality of fixed contacts are disposed to be spaced apart from each other in the one direction, and wherein the Halbach array includes a plurality of blocks which are arranged side by side in the one direction and formed of a magnetic material, are positioned adjacent to any one or more surfaces of the first surface and the second surface, and are disposed to overlap the plurality of fixed contacts along the other direction.

In addition, the Halbach array of the arc path generation unit may include a first Halbach array which is disposed adjacent to any one surface of the first surface and the second surface; and a second Halbach array which is disposed adjacent to the other one surface of the first surface and the second surface to face the first Halbach array with the space part therebetween.

In addition, a surface of the surfaces of the first Halbach array of the arc path generation unit facing the second Halbach array and a surface of the surfaces of the second Halbach array facing the first Halbach array may be magnetized with different polarities from each other.

In addition, the first Halbach array of the arc path generation unit may include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and arranged side by side in order in a direction from the first block to the fifth block, and wherein the second Halbach array may include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and arranged side by side in order in a direction from the first block to the fifth block.

Further, in the first Halbach array of the arc path generation unit, a surface of the surfaces of the first block facing the second block and a surface of the surfaces of the third block facing the second block, and a surface of the surfaces of the second block facing the second Halbach array may be magnetized with the same polarity, and a surface of the surfaces of the third block facing the fourth block and a surface of the surfaces of the fifth block facing the fourth block, and a surface of the surfaces of the fourth block facing the second Halbach array may be magnetized with a polarity different from the polarity, and wherein in the second Halbach array, a surface of the surfaces of the first block facing the second block and a surface of the surfaces of the third block facing the second block, and a surface of the surfaces of the second block facing the second Halbach array may be magnetized with the different polarity, and a surface of the surfaces of the third block facing the fourth block and a surface of the surfaces of the fifth block facing the fourth block, and a surface of the surfaces of the fourth block facing the second Halbach array may be magnetized with the polarity.

In addition, the arc path generation unit may further include a first magnet part which is disposed adjacent to the other one surface of the first surface and the second surface, so as to face the Halbach array with the space part therebetween, and is disposed to be biased toward any one surface of the third surface and the fourth surface; and a second magnet part which is disposed adjacent to the other one surface of the first surface and the second surface, so as to face the Halbach array with the space part therebetween, and is disposed to be biased toward the other one surface of the third surface and the fourth surface.

In addition, a surface of the surfaces of the Halbach array of the arc path generation unit facing the first magnet part and a surface of the surfaces of the first magnet part facing the Halbach array may be magnetized with different polarities from each other, wherein a surface of the surfaces of the Halbach array facing the second magnet part and a surface of the surfaces of the second magnet part facing the Halbach array may be magnetized with different polarities from each other, and wherein a surface of the surfaces of the Halbach array facing the first magnet part and a surface of the surfaces of the second magnet part facing the Halbach array may be magnetized with the same polarity.

In addition, the Halbach array of the arc path generation unit may include a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and arranged side by side in order in a direction from the first block to the fifth block, wherein the second block is disposed to face the first magnet part, and wherein the fourth block is disposed to face the second magnet part.

In addition, a surface of the surfaces of the second block of the arc path generation unit facing the first magnet part and a surface of the surfaces of the first magnet part facing the second block may be magnetized with different polarities from each other, wherein a surface of the surfaces of the fourth block facing the second magnet part and a surface of the surfaces of the second magnet part facing the fourth block may be magnetized with different polarities from each other, and wherein a surface of the surfaces of the second block facing the first magnet part and a surface of the surfaces of the fourth block facing the second magnet part may be magnetized with different polarities from each other.

In addition, the Halbach array of the arc path generation unit may include a first Halbach array which is disposed adjacent to any one surface of the first surface and the second surface; and a second Halbach array which is disposed adjacent to the other one surface of the first surface and the second surface, so as to face the first Halbach array with the space part therebetween, wherein the number of blocks forming a magnetic field in the one direction among the plurality of blocks of the first Halbach array is greater than the number of blocks forming a magnetic field in the other direction.

In addition, a surface of the surfaces of the first Halbach array of the arc path generation unit facing the second Halbach array and a surface of the surfaces of the second Halbach array facing the first Halbach array may be magnetized with different polarities from each other.

In addition, the first Halbach array of the arc path generation unit includes a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and arranged side by side in order in a direction from the first block to the fifth block, and wherein the second Halbach array includes a first block which is positioned to be biased toward any one surface of the third surface and the fourth surface; a fifth block which is positioned to be biased toward the other one surface of the third surface and the fourth surface; and a second block, a third block and a fourth block which are positioned between the first block and the fifth block and arranged side by side in order in a direction from the first block to the fifth block.

Further, in the first Halbach array of the arc path generation unit, a surface of the surfaces of the first block facing the second Halbach array, a surface of the surfaces of the second block facing the first block, a surface of the surfaces of the fourth block facing the fifth block and a surface of the surfaces of the fifth block facing the second Halbach array may be magnetized with the same polarity, and a surface of the surfaces of the second block facing the third block, a surface of the surfaces of the fourth block facing the third block and a surface of the surfaces of the third block facing the second Halbach array may be magnetized with a polarity different from the polarity, and wherein in the second Halbach array, a surface of the surfaces of the first block facing the second Halbach array, a surface of the surfaces of the second block facing the first block, a surface of the surfaces of the fourth block facing the fifth block and a surface of the surfaces of the fifth block facing the second Halbach array may be magnetized with the different polarity, and a surface of the surfaces of the second block facing the third block, a surface of the surfaces of the fourth block facing the third block and a surface of the surfaces of the third block facing the second Halbach array may be magnetized with the polarity.

In addition, the present disclosure provides a direct current relay, including a plurality of fixed contacts which are positioned to be spaced apart in one direction; a movable contact which is in contact with or spaced apart from the fixed contact; a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame may include a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array includes a plurality of blocks which are arranged side by side in the one direction and formed of a magnetic material, is positioned adjacent to any one or more surfaces of the first surface and the second surface, and is disposed to overlap the plurality of fixed contacts along the other direction.

In addition, the Halbach array of the direct current relay may include a first Halbach array which is disposed adjacent to any one surface of the first surface and the second surface; and a second Halbach array which is disposed adjacent to the other one surface of the first surface and the second surface to face the first Halbach array with the space part therebetween, wherein a surface of the surfaces of the first Halbach array facing the second Halbach array and a surface of the surfaces of the second Halbach array facing the first Halbach array are magnetized with different polarities from each other.

In addition, the direct current relay may further include a first magnet part which is disposed adjacent to the other one surface of the first surface and the second surface, so as to face the Halbach array with the space part therebetween, and is disposed to be biased toward any one surface of the third surface and the fourth surface; and a second magnet part which is disposed adjacent to the other one surface of the first surface and the second surface, so as to face the Halbach array with the space part therebetween, and is disposed to be biased toward the other one surface of the third surface and the fourth surface, wherein a surface of the surfaces of the Halbach array facing the first magnet part and a surface of the surfaces of the first magnet part facing the Halbach array are magnetized with different polarities from each other, wherein a surface of the surfaces of the Halbach array facing the second magnet part and a surface of the surfaces of the second magnet part facing the Halbach array are magnetized with different polarities from each other, and wherein a surface of the surfaces of the Halbach array facing the first magnet part and a surface of the surfaces of the second magnet part facing the Halbach array are magnetized with the same polarity.

In addition, the Halbach array of the direct current relay may further include a first Halbach array which is disposed adjacent to any one surface of the first surface and the second surface; and a second Halbach array which is disposed adjacent to the other one surface of the first surface and the second surface to face the first Halbach array with the space part therebetween, wherein the number of blocks forming a magnetic field in the one direction among the plurality of blocks of the first Halbach array is greater than the number of blocks forming a magnetic field in the other direction, and wherein a surface of the surfaces of the first Halbach array facing the second Halbach array and a surface of the surfaces of the second Halbach array facing the first Halbach array are magnetized with different polarities from each other.

Advantageous Effects

According to an exemplary embodiment of the present disclosure, the following effects can be achieved.

First, the arc path generation unit includes a Halbach array and a magnet part. The Halbach array and the magnet part form a magnetic field inside the arc path generation unit, respectively. The formed magnetic field forms an electromagnetic force together with the current passed through the fixed contact and the movable contact which are accommodated in the arc path generation unit.

In this case, the generated arc is formed in a direction away from each fixed contact. The arc generated by the fixed contact and the movable contact being spaced apart may be induced by the electromagnetic force.

Accordingly, the generated arc can be quickly extinguished and discharged to the outside of the arc path generation unit and the DC relay.

In addition, the arc path generation unit includes a Halbach array. The Halbach array includes a plurality of magnetic materials that are arranged side by side in one direction. The plurality of magnetic materials may further enhance the strength of the magnetic field on either side of both sides of the one direction and the other direction.

In this case, in the Halbach array, the one side, that is, the direction in which the strength of the magnetic field is strengthened, is disposed toward the space part of the arc path generation unit. That is, by the Halbach array, the strength of the magnetic field formed inside the space may be strengthened.

Accordingly, the strength of the electromagnetic force that depends on the strength of the magnetic field may also be strengthened. As a result, the intensity of the electromagnetic force that induces the generated arc is strengthened, and thus, the generated arc can be effectively extinguished and discharged.

In addition, the direction of the electromagnetic force formed by the magnetic field formed by the Halbach array and the magnet part and the current passed through the fixed contact and the movable contact is formed in a direction away from the center.

Furthermore, as described above, since the strength of the magnetic field and electromagnetic force is strengthened by the Halbach array and the magnet part, the generated arc can be extinguished and moved quickly in a direction away from the center.

Accordingly, it is possible to prevent damage to various components provided near the center for the operation of the DC relay.

Further, in various exemplary embodiments, a plurality of fixed contacts may be provided. The Halbach array or magnet part provided in the arc path generation unit forms magnetic fields in different directions in the vicinity of each fixed contact. Accordingly, the paths of arcs generated in the vicinity of each fixed contact proceed in different directions.

Accordingly, arcs generated in the vicinity of each fixed contact do not meet each other. Accordingly, it is possible to prevent a malfunction or a safety accident that may be caused by the collision of arcs generated at different positions.

Further, in order to achieve the above-described objects and effects, the arc path generation unit includes a Halbach array and a magnet part provided in the space part. The Halbach array and the magnet part are located inwardly on each surface of the magnetic frame surrounding the space part. That is, separate design changes for disposing the Halbach array and the magnet part outside the space part are not required.

Accordingly, the arc path generation unit according to various exemplary embodiments of the present disclosure may be provided in the DC relay without excessive design changes. Accordingly, the time and cost for applying the arc path generation unit according to various exemplary embodiments of the present disclosure may be reduced.

DETAILED DESCRIPTION

Figure 1:
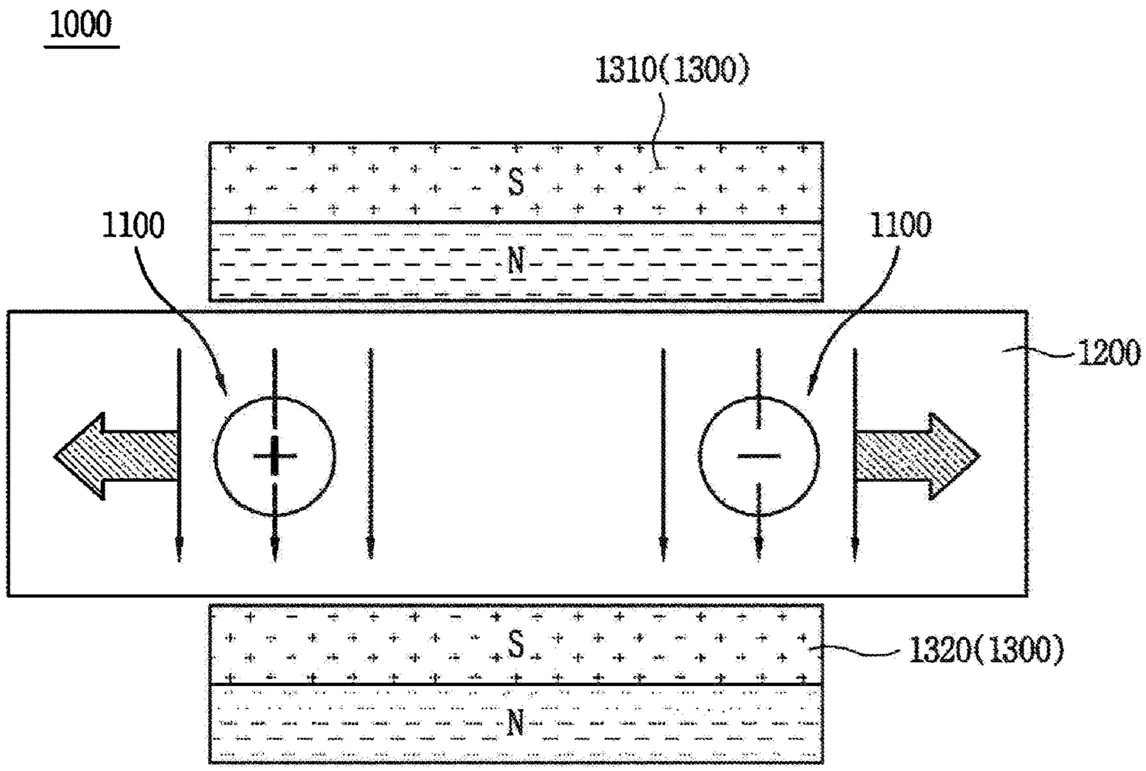
FIG. 1 is a conceptual view illustrating a DC relay according to prior art.
Figure 1:
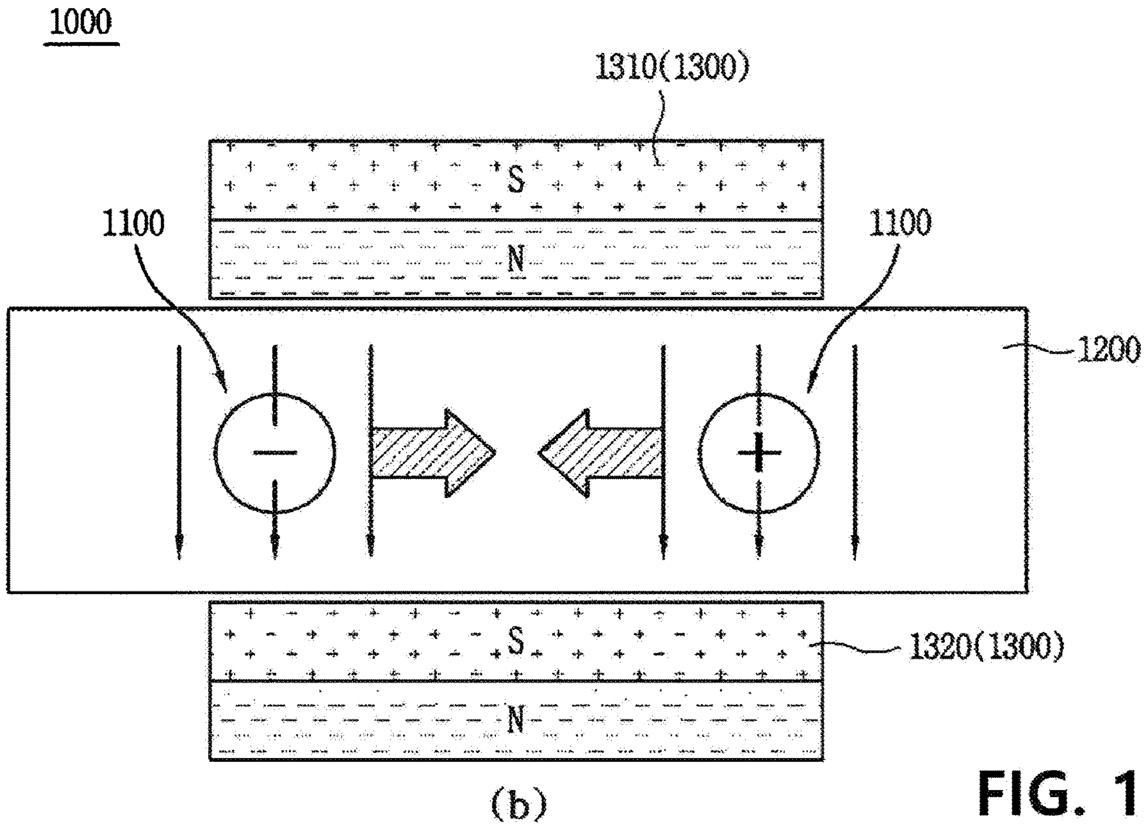

Hereinafter, the direct current (DC) relay 1 and the arc path generation units 100, 200, 300 according to an exemplary embodiment of the present disclosure will be described in detail with reference to the accompanying drawings.

In the following description, in order to clarify the characteristics of the present disclosure, the descriptions of some components may be omitted.

1. Definition of Terms

When an element is referred to as being “connected” to or “joined” with another element, it will be understood that it may be directly connected to or joined with the other element, but other elements may exist in between.

On the other hand, when it is mentioned that a certain element is “directly connected” to or “directly joined” with another element, it will be understood that other elements do not exist in the middle.

As used herein, the singular expression includes the plural expression unless the context clearly dictates otherwise.

The term “magnetize” used in the following description refers to a phenomenon in which an object becomes magnetic in a magnetic field.

The term “polarity” used in the following description refers to different properties that the anode and cathode of an electrode have. In an exemplary embodiment, the polarity may be classified into the N pole or the S pole.

The term “electric current” used in the following description refers to a state in which two or more members are electrically connected.

The term “arc path (A.P)” used in the following description means a path through which the generated arc is moved or extinguished.

“⊙” illustrated in the following drawings means a direction in which the current flows from a movable contact 43 toward a fixed contact 22 (i.e., an upward direction), that is, the flow in a direction coming out of the ground.

"⊗" illustrated in the following drawings means a direction in which the current flows from a fixed contact 22 toward a movable contact 43 (i.e., downward direction), that is, a direction that penetrates the ground.

The term "Halbach Array" used in the following description refers to an aggregate composed of a plurality of magnetic materials arranged side by side and configured in a column or a row.

A plurality of magnetic materials constituting the Halbach array may be arranged according to a predetermined rule. The plurality of magnetic materials may form a magnetic field by themselves or with each other.

The Halbach array contains two relatively long surfaces and the other two relatively short surfaces. The magnetic field formed by the magnetic materials constituting the Halbach array may be formed with a stronger intensity on the outside of any one of the two long surfaces.

In the following description, it is described by assuming that the strength of the magnetic field in a direction toward the space parts 115, 215, 315 is formed to be stronger among the magnetic fields formed by the Halbach array.

The term "magnet part" used in the following description means an object of any shape that is formed of a magnetic material and may form a magnetic field. In an exemplary embodiment, the magnet part may be provided with a permanent magnet or an electromagnet. It will be understood that the magnet part is a magnetic material which is different from the magnetic materials forming the Halbach array, that is, a magnetic material which is provided separately from the Halbach array.

The magnet part may form a magnetic field by itself or in conjunction with another magnetic material.

The magnet part may extend in one direction. The magnet part may be magnetized to have different polarities at both ends in the one direction (i.e., it has different polarities in the longitudinal direction). In addition, the magnet part may be magnetized to have different polarities on both side surfaces of the one direction and the other direction (i.e., it has different polarities in the width direction).

The magnetic field formed by the arc path generation units 100, 200, 300 according to an exemplary embodiment of the present disclosure is illustrated by a dashed-dotted line in each figure.

Figure 2:
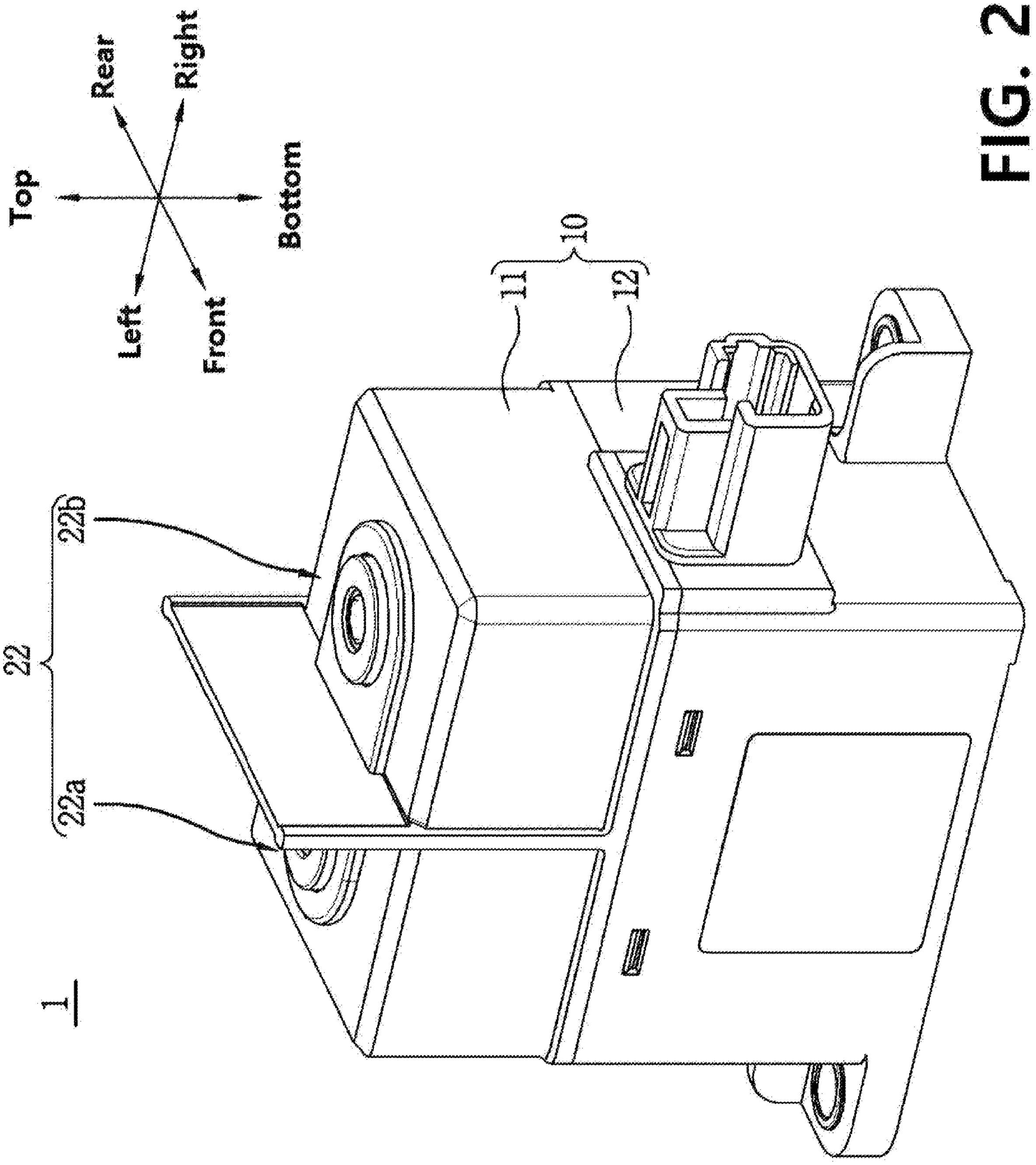
FIG. 2 is a perspective view illustrating a DC relay according to an exemplary embodiment of the present disclosure.

The terms "left", "right", "top", "bottom", "front" and "rear" used in the following description will be understood with reference to the coordinate system illustrated in FIG. 2.

Figure 3:
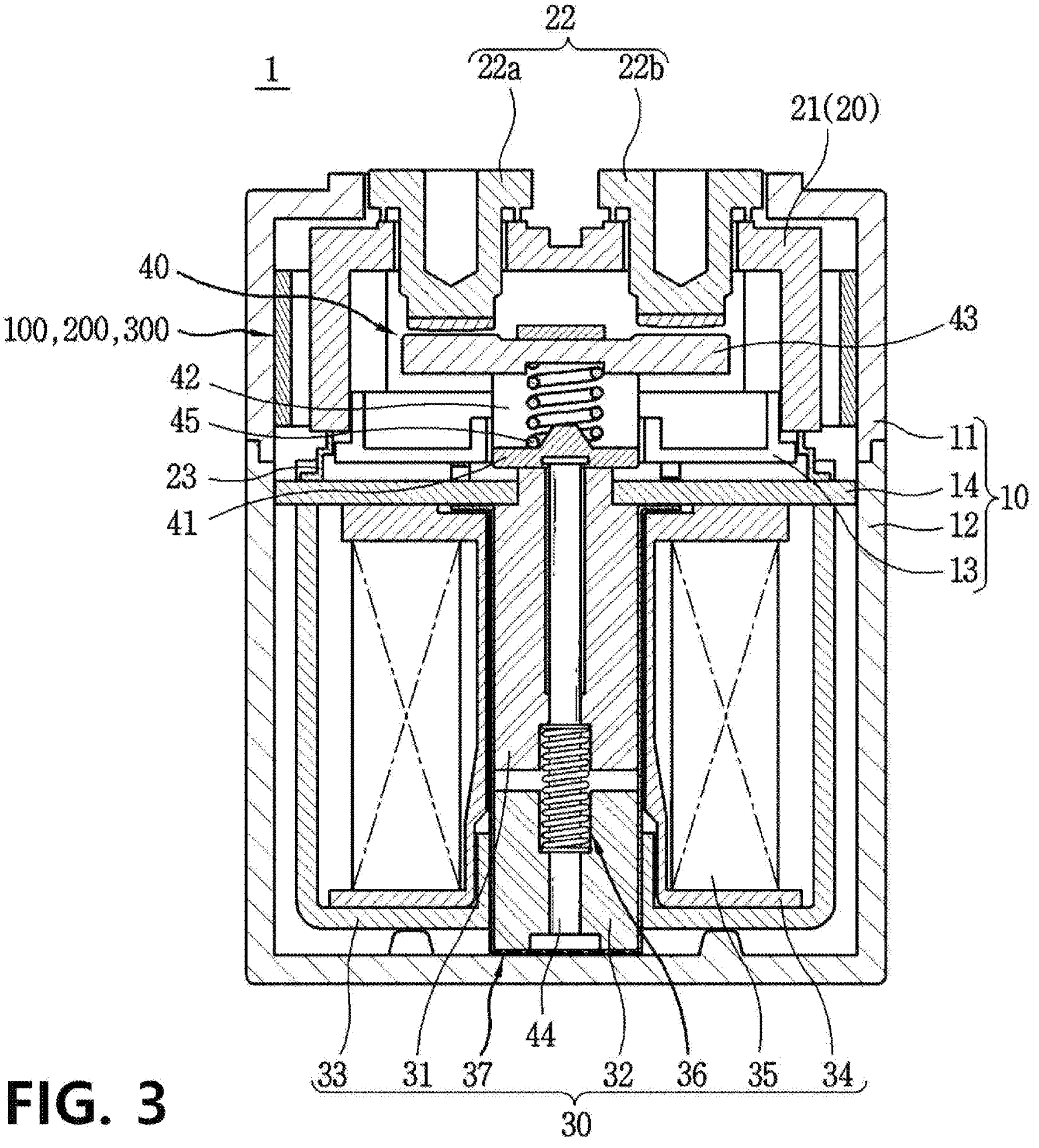
FIG. 3 is a cross-sectional view illustrating the configuration of the DC relay of FIG. 2.
Figure 4:
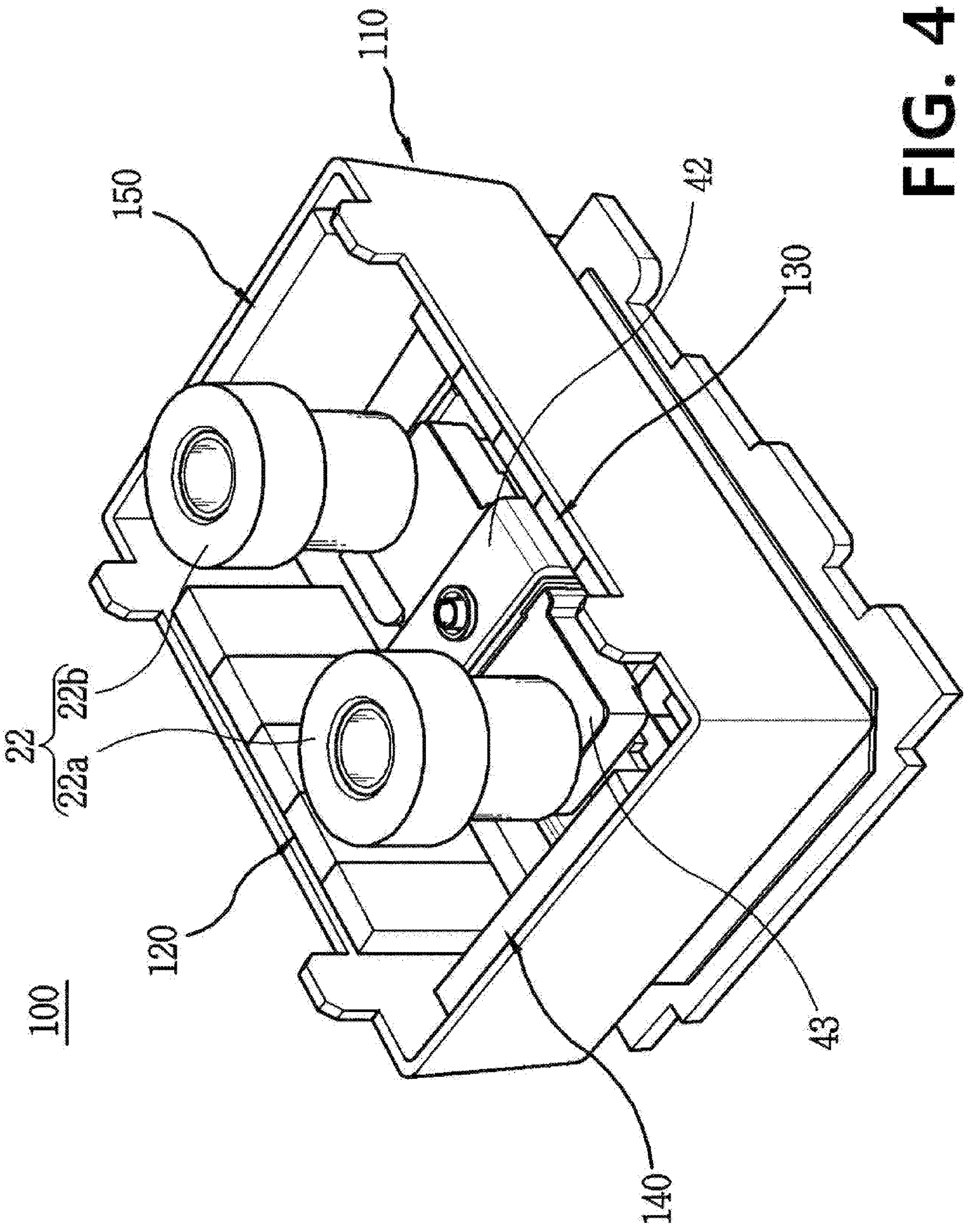
FIG. 4 is an open perspective view illustrating the first example of an arc path generation unit provided in the DC relay of FIG. 2.

2. Description of the Configuration of the DC Relay 1 According to an Exemplary Embodiment of the Present Disclosure Referring to FIGS. 2 to 3, the DC relay 1 according to an exemplary embodiment of the present disclosure includes a frame part 10, an opening/closing part 20, a core part 30 and a movable contact part 40.

In addition, referring to FIGS. 4 to 24, the DC relay 1 according to an exemplary embodiment of the present disclosure includes arc path generation units 100, 200, 300.

The arc path generation units 100, 200, 300 may form a discharge path of the generated arc.

Hereinafter, each configuration of the DC relay 1 according to an exemplary embodiment of the present disclosure will be described with reference to the accompanying drawings, but the arc path generation units 100, 200, 300 will be described as separate items.

The arc path generation units 100, 200, 300 according to various exemplary embodiments to be described below will be described on the assumption that the direct current relay 1 is provided.

However, it will be understood that the arc path generation units 100, 200, 300 may be applied to the type of an apparatus that can be energized and de-energized with the outside by the contact and separation of a fixed contact and a movable contact such as magnetic contacts, magnetic switches and the like.

(1) Description of the Frame Part 10

The frame part 10 forms the outside of the DC relay 1. A predetermined space is formed inside the frame part 10. Various devices that perform a function for the DC relay 1 to apply or block an externally transmitted current may be accommodated in the space.

That is, the frame part 10 functions as a type of housing.

The frame part 10 may be formed of an insulating material such as synthetic resin or the like. This is to prevent arbitrarily energizing the inside and outside of the frame part 10.

The frame part 10 includes an upper frame 11, a lower frame 12, an insulating plate 13 and a support plate 14.

The upper frame 11 forms the upper side of the frame part 10. A predetermined space is formed inside the upper frame 11.

The opening/closing part 20 and the movable contact part 40 may be accommodated in the inner space of the upper frame 11. In addition, the arc path generation units 100, 200, 300 may be accommodated in the inner space of the upper frame 11.

The upper frame 11 may be coupled to the lower frame 12. An insulating plate 13 and a support plate 14 may be provided in a space between the upper frame 11 and the lower frame 12.

On one side of the upper frame 11, which is the upper side in the illustrated exemplary embodiment, the fixed contact 22 of the opening/closing part 20 is positioned. A portion of the fixed contact 22 may be exposed on the upper side of the upper frame 11, so as to be connected to an external power source or a load to be energized.

To this end, a through-hole through which the fixing contact 22 is coupled may be formed on the upper side of the upper frame 11.

The lower frame 12 forms the lower side of the frame portion 10. A predetermined space is formed inside the lower frame 12. The core part 30 may be accommodated in the inner space of the lower frame 12.

The lower frame 12 may be coupled to the upper frame 11. An insulating plate 13 and a support plate 14 may be provided in a space between the lower frame 12 and the upper frame 11.

The insulating plate 13 and the support plate 14 electrically and physically separate the inner space of the upper frame 11 and the inner space of the lower frame 12.

The insulating plate 13 is positioned between the upper frame 11 and the lower frame 12. The insulating plate 13 electrically separates the upper frame 11 and the lower frame 12 from each other. To this end, the insulating plate 13 may be formed of an insulating material such as synthetic resin or the like.

By the insulating plate 13, it is possible to prevent arbitrary energization between the opening/closing part 20, the movable contact part 40 and the arc path generation units 100, 200, 300 accommodated inside the upper frame 11, and the core part 30 accommodated inside the lower frame 12.

A through-hole (not illustrated) is formed in the center of the insulating plate 13. The shaft 44 of the movable contact part 40 is coupled through the through-hole (not illustrated) to be movable in the vertical direction.

The support plate 14 is positioned on the lower side of the insulating plate 13. The insulating plate 13 may be supported by the support plate 14.

The support plate 14 is positioned between the upper frame 11 and the lower frame 12.

The support plate 14 physically separates the upper frame 11 and the lower frame 12 from each other. In addition, the support plate 14 supports the insulating plate 13.

The support plate 14 may be formed of a magnetic material. Accordingly, the support plate 14 may form a magnetic circuit together with a yoke 33 of the core part 30. By the magnetic circuit, a driving force for moving a movable core 32 of the core part 30 toward a fixed core 31 may be formed.

A through-hole (not illustrated) is formed in the center of the support plate 14. The shaft 44 is coupled through the through-hole (not illustrated) to be movable in the vertical direction.

Therefore, when the movable core 32 is moved in a direction toward the fixed core 31 or in a direction to be spaced apart from the fixed core 31, the shaft 44 and the movable contact 43 connected to the shaft 44 may also be moved together in the same direction.

(2) Description of the Opening/Closing Part 20

The opening/closing part 20 allows or blocks current flow according to the operation of the core part 30. Specifically, the opening/closing part 20 may allow or block the flow of current by contacting or separating the fixed contact 22 and the movable contact 43 from each other.

The opening/closing part 20 is accommodated in the inner space of the upper frame 11. The opening/closing part 20 may be electrically and physically spaced apart from the core part 30 by the insulating plate 13 and the support plate 14.

The opening/closing part 20 includes an arc chamber 21, a fixed contact 22 and a sealing member 23.

In addition, the arc path generation units 100, 200, 300 may be provided outside the arc chamber 21. The arc path generation units 100, 200, 300 may form a magnetic field for forming the path (A.P) of an arc generated inside the arc chamber 21. The detailed description thereof will be provided below.

The arc chamber 21 extinguishes an arc generated by the fixed contact 22 and the movable contact 43 being spaced apart from each other in the inner space. Accordingly, the arc chamber 21 may be referred to as an "arc extinguishing unit."

The arc chamber 21 hermetically accommodates the fixed contact 22 and the movable contact 43. That is, the fixed contact 22 and the movable contact 43 are accommodated inside the arc chamber 21. Accordingly, the arc generated by the fixed contact 22 and the movable contact 43 being spaced apart does not flow out arbitrarily to the outside.

The arc chamber 21 may be filled with an extinguishing gas. The extinguishing gas allows the generated arc to be extinguished and discharged to the outside of the DC relay 1 through a preset path. To this end, a communication hole (not illustrated) may be formed through a wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In an exemplary embodiment, the arc chamber 21 may be formed of a ceramic material.

A plurality of through-holes may be formed on the upper side of the arc chamber 21. A fixed contact 22 is through-coupled to each of the through-holes.

In the illustrated exemplary embodiment, the fixed contact 22 is provided in two, including a first fixed contact **22*a* and a second fixed contact 22*b*. Accordingly, two through-holes formed on the upper side of the arc chamber 21** may also be formed.

When the fixed contact 22 is through-coupled to the through-hole, the through-hole is sealed. That is, the fixed contact 22 is hermetically coupled to the through-hole. Accordingly, the generated arc is not discharged to the outside through the through-hole.

The lower side of the arc chamber 21 may be open. The insulating plate 13 and the sealing member 23 are in contact with the lower side of the arc chamber 21. That is, the lower side of the arc chamber 21 is sealed by the insulating plate 13 and the sealing member 23.

Accordingly, the arc chamber 21 may be electrically and physically spaced apart from the outer space of the upper frame 11.

The arc extinguished in the arc chamber 21 is discharged to the outside of the DC relay 1 through a preset path. In an exemplary embodiment, the extinguished arc may be discharged to the outside of the arc chamber 21 through the communication hole (not illustrated).

The fixed contact 22 is in contact with or spaced apart from the movable contact 43 to apply or cut off electric current inside and outside the DC relay 1.

Specifically, when the fixed contact 22 is in contact with the movable contact 43, the inside and the outside of the DC relay 1 may be energized. On the other hand, when the fixed contact 22 is spaced apart from the movable contact 43, the electric current inside and outside the DC relay 1 is cut off.

As the name implies, the fixed contact 22 is not moved. That is, the fixed contact 22 is fixedly coupled to the upper frame 11 and the arc chamber 21. Accordingly, contact and separation of the fixed contact 22 and the movable contact 43 is achieved by the movement of the movable contact 43.

One end of the fixed contact 22, which is an upper end in the illustrated exemplary embodiment, is exposed to the outside of the upper frame 11. A power source or a load is connected to the one end to be energized, respectively.

A plurality of fixed contacts 22 may be provided. In the illustrated exemplary embodiment, the fixed contact 22 includes a first fixed contact **22*a* on the left side and a second fixed contact 22*b* on the right side, and includes a total of two fixed contacts 22*b***.

The first fixed contact **22*a* is positioned at one side from the center in the longitudinal direction of the movable contact 43, which is positioned to be biased to the left side in the illustrated exemplary embodiment. In addition, the second fixed contact 22*b* is positioned on the other side from the center in the longitudinal direction of the movable contact 43**, which is positioned to be biased toward the right side in the illustrated exemplary embodiment.

Power may be energably connected to any one of the first fixed contact **22*a* and the second fixed contact 22*b*. In addition, a load may be electrically connected to the other one of the first fixed contact 22*a* and the second fixed contact 22*b***.

The DC relay 1 according to an exemplary embodiment of the present disclosure may form the arc path (A.P) regardless of the direction of the power or load connected to the fixed contact 22. This is accomplished by the arc path generation units 100, 200, 300, which will be described below in detail.

The other end of the stationary contact 22, which is the lower end in the illustrated exemplary embodiment, extends toward the movable contact 43.

When the movable contact 43 is moved in a direction toward the fixed contact 22, which is upward in the illustrated exemplary embodiment, the lower end is in contact with the movable contact 43. Accordingly, the outside and the inside of the DC relay 1 may be energized.

The lower end of the fixed contact 22 is positioned inside the arc chamber 21.

When the control power is cut off, the movable contact 43 is spaced apart from the fixed contact 22 by the elastic force of a return spring 36.

In this case, as the fixed contact 22 and the movable contact 43 are spaced apart, an arc is generated between the fixed contact 22 and the movable contact 43. The generated arc is extinguished by the extinguishing gas inside the arc chamber 21, and may be discharged to the outside along a path formed by the arc path generation units 100, 200, 300.

The sealing member 23 blocks any communication between the arc chamber 21 and the space inside the upper frame 11. The sealing member 23 seals the lower side of the arc chamber 21 together with the insulating plate 13 and the support plate 14.

Specifically, the upper side of the sealing member 23 is coupled to the lower side of the arc chamber 21. In addition, the radially inner side of the sealing member 23 is coupled to the outer periphery of the insulating plate 13, and the lower side of the sealing member 23 is coupled to the support plate 14.

Accordingly, the arc generated in the arc chamber 21 and the arc extinguished by the extinguishing gas do not flow into the inner space of the upper frame 11.

In addition, the sealing member 23 may be configured to block any communication between the inner space of the cylinder 37 and the inner space of the frame portion 10.

(3) Description of the Core Part 30

The core part 30 moves the movable contact part 40 upward according to the application of the control power. In addition, when the application of the control power is released, the core part 30 moves the movable contact part 40 downward again.

The core part 30 may be connected to an external control power supply (not illustrated) so as to be energized, and may receive a control power supply.

The core part 30 is positioned on the lower side of the opening/closing part 20. In addition, the core part 30 is accommodated inside the lower frame 12. The core part 30 and the opening/closing part 20 may be electrically and physically spaced apart from each other by the insulating plate 13 and the support plate 14.

A movable contact part 40 is positioned between the core part 30 and the opening/closing part 20. The movable contact part 40 may be moved by the driving force applied by the core part 30. Accordingly, the movable contact 43 and the fixed contact 22 may be in contact such that the DC relay 1 can be energized.

The core part 30 includes a fixed core 31, a movable core 32, a yoke 33, a bobbin 34, a coil 35, a return spring 36 and a cylinder 37.

The fixed core 31 is magnetized by a magnetic field generated by the coil 35 to generate electromagnetic attraction. By the electromagnetic attraction, the movable core 32 is moved toward the fixed core 31 (an upward direction in FIG. 3).

The fixed core 31 does not move. That is, the fixed core 31 is fixedly coupled to the support plate 14 and the cylinder 37.

The fixed core 31 may be provided in any shape capable of generating electromagnetic force by being magnetized by a magnetic field. In an exemplary embodiment, the fixed core 31 may be provided as a permanent magnet or an electromagnet.

The fixed core 31 is partially accommodated in the upper space inside the cylinder 37. In addition, the outer periphery of the fixed core 31 is in contact with the inner periphery of the cylinder 37.

The fixed core 31 is positioned between the support plate 14 and the movable core 32.

A through-hole (not illustrated) is formed in the central portion of the fixed core 31. The shaft 44 is coupled through the through-hole (not illustrated) so as to be movable up and down.

The fixed core 31 is positioned to be spaced apart from the movable core 32 by a predetermined distance. Accordingly, the distance at which the movable core 32 can be moved toward the fixed core 31 may be limited to the predetermined distance. Accordingly, the predetermined distance may be defined as "a moving distance of the movable core 32."

One end of the return spring 36, which is the upper end in the illustrated exemplary embodiment, is in contact with the lower side of the fixed core 31. When the fixed core 31 is magnetized and the movable core 32 is moved upward, the return spring 36 is compressed and a restoring force is stored.

Accordingly, when the application of the control power is released and the magnetization of the fixed core 31 is terminated, the movable core 32 may be returned to the lower side by the restoring force.

The movable core 32 is moved toward the fixed core 31 by electromagnetic attraction generated by the fixed core 31 when control power is applied.

As the movable core 32 moves, the shaft 44 coupled to the movable core 32 moves upward in a direction toward the fixed core 31, which is the upper side in the illustrated exemplary embodiment. In addition, as the shaft 44 moves, the movable contact part 40 coupled to the shaft 44 moves upward.

Accordingly, the fixed contact 22 and the movable contact 43 contact each other such that the DC relay 1 can be energized with an external power source or load.

The movable core 32 may be provided in any shape capable of receiving attractive force by electromagnetic force. In an exemplary embodiment, the movable core 32 may be formed of a magnetic material, or may be provided as a permanent magnet or an electromagnet.

The movable core 32 is accommodated inside the cylinder 37. In addition, the movable core 32 may be moved in the longitudinal direction of the cylinder 37 inside the cylinder 37, which is the vertical direction in the illustrated exemplary embodiment.

Specifically, the movable core 32 may be moved in a direction toward the fixed core 31 and in a direction away from the fixed core 31.

The movable core 32 is coupled to the shaft 44. The movable core 32 may move integrally with the shaft 44. When the movable core 32 moves upward or downward, the shaft 44 also moves upward or downward. Accordingly, the movable contact 43 is also moved upward or downward.

The movable core 32 is positioned on the lower side of the fixed core 31. The movable core 32 is spaced apart from the fixed core 31 by a predetermined distance. As described above, the predetermined distance is a distance at which the movable core 32 can be moved in the vertical direction.

The movable core 32 is formed to extend in the longitudinal direction. A hollow portion extending in the longitudinal direction is recessed by a predetermined distance inside the movable core 32. A return spring 36 and a lower side of the shaft 44 through-coupled to the return spring 36 are partially accommodated in the hollow portion.

A through-hole is formed through the lower side of the hollow part in the longitudinal direction. The hollow portion and the through-hole communicate with each other. The lower end of the shaft 44 inserted into the hollow portion may proceed toward the through-hole.

A space part is formed to be recessed by a predetermined distance at the lower end of the movable core 32. The space part communicates with the through-hole. The lower head part of the shaft 44 is positioned in the space part.

The yoke 33 forms a magnetic circuit as control power is applied. The magnetic circuit formed by the yoke 33 may be configured to adjust the direction of a magnetic field formed by the coil 35.

Accordingly, when control power is applied, the coil 35 may generate a magnetic field in a direction in which the movable core 32 moves toward the fixed core 31. The yoke 33 may be formed of a conductive material capable of conducting electricity.

The yoke 33 is accommodated inside the lower frame 12. The yoke 33 surrounds the coil 35. The coil 35 may be accommodated in the yoke 33 so as to be spaced apart from the inner circumferential surface of the yoke 33 by a predetermined distance.

The bobbin 34 is accommodated inside the yoke 33. That is, from the outer periphery of the lower frame 12 to the radially inward direction, the yoke 33, the coil 35 and the bobbin 34 on which the coil 35 is wound are sequentially arranged.

The upper side of the yoke 33 is in contact with the support plate 14. In addition, the outer periphery of the yoke 33 may be positioned to be in contact with the inner periphery of the lower frame 12 or to be spaced apart from the inner periphery of the lower frame 12 by a predetermined distance.

A coil 35 is wound around the bobbin 34. The bobbin 34 is accommodated inside the yoke 33.

The bobbin 34 may include flat upper and lower portions, and a cylindrical column portion which is formed to extend in the longitudinal direction to connect the upper and lower portions. That is, the bobbin 34 has a bobbin shape.

The upper portion of the bobbin 34 is in contact with the lower side of the support plate 14. A coil 35 is wound around the column portion of the bobbin 34. The thickness around which the coil 35 is wound may be equal to or smaller than the diameters of the upper and lower portions of the bobbin 34.

A hollow portion extending in the longitudinal direction is formed through the column portion of the bobbin 34. A cylinder 37 may be accommodated in the hollow portion. The pillar portion of the bobbin 34 may be disposed to have the same central axis as the fixed core 31, the movable core 32 and the shaft 44.

The coil 35 generates a magnetic field by the applied control power. The fixed core 31 is magnetized by the magnetic field generated by the coil 35, and electromagnetic attraction may be applied to the movable core 32.

The coil 35 is wound around the bobbin 34. Specifically, the coil 35 is wound on the column portion of the bobbin 34, and is stacked radially outward of the column portion. The coil 35 is accommodated inside the yoke 33.

When the control power is applied, the coil 35 generates a magnetic field. In this case, the strength or direction of the magnetic field generated by the coil 35 may be controlled by the yoke 33. The fixed core 31 is magnetized by the magnetic field generated by the coil 35.

When the fixed core 31 is magnetized, the movable core 32 receives an electromagnetic force in a direction toward the fixed core 31, that is, an attractive force. Accordingly, the movable core 32 is moved upward in a direction toward the fixed core 31, which is upward in the illustrated exemplary embodiment.

The return spring 36 provides a restoring force for the movable core 32 to return to its original position when the application of the control power is released after the movable core 32 is moved toward the fixed core 31.

The return spring 36 is compressed as the movable core 32 is moved toward the fixed core 31 and stores a restoring force. In this case, it is preferable that the stored restoring force is smaller than the electromagnetic attraction force exerted on the movable core 32 by magnetizing the fixed core 31. This is to prevent the movable core 32 from being arbitrarily returned to its original position by the return spring 36 while the control power is applied.

When the application of the control power is released, the movable core 32 receives a restoring force by the return spring 36. Certainly, gravity due to the empty weight of the movable core 32 may also act on the movable core 32. Accordingly, the movable core 32 may be moved in a direction away from the fixed core 31 to return to the original position.

The return spring 36 may be provided in any shape that is deformed in shape to store the restoring force, returns to its original shape and transmits the restoring force to the outside. In an exemplary embodiment, the return spring 36 may be provided as a coil spring.

The shaft 44 is through-coupled to the return spring 36. The shaft 44 may be moved in the vertical direction regardless of the shape deformation of the return spring 36 in a state where the return spring 36 is coupled.

The return spring 36 is accommodated in a hollow portion which is formed to be recessed on the upper side of the movable core 32. In addition, one end of the return spring 36 facing the fixed core 31, which is the upper end in the illustrated exemplary embodiment, is accommodated in the hollow portion which is formed to be recessed in the lower side of the fixed core 31.

The cylinder 37 accommodates the fixed core 31, the movable core 32, the return spring 36 and the shaft 44. The movable core 32 and the shaft 44 may move upward and downward in the cylinder 37.

The cylinder 37 is positioned in a hollow portion which is formed in the column portion of the bobbin 34. The upper end of the cylinder 37 is in contact with the lower surface of the support plate 14.

The side surface of the cylinder 37 is in contact with the inner peripheral surface of the column portion of the bobbin 34. The upper opening of the cylinder 37 may be sealed by the fixed core 31. The lower surface of the cylinder 37 may be in contact with the inner surface of the lower frame 12.

(4) Description of the Movable Contact Part 40

The movable contact part 40 includes a movable contact 43 and a structure for moving the movable contact 43. By the movable contact part 40, the DC relay 1 may be energized with an external power source or load.

The movable contact part 40 is accommodated in the inner space of the upper frame 11. In addition, the movable contact part 40 is accommodated inside the arc chamber 21 to be movable up and down.

A fixed contact 22 is positioned on the upper side of the movable contact part 40. The movable contact part 40 is accommodated inside the arc chamber 21 so as to be movable in a direction toward the fixed contact 22 and a direction away from the fixed contact 22.

The core part 30 is positioned on the lower side of the movable contact part 40. The movement of the movable contact part 40 may be achieved by movement of the movable core 32.

The movable contact part 40 includes a housing 41, a cover 42, a movable contact 43, a shaft 44 and an elastic part 45.

The housing 41 accommodates the movable contact 43 and the elastic part 45 for elastically supporting the movable contact 43.

In the illustrated exemplary embodiment, the housing 41 has one side and the other side opposite thereto open. The movable contact 43 may be inserted through the open portion.

The unopened side surface of the housing 41 may be configured to surround the accommodated movable contact 43.

A cover 42 is provided on the upper side of the housing 41. The cover 42 covers the upper side surface of the movable contact 43 accommodated in the housing 41.

The housing 41 and the cover 42 are preferably formed of an insulating material to prevent unintentional energization. In an exemplary embodiment, the housing 41 and the cover 42 may be formed of synthetic resin or the like.

The lower side of the housing 41 is connected to the shaft 44. When the movable core 32 connected to the shaft 44 is moved upward or downward, the housing 41 and the movable contact 43 accommodated therein may also be moved upward or downward.

The housing 41 and the cover 42 may be coupled by any member. In an exemplary embodiment, the housing 41 and the cover 42 may be coupled by a fastening member (not illustrated) such as a bolt or a nut.

The movable contact 43 is in contact with the fixed contact 22 according to the application of the control power such that the DC relay 1 is energized with an external power source and a load. In addition, the movable contact 43 is spaced apart from the fixed contact 22 when the application of the control power is released such that the DC relay 1 does not conduct electricity with an external power source and a load.

The movable contact 43 is positioned adjacent to the stationary contact 22.

The upper side of the movable contact 43 is partially covered by the cover 42. In an exemplary embodiment, a portion of the upper surface of the movable contact 43 may be in contact with the lower surface of the cover 42.

The lower side of the movable contact 43 is elastically supported by the elastic part 45. In order to prevent the movable contact 43 from being arbitrarily moved downward, the elastic part 45 may elastically support the movable contact 43 in a compressed state by a predetermined distance.

The movable contact 43 is formed to extend in the longitudinal direction, which is the left-right direction in the illustrated exemplary embodiment. That is, the length of the movable contact 43 is formed to be longer than the width. Accordingly, both ends in the longitudinal direction of the movable contact 43 accommodated in the housing 41 are exposed to the outside of the housing 41.

Contact protrusions formed to protrude upward by a predetermined distance may be formed at both ends. The fixed contact 22 is in contact with the contact protrusions.

The contact protrusions may be formed at positions corresponding to each of the fixed contacts 22*a*, 22*b*. Accordingly, the moving distance of the movable contact 43 may be reduced, and the contact reliability between the fixed contact 22 and the movable contact 43 may be improved.

The width of the movable contact 43 may be the same as a distance at which each side surface of the housing 41 is spaced apart from each other. That is, when the movable contact 43 is accommodated in the housing 41, both side surfaces of the movable contact 43 in the width direction may contact the inner surface of each side surface of the housing 41.

Accordingly, a state in which the movable contact 43 is accommodated in the housing 41 may be stably maintained.

The shaft 44 transmits a driving force generated when the core part 30 is operated to the movable contact part 40. Specifically, the shaft 44 is connected to the movable core 32 and the movable contact 43. When the movable core 32 is moved upward or downward, the movable contact 43 may also be moved upward or downward by the shaft 44.

The shaft 44 is formed to extend in the longitudinal direction, which is the vertical direction in the illustrated exemplary embodiment.

The lower end of the shaft 44 is insertedly coupled to the movable core 32. When the movable core 32 is moved in the vertical direction, the shaft 44 may be moved in the vertical direction together with the movable core 32.

The body portion of the shaft 44 is vertically movably coupled through the fixed core 31. A return spring 36 is coupled through the body portion of the shaft 44.

The upper end of the shaft 44 is coupled to the housing 41. When the movable core 32 is moved, the shaft 44 and the housing 41 may be moved together.

The upper and lower ends of the shaft 44 may be formed to have larger diameters than the body portion of the shaft. Accordingly, the shaft 44 may be stably maintained in a coupled state with the housing 41 and the movable core 32.

The elastic part 45 elastically supports the movable contact 43. When the movable contact 43 comes into contact with the fixed contact 22, the movable contact 43 tends to be spaced apart from the fixed contact 22 by electromagnetic repulsive force.

In this case, the elastic part 45 elastically supports the movable contact 43, and prevents the movable contact 43 from being arbitrarily spaced apart from the fixed contact 22.

The elastic part 45 may be provided in any shape capable of storing a restoring force by deformation of a shape and providing the stored restoring force to another member. In an exemplary embodiment, the elastic part 45 may be provided as a coil spring.

One end of the elastic part 45 facing the movable contact 43 is in contact with the lower side of the movable contact 43. In addition, the other end opposing the one end is in contact with the upper side of the housing 41.

The elastic part 45 may be compressed by a predetermined distance to elastically support the movable contact 43 in a state where the restoring force is stored. Accordingly, even if an electromagnetic repulsive force is generated between the movable contact 43 and the fixed contact 22, the movable contact 43 is not arbitrarily moved.

For stable coupling of the elastic part 45, a protrusion (not illustrated) inserted into the elastic part 45 may be protruded on the lower side of the movable contact 43. Similarly, a protrusion (not illustrated) inserted into the elastic part 45 may protrude from the upper side of the housing 41.

3. Description of the Arc Path Generation Unit According to the First Example of the Present Disclosure Referring to FIGS. 4 to 16, the arc path generation units 100, 200, 300 according to various exemplary embodiments of the present disclosure are illustrated. Each of the arc path generation units 100, 200, 300 forms a magnetic field inside the arc chamber 21. An electromagnetic force is formed inside the arc chamber 21 by the current flowing through the DC relay 1 and the formed magnetic field.

The arc generated as the fixed contact 22 and the movable contact 43 are spaced apart is moved to the outside of the arc chamber 21 by the formed electromagnetic force. Specifically, the generated arc is moved along the direction of the formed electromagnetic force. Accordingly, it may be said that the arc path generation units 100, 200, 300 form the arc path (A.P), which is a path through which the generated arc flows.

The arc path generation units 100, 200, 300 are positioned in a space formed inside the upper frame 11. The arc path generation units 100, 200, 300 are disposed to surround the arc chamber 21. In other words, the arc chamber 21 is located inside the arc path generation units 100, 200, 300.

A fixed contact 22 and a movable contact 43 are positioned inside the arc path generation units 100, 200, 300. The arc generated by the fixed contact 22 and the movable contact 43 being spaced apart may be induced by an electromagnetic force formed by the arc path generation units 100, 200, 300.

The arc path generation units 100, 200, 300 according to various exemplary embodiments of the present disclosure include a Halbach array or a magnet part. The Halbach array or magnet part forms a magnetic field inside the arc path generation unit 100 in which the fixed contact 22 and the movable contact 43 are accommodated. In this case, the Halbach array or the magnet part may form a magnetic field by itself and between each other.

The magnetic field formed by the Halbach array and the magnet part forms an electromagnetic force together with the current passed through the fixed contact 22 and the movable contact 43. The formed electromagnetic force induces an arc generated when the fixed contact 22 and the movable contact 43 are spaced apart.

In this case, the arc path generation units 100, 200, 300 form an electromagnetic force in a direction away from the center (C) of the space part 115. Accordingly, the arc path (A.P) is also formed in a direction away from the center (C) of the space part.

As a result, each component provided in the DC relay 1 is not damaged by the generated arc. Furthermore, the generated arc may be rapidly discharged to the outside of the arc chamber 21.

Hereinafter, the configuration of each of the arc path generation units 100, 200, 300 and the arc path (A.P) formed by each of the arc path generation units 100, 200, 300 will be described in detail with reference to the accompanying drawings.

The arc path generation units 100, 200, 300 according to various exemplary embodiments to be described below may have a Halbach array positioned on at least one of the front side and the rear side.

In addition, the arc path generation units 100, 200, 300 may include a magnet part having a polarity in a longitudinal direction, which is positioned on at least one side of the left side and the right side.

In another exemplary embodiment, the arc path generation units 100, 200, 300 may have a Halbach array positioned on at least one side of the left side and the right side.

In the above exemplary embodiment, the arc path generation units 100, 200, 300 may include a magnet part having a polarity in the width direction, which is positioned on at least one of the front side and the rear side.

As will be described below, the rear side may be defined as a direction adjacent to the first surfaces 111, 211, 311, and the front side may be defined as a direction adjacent to the second surfaces 112, 212, 312.

In addition, the left side may be defined as a direction adjacent to the third surfaces 113, 213, 313, and the right side may be defined as a direction adjacent to the fourth surfaces 114, 214, 314.

(1) Description of the Arc Path Generation Unit 100

Hereinafter, the arc path generation unit 100 according to an exemplary embodiment of the present disclosure will be described in detail with reference to FIGS. 5 to 8.

Figure 5:
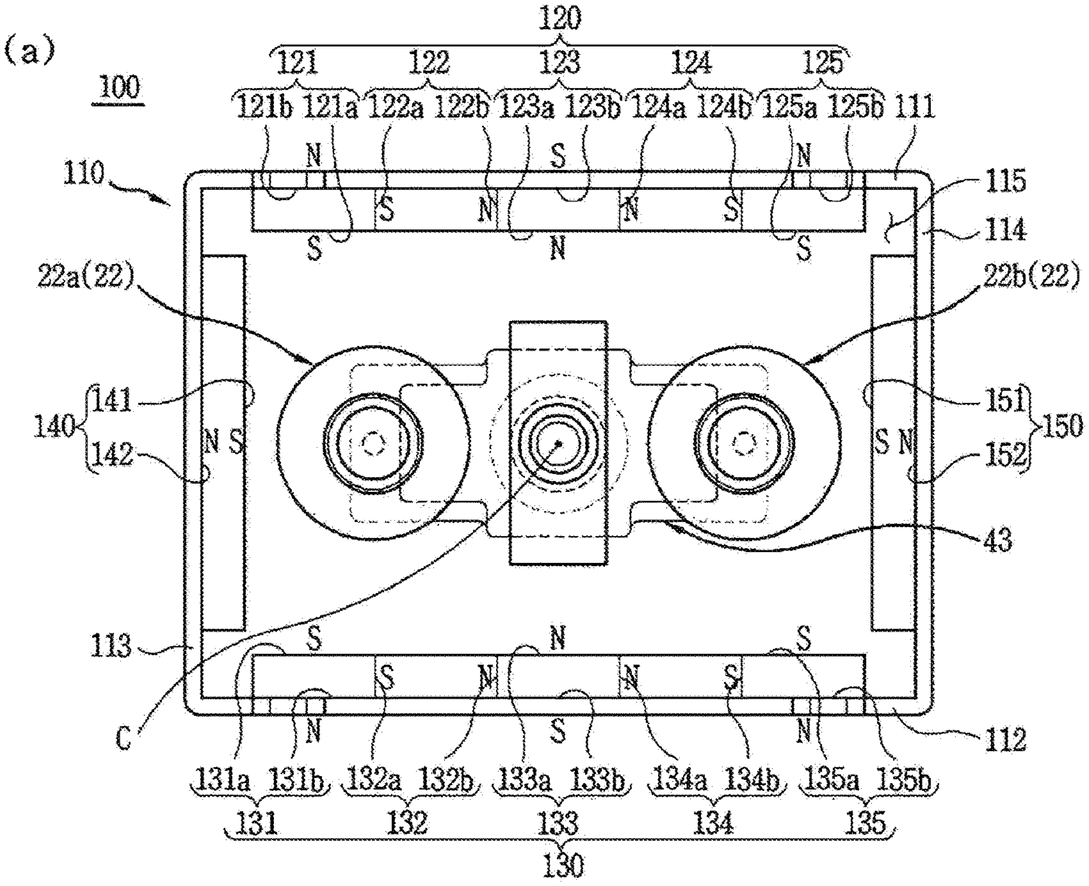
FIGS. 5 to 7 are conceptual views illustrating the arc path generation unit according to an exemplary embodiment of the present disclosure.
Figure 5:
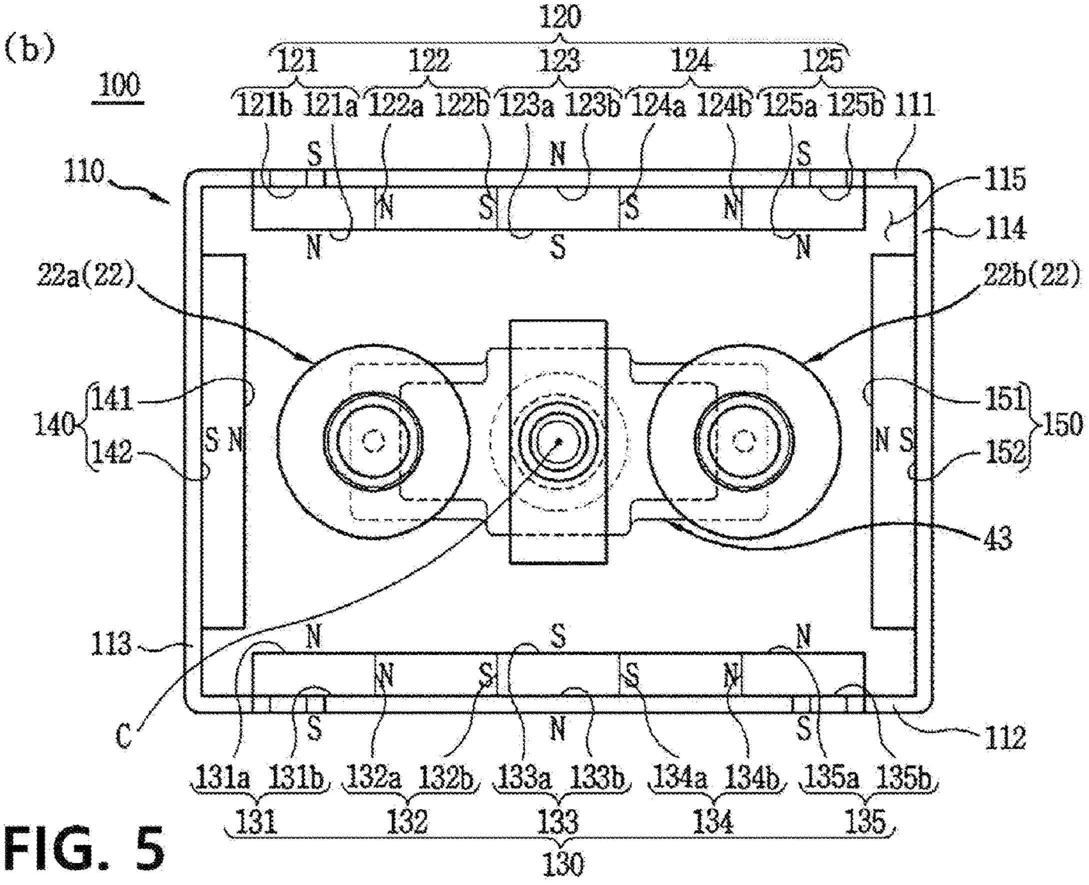
Figure 6:
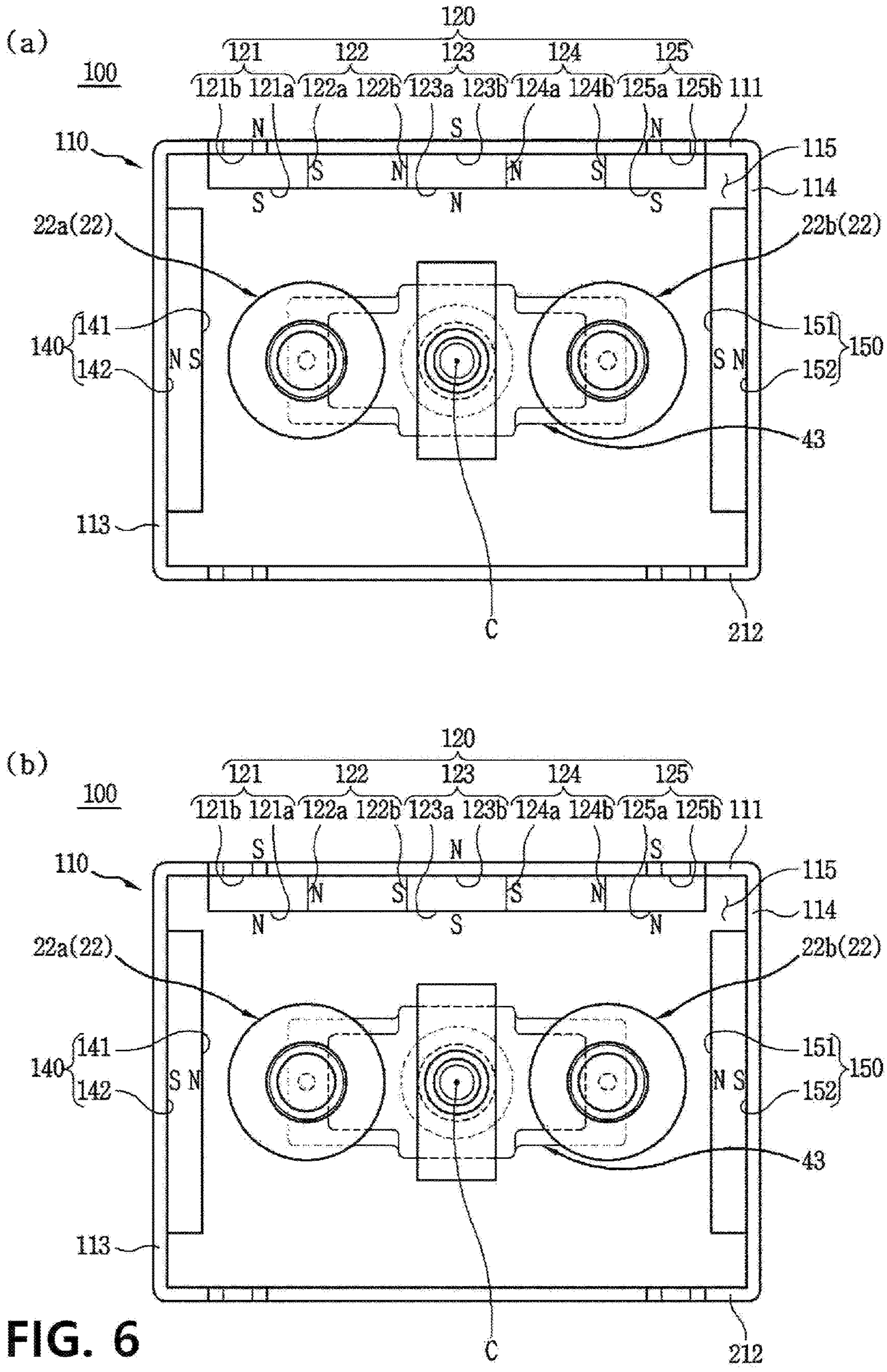
Figure 7:
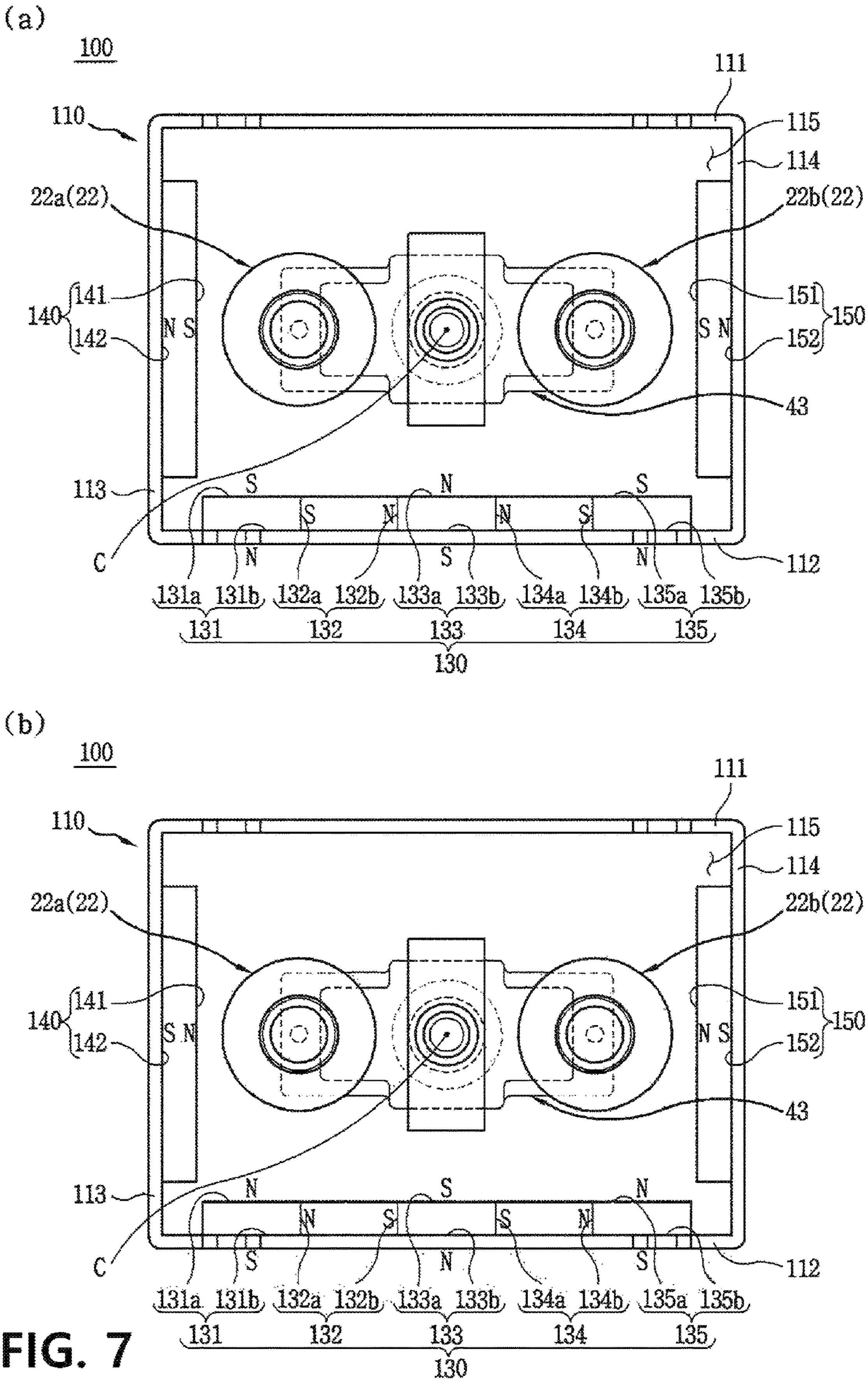

Referring to FIGS. 5 to 7, the arc path generation unit 100 according to the illustrated exemplary embodiment includes a magnetic frame 110, a first Halbach array 120, and a second Halbach array 130, a first magnet part 140 and a second magnet part 150.

The magnetic frame 110 forms a skeleton of the arc path generation unit 100. A first Halbach array 120, a second Halbach array 130, a first magnet part 140 and a second magnet part 150 are disposed in the magnetic frame 110. In an exemplary embodiment, the first Halbach array 120, the second Halbach array 130, the first magnet part 140 and the second magnet part 150 may be coupled to the magnetic frame 110.

The magnetic frame 110 has a rectangular cross-section extending in the longitudinal direction, which is the left-right direction in the illustrated exemplary embodiment. The shape of the magnetic frame 110 may be changed according to the shapes of the upper frame 11 and the arc chamber 21.

The magnetic frame 110 includes a first surface 111, a second surface 112, a third surface 113, a fourth surface 114 and a space part 115.

The first surface 111, the second surface 112, the third surface 113 and the fourth surface 114 form an outer peripheral surface of the magnetic frame 110. That is, the first surface 111, the second surface 112, the third surface 113 and the fourth surface 114 function as walls of the magnetic frame 110.

The outer side of the first surface 111, the second surface 112, the third surface 113 and the fourth surface 114 may be in contact with or fixedly coupled to the inner surface of the upper frame 11. In addition, on the inner side of the first surface 111, the second surface 112, the third surface 113 and the fourth surface 114, the first Halbach array 120, the second Halbach array 130, the first magnet part 140 and the second magnet part 150 may be positioned.

In the illustrated exemplary embodiment, the first side 111 forms the rear side surface. The second surface 112 forms a front side surface and faces the first surface 111. In addition, the third surface 113 forms the left side surface. The fourth surface 114 forms the right side surface and faces the third surface 113.

That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an exemplary embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an exemplary embodiment, the predetermined angle may be a right angle.

Each edge at which the first surface 111 to the fourth surface 114 are connected to each other may be tapered.

For the coupling of each of the surfaces 111, 112, 113, 114 with the first and second Halbach arrays 120, 130 and the first and second magnet parts 140, 150, a fastening member (not illustrated) may be provided.

Although not illustrated, an arc discharge hole (not illustrated) may be formed through at least one of the first surface 111, the second surface 112, the third surface 113 and the fourth surface 114. The arc discharge hole (not illustrated) may function as a passage through which the arc generated in the space part 115 is discharged.

The space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or a direction away from the fixed contact 22 (i.e., an upward direction).

In addition, the path (A.P) of the arc generated in the arc chamber 21 is formed in the space part 115. This is achieved by the magnetic field formed by the first Halbach array 120, the second Halbach array 130, the first magnet part 140 and the second magnet part 150.

A central portion of the space part 115 may be defined as a center (C). The straight-line distances from each edge where the first to fourth surfaces 111, 112, 113, 114 are connected to each other to the center (C) may be formed to be the same.

The center (C) is positioned between the first fixed contact 22*a* and the second fixed contact 22*b*. In addition, the central portion of the movable contact part 40 is positioned vertically below the center (C). That is, the central portions of the housing 41, the cover 42, the movable contact 43, the shaft 44 and the elastic part 45 are positioned vertically below the center (C).

Accordingly, when the generated arc is moved toward the center (C), the above components may be damaged. In order to prevent this, the arc path generation unit 100 according to the present exemplary embodiment includes a first Halbach array 120, a second Halbach array 130, a first magnet part 140 and a second magnet part 150.

In the illustrated exemplary embodiment, a plurality of magnetic materials constituting the first Halbach array 120 are sequentially arranged side by side from left to right. That is, in the illustrated exemplary embodiment, the first Halbach array 120 is formed to extend in the left-right direction.

The first Halbach array 120 may form a magnetic field together with other magnetic materials. In the illustrated exemplary embodiment, the first Halbach array 120 may form a magnetic field together with the second Halbach array 130 and the first and second magnet parts 140, 150.

The first Halbach array 120 may be positioned adjacent to any one surface of the first and second surfaces 111, 112. In an exemplary embodiment, the first Halbach array 120 may be coupled to the inner side of the any one surface (i.e., a direction toward the space part 115).

In the exemplary embodiment illustrated in FIGS. 5 and 6, the first Halbach array 120 is disposed on the inner side of the first surface 111, adjacent to the first surface 111, so as to face the second Halbach array 130 which is positioned on the inner side of the second surface 112.

Between the first Halbach array 120 and the second Halbach array 130, the space part 115 and the fixed contact 22 and the movable contact 43 accommodated in the space part 115 are positioned.

The first Halbach array 120 may be positioned at a central portion of the first surface 111. In other words, the shortest distance between the first Halbach array 120 and the third surface 113 and the shortest distance between the first Halbach array 120 and the fourth surface 114 may be the same.

The first Halbach array 120 may enhance the strength of the magnetic field formed by itself and the magnetic field formed with the second Halbach array 130 and the first and second magnet parts 140, 150. Since the direction of the magnetic field formed by the first Halbach array 120 and the process of strengthening the magnetic field are well-known techniques, the detailed description thereof will be omitted.

In the illustrated exemplary embodiment, the first Halbach array 120 includes a first block 121, a second block 122, a third block 123, a fourth block 124 and a fifth block 125. It will be understood that the plurality of magnetic materials constituting the first Halbach array 120 are each named blocks 121, 122, 123, 124, 125, respectively.

The first to fifth blocks 121, 122, 123, 124, 125 may be formed of a magnetic material. In an exemplary embodiment, the first to fifth blocks 121, 122, 123, 124, 125 may be provided as permanent magnets or electromagnets.

The first to fifth blocks 121, 122, 123, 124, 125 may be arranged side by side in one direction. In the illustrated exemplary embodiment, the first to fifth blocks 121, 122, 123, 124, 125 are arranged side by side in the extending direction of the first surface 111, that is, in the left-right direction.

The first block 121 is positioned on the leftmost side. That is, the first block 121 is positioned adjacent to the third surface 113. In addition, the fifth block 125 is positioned on the rightmost side. That is, the fifth block 125 is positioned adjacent to the fourth surface 114.

The second to fourth blocks 122, 123, 124 are arranged side by side in order from left to right between the first block 121 and the fifth block 125. That is, the first to fifth blocks 121, 122, 123, 124, 125 are arranged side by side in order from left to right.

In an exemplary embodiment, each of the blocks 121, 122, 123, 124, 125 adjacent to each other may contact each other.

The first block 121 may be disposed to overlap the first fixed contact 22*a* and the first block 131 of the second Halbach array 130 in a direction toward the second Halbach array 130 or the space part 115, which is the front-rear direction in the illustrated exemplary embodiment.

The third block 123 may be disclosed to overlap the third block 133 and the center (C) of the second Halbach array 130 in a direction toward the second Halbach array 130 or the space part 115, which is the front-rear direction in the illustrated exemplary embodiment.

The fifth block 125 may be disposed to overlap the second fixed contact **22*b* and the fifth block 135 of the second Halbach array 130 in a direction toward the second Halbach array 130 or the space part 115**, which is the front-rear direction in the illustrated exemplary embodiment.

Each of the blocks 121, 122, 123, 124, 125 includes a plurality of surfaces.

Specifically, the first block 121 includes a first inner surface **121*a* facing the space part 115 or the second Halbach array 130 and a first outer surface 121*b* opposite to the space part 115 or the second Halbach array 130**.

The second block 122 includes a second inner surface **122*a* facing the first block 121 and a second outer surface 122*b* facing the third block 123. It will be understood that the second inner surface 122*a* and the second outer surface 122*b*** are positioned opposite to each other.

The third block 123 includes a third inner surface **123*a* facing the space part 115 or the second Halbach array 130 and a third outer surface 123*b* opposite to the space part 115 or the second Halbach array 130**.

The fourth block 124 includes a fourth inner surface **124*a* facing the third block 123 and a fourth outer surface 124*b* facing the fifth block 125. It will be understood that the fourth inner surface 124*a* and the fourth outer surface 124*b*** are positioned opposite to each other.

The fifth block 125 includes a fifth inner surface **125*a* facing the space part 115 or the second Halbach array 130 and a fifth outer surface 125*b* opposite to the space part 115 or the second Halbach array 130**.

The plurality of surfaces of each of the blocks 121, 122, 123, 124, 125 may be magnetized according to a predetermined rule to constitute a Halbach array.

Specifically, the first, second and fifth inner surfaces **121*a*, 122*a*, 125*a*, and the third and fourth outer surfaces 123*b*, 124*b*** may be magnetized with the same polarity.

Similarly, the third and fourth inner surfaces **123*a*, 124*a* and the first, second and fifth outer surfaces 121*b*, 122*b*, 125*b*** may be magnetized with a polarity different from the polarity.

In this case, the first, second and fifth inner surfaces **121*a*, 122*a*, 125*a*, and the third and fourth outer surfaces 123*b*, 124*b* may be magnetized with the same polarity as the first, second and fifth inner surfaces 131*a*, 132*a*, 135*a* and the third and fourth outer surfaces 133*b*, 134*b***.

Similarly, the third and fourth inner surfaces **123*a*, 124*a*, and the first, second and fifth outer surfaces 121*b*, 122*b*, 125*b* may be magnetized with the same polarity as the third and fourth inner surfaces 133*a*, 134*a* and the first, second and fifth outer surfaces 131*b*, 132*b*, 135*b* of the second Halbach array 130**.

In addition, the first, second and fifth inner surfaces **121*a*, 122*a*, 125*a*, and the third and fourth outer surfaces 123*b*, 124*b* may be magnetized with the same polarity as the first opposing surface 141 of the first magnet part 140 and the second opposing surface 151 of the second magnet part 150**.

Similarly, the third and fourth inner surfaces **123*a*, 124*a* and the first, second and fifth outer surfaces 121*b*, 122*b*, 125*b* may be magnetized with the same polarity as the first opposite surface 142 of the first magnet part 140 and the second opposite surface 152 of the second magnet part 150**.

In the illustrated exemplary embodiment, a plurality of magnetic materials constituting the second Halbach array 130 are sequentially arranged side by side from left to right. That is, in the illustrated exemplary embodiment, the second Halbach array 130 is formed to extend in the left-right direction.

The second Halbach array 130 may form a magnetic field together with other magnetic materials. In the illustrated exemplary embodiment, the second Halbach array 130 may form a magnetic field together with the first Halbach array 120 and the first and second magnet parts 140, 150.

The second Halbach array 130 may be positioned adjacent to the other one surface of the first and second surfaces 111, 112. In an exemplary embodiment, the second Halbach array 130 may be coupled to the inner side of the other one surface (i.e., a direction toward the space part 115).

In the exemplary embodiment illustrated in FIGS. 5 and 7, the second Halbach array 130 is disposed on the inner side of the second surface 112, adjacent to the second surface 112, so as to face the first Halbach array 120 which is positioned on the inner side of the first surface 111.

Between the second Halbach array 130 and the first Halbach array 120, the space part 115 and the fixed contact 22 and the movable contact 43 accommodated in the space part 115 are positioned.

The second Halbach array 130 may be positioned at a central portion of the second surface 112. In other words, the shortest distance between the second Halbach array 130 and the third surface 113 and the shortest distance between the second Halbach array 130 and the fourth surface 114 may be the same.

The second Halbach array 130 may enhance the strength of the magnetic field formed by itself and the magnetic field formed with the first Halbach array 120 and the first and second magnet parts 140, 150. Since the direction of the magnetic field formed by the second Halbach array 130 and the process of strengthening the magnetic field are well-known techniques, the detailed description thereof will be omitted.

In the illustrated exemplary embodiment, the second Halbach array 130 includes a first block 131, a second block 132, a third block 133, a fourth block 134 and a fifth block 135. It will be understood that the plurality of magnetic materials constituting the second Halbach array 130 are each named blocks 131, 132, 133, 134, 135, respectively.

The first to fifth blocks 131, 132, 133, 134, 135 may be formed of a magnetic material. In an exemplary embodiment, the first to fifth blocks 131, 132, 133, 134, 135 may be provided as permanent magnets or electromagnets.

The first to fifth blocks 131, 132, 133, 134, 135 may be arranged side by side in one direction. In the illustrated exemplary embodiment, the first to fifth blocks 131, 132, 133, 134, 135 are arranged side by side in the extending direction of the second surface 112, that is, in the left-right direction.

The first block 131 is positioned on the leftmost side. That is, the first block 131 is positioned adjacent to the third surface 113. In addition, the fifth block 135 is positioned on the rightmost side. That is, the fifth block 135 is positioned adjacent to the fourth surface 114.

The second to fourth blocks 132, 133, 134 are arranged side by side in order from left to right between the first block 131 and the fifth block 135. That is, the first to fifth blocks 131, 132, 133, 134, 135 are arranged side by side in order from left to right.

In an exemplary embodiment, each of the blocks 131, 132, 133, 134, 135 adjacent to each other may contact each other.

The first block 131 may be disposed to overlap the first fixed contact 22*a* and the first block 121 of the first Halbach array 120 in a direction toward the first Halbach array 120 or the space part 115, which is the front-rear direction in the illustrated exemplary embodiment.

The third block 133 may be disposed to overlap the third block 123 and the center (C) of the first Halbach array 120 in a direction toward the first Halbach array 120 or the space part 115, which is the front-rear direction in the illustrated exemplary embodiment.

The fifth block 135 may be disposed to overlap the second fixed contact 22*b* and the fifth block 135 of the first Halbach array 120 in a direction toward the first Halbach array 120 or the space part 115, which is the front-rear direction in the illustrated exemplary embodiment.

Each of the blocks 131, 132, 133, 134, 135 includes a plurality of surfaces.

Specifically, the first block 131 includes a first inner surface 131*a* facing the space part 115 or the first Halbach array 120 and a first outer surface 131*b* opposite to the space part 115 or the first Halbach array 120.

The second block 132 includes a second inner surface 132*a* facing the first block 131 and a second outer surface 132*b* facing the third block 133. It will be understood that the second inner surface 132*a* and the second outer surface 132*b* are positioned opposite to each other.

The third block 133 includes a third inner surface 133*a* facing the space part 115 or the first Halbach array 120 and a third outer surface 133*b* opposite to the space part 115 or the first Halbach array 120.

The fourth block 134 includes a fourth inner surface 134*a* facing the third block 133 and a fourth outer surface 134*b* facing the fifth block 135. It will be understood that the fourth inner surface 134*a* and the fourth outer surface 134*b* are positioned opposite to each other.

The fifth block 135 includes a fifth inner surface 135*a* facing the space part 115 or the first Halbach array 120 and a fifth outer surface 135*b* opposite to the space part 115 or the first Halbach array 120.

The plurality of surfaces of each of the blocks 131, 132, 133, 134, 135 may be magnetized according to a predetermined rule to constitute a Halbach array.

Specifically, the first, second and fifth inner surfaces 131*a*, 132*a*, 135*a*, and the third and fourth outer surfaces 133*b*, 134*b* may be magnetized with the same polarity.

Similarly, the third and fourth inner surfaces 133*a*, 134*a* and the first, second, and fifth outer surfaces 131*b*, 132*b*, 135*b* may be magnetized with a polarity different from the polarity.

In this case, the first, second and fifth inner surfaces 131*a*, 132*a*, 135*a*, and the third and fourth outer surfaces 133*b*, 134*b* may be magnetized with the same polarity as the first, second and fifth inner surfaces 121*a*, 122*a*, 125*a* and the third and fourth outer surfaces 123*b*, 124*b*.

Similarly, the third and fourth inner surfaces 133*a*, 134*a*, and the first, second and fifth outer surfaces 131*b*, 132*b*, 135*b* may be magnetized with the same polarity as the third and fourth inner surfaces 123*a*, 124*a* and the first, second and fifth outer surfaces 121*b*, 122*b*, 125*b* of the first Halbach array 120.

In addition, the first, second and fifth inner surfaces 131*a*, 132*a*, 135*a*, and the third and fourth outer surfaces 133*b*, 134*b* may be magnetized with the same polarity as the first opposing surface 141 of the first magnet part 140 and the second opposing surface 151 of the second magnet part 150.

Similarly, the third and fourth inner surfaces 133*a*, 134*a* and the first, second and fifth outer surfaces 131*b*, 132*b*, 135*b* may be magnetized with the same polarity as the first opposite surface 142 of the first magnet part 140 and the second opposite surface 152 of the second magnet part 150.

One or more of the first Halbach array 120 and the second Halbach array 130 may be provided. That is, in the exemplary embodiment illustrated in FIG. 5, all of the first and second Halbach arrays 120, 130 are provided.

In the exemplary embodiment illustrated in FIG. 6, only the first Halbach array 120 is provided. Further, in the exemplary embodiment illustrated in FIG. 7, only the second Halbach array 130 may be provided.

The first and second magnet parts 140, 150 form a magnetic field by themselves or together with the first and second Halbach arrays 120, 130 and different magnet parts 140, 150. An arc path (A.P) may be formed inside the arc chamber 21 by the magnetic field formed by the first and second magnet parts 140, 150.

The first and second magnet parts 140, 150 may be provided in any shape capable of forming a magnetic field by being magnetized. In an exemplary embodiment, the first and second magnet parts 140, 150 may be provided as permanent magnets or electromagnets.

The first and second magnet parts 140, 150 may be positioned adjacent to any one surface of the first to fourth surfaces 111, 112, 113, 114, respectively.

In the illustrated exemplary embodiment, the first magnet part 140 is positioned adjacent to the third surface 113. The second magnet part 150 is positioned adjacent to the fourth surface 114. The first magnet part 140 and the second magnet part 150 are disposed to face each other with the space part 115 interposed therebetween.

The first magnet part 140 and the second magnet part 150 are formed to extend in one direction. In the illustrated exemplary embodiment, the first magnet part 140 and the second magnet part 150 are formed to extend in the front-rear direction.

The first and second magnet parts 140, 150 respectively include a plurality of surfaces.

Specifically, the first magnet part 140 includes a first opposing surface 141 facing the space part 115 or fixed contact 22 and a first opposite surface 142 opposite to the space part 115 or the fixed contact 22.

The second magnet part 150 includes a second opposing surface 151 facing the space part 115 or the fixed contact 22 and a second opposite surface 152 facing the space part 115 or the fixed contact 22.

Each surface of the first and second magnet parts 140, 150 may be magnetized according to a predetermined rule.

Specifically, the first opposing surface 141 and the second opposing surface 151 may be magnetized with the same polarity. In this case, the first opposing surface 141 and the second opposing surface 151 may be magnetized with the same polarity as the first and fifth inner surfaces 121*a*, 125*a* of the first Halbach array 120. In addition, the first opposing surface 141 and the second opposing surface 151 may be magnetized with the same polarity as the first and fifth inner surfaces 131*a*, 135*a* of the second Halbach array 130.

Similarly, the first opposite surface 142 and the second opposite surface 152 may be magnetized with the same polarity. In this case, the first opposite surface 142 and the second opposite surface 152 may be magnetized with the same polarity as the third inner surface 123*a* of the first Halbach array 120. In addition, the first opposite surface 142 and the second opposite surface 152 may be magnetized with the same polarity as the third inner surface 133*a* of the second Halbach array 130.

Hereinafter, the arc path (A.P) formed by the arc path generation unit 100 according to the present exemplary embodiment will be described in detail with reference to FIG. 8.

Figure 8:
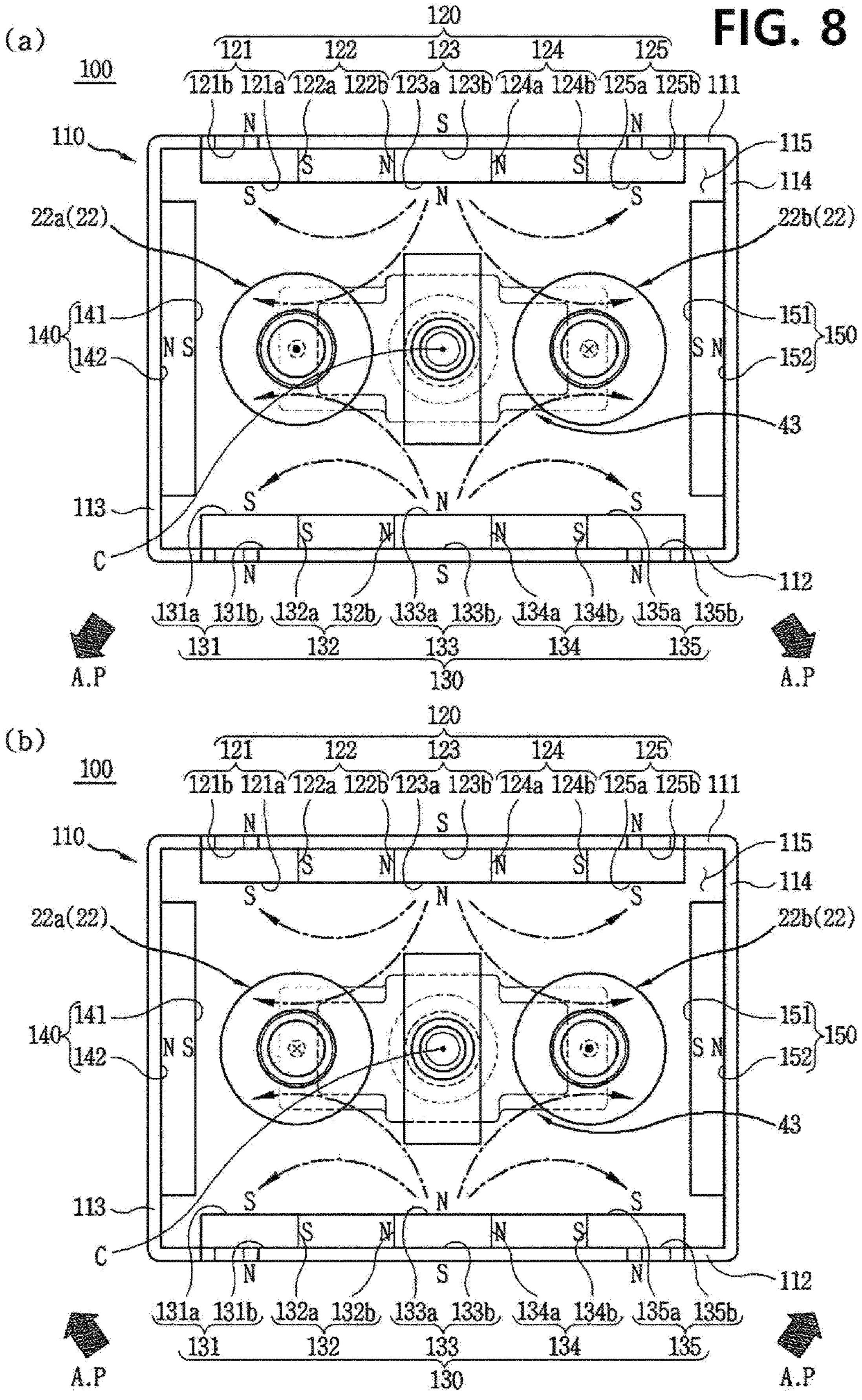
FIG. 8 is a conceptual view illustrating the paths of a magnetic field and an arc formed by the arc path generation unit according to the exemplary embodiment of FIGS. 5 to 7.

Referring to FIG. 8, the first and fifth inner surfaces 121*a*, 125*a* of the first Halbach array 120 are magnetized to the S pole. In addition, the third inner surface 123*a* is magnetized to the N pole.

According to the above rule, the first and fifth inner surfaces 131*a*, 135*a* of the second Halbach array 130 are magnetized to the S pole. In addition, the third inner surface 123*b* is magnetized to the S pole.

Furthermore, according to the above rule, the first opposing surface 141 of the first magnet part 140 and the second opposing surface 151 of the second magnet part 150 are magnetized to the S pole.

Accordingly, in the first Halbach array 120, a magnetic field in a direction from the third inner surface 123*a* toward the first and fifth inner surfaces 121*a*, 125*a* is formed. Similarly, in the second Halbach array 130, a magnetic field in a direction from the third inner surface 133*a* toward the first and fifth inner surfaces 131*a*, 135*a* is formed.

Accordingly, a magnetic field in a direction to repel each other is formed between the first Halbach array 120 and the second Halbach array 130.

Between the first Halbach array 120 and the first and second magnet parts 140, 150, a magnetic field in a direction from the third inner surface 123*a* toward each of the opposing surfaces 141, 151 is formed.

Between the second Halbach array 130 and the first and second magnet parts 140, 150, a magnetic field in a direction from the third inner surface 133*a* toward each of the opposing surfaces 141, 151 is formed.

In the exemplary embodiment illustrated in (a) of FIG. 8, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 8, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 120, 130 and the first and second magnet parts 140, 150 is changed, the directions of the magnetic fields formed by each of the Halbach arrays 120, 130 and each of the magnet parts 140, 150 become reversed. Accordingly, the path (A.P) of the generated electromagnetic force and arc is also formed to be reversed in the front-rear direction.

That is, in the energized situation as shown in (a) of FIG. 8, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 8, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Accordingly, regardless of the polarity of the first and second Halbach arrays 120, 130 and the first and second magnet parts 140, 150 or the direction of the current flowing through the direct current relay 1, the arc path generation unit 100 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(2) Description of the Arc Path Generation Unit 200 According to Another Exemplary Embodiment of the Present Disclosure Hereinafter, the arc path generation unit 200 according to another exemplary embodiment of the present disclosure will be described in detail with reference to FIGS. 9 to 12.

Figure 9:
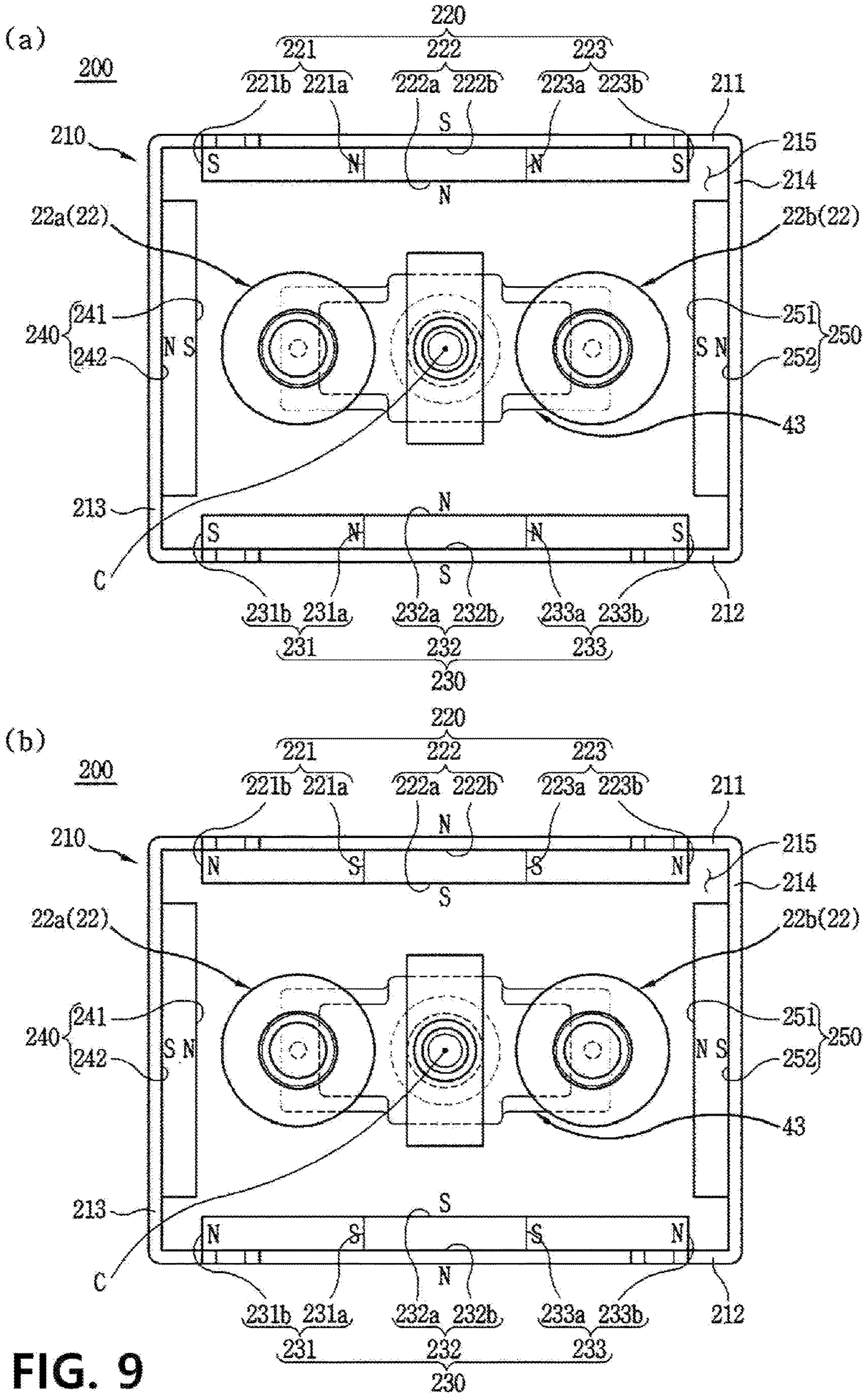
FIGS. 9 to 11 are conceptual views illustrating the arc path generation unit according to another exemplary embodiment of the present disclosure.
Figure 10:
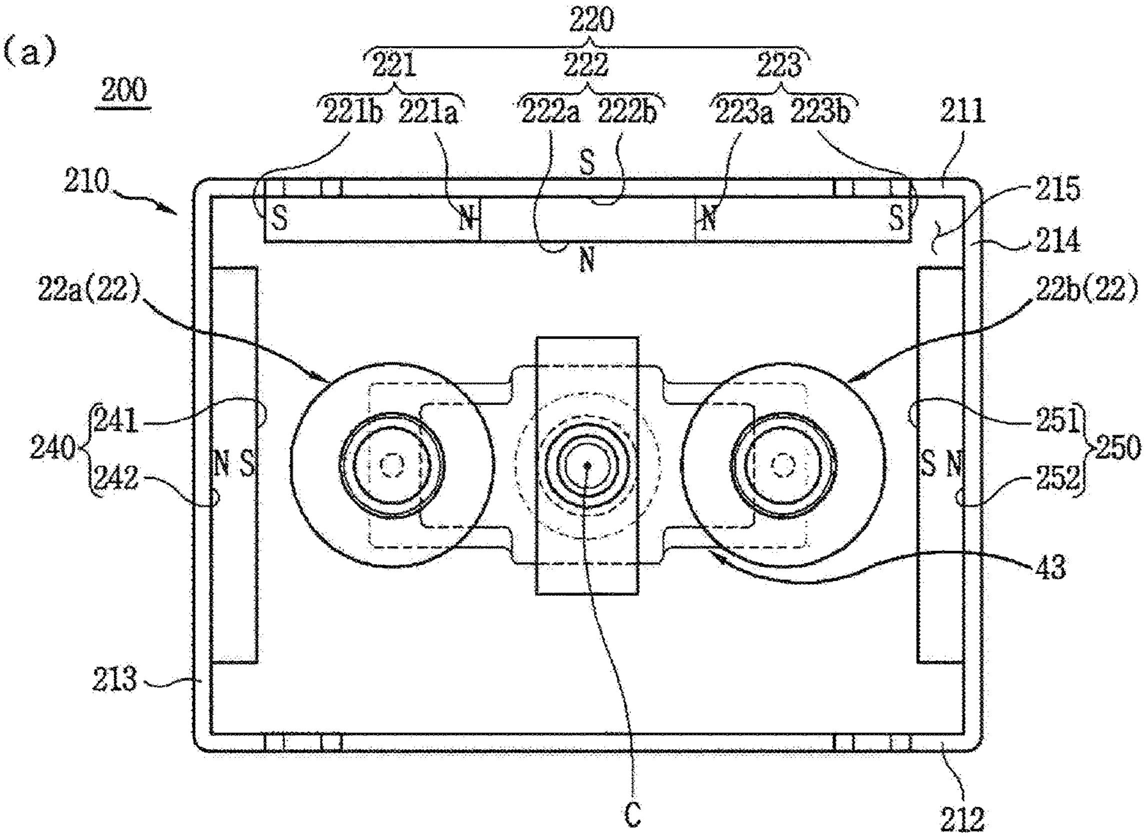
Figure 10:
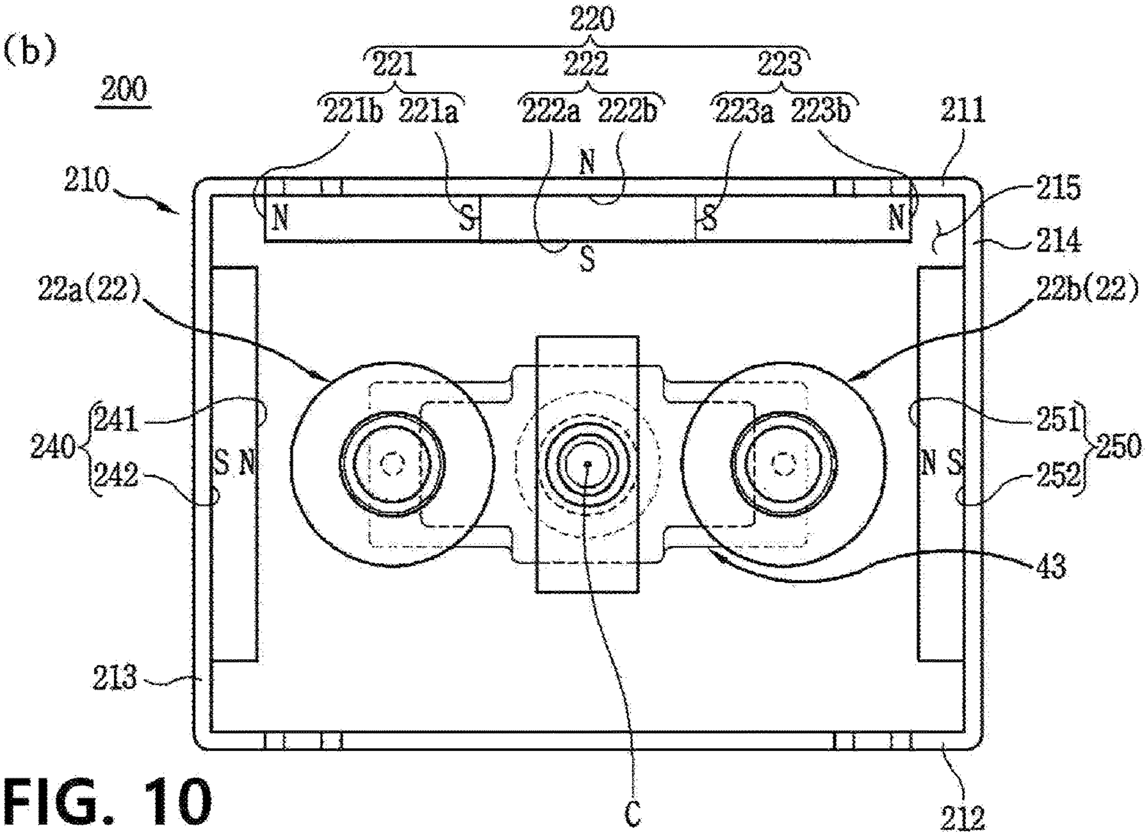
Figure 11:
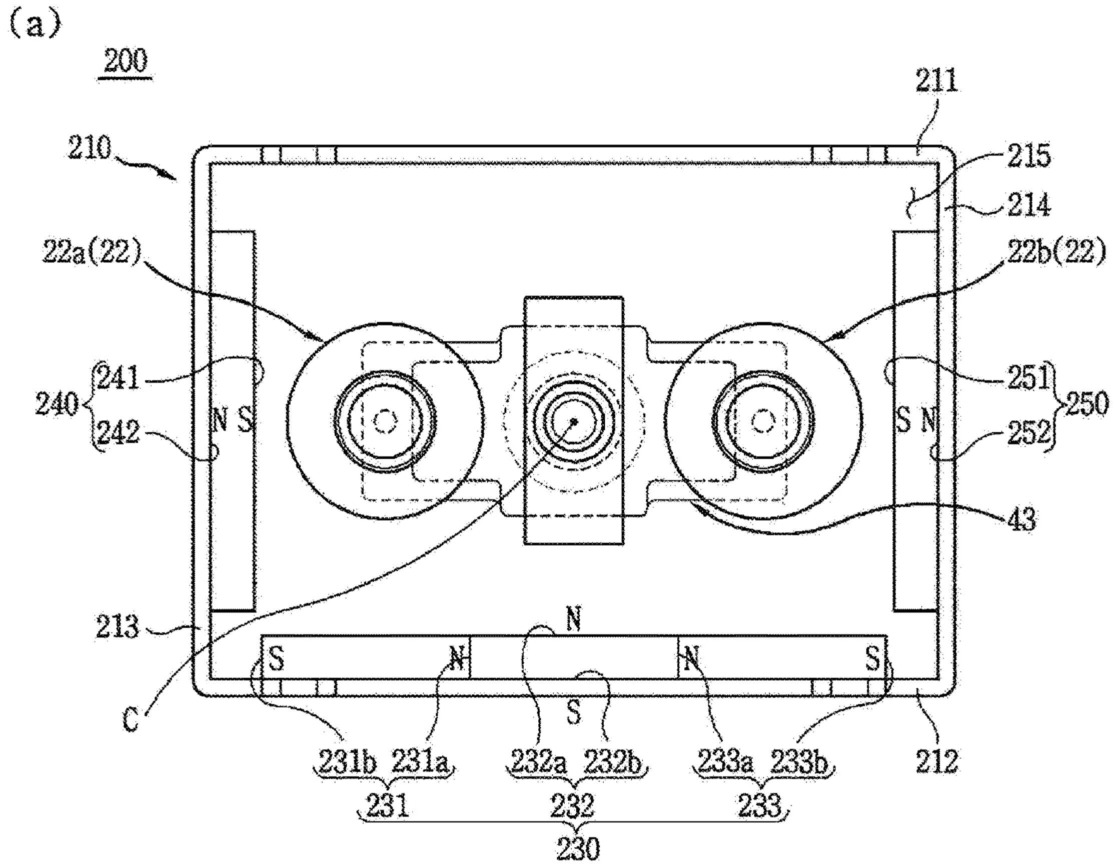
Figure 11:
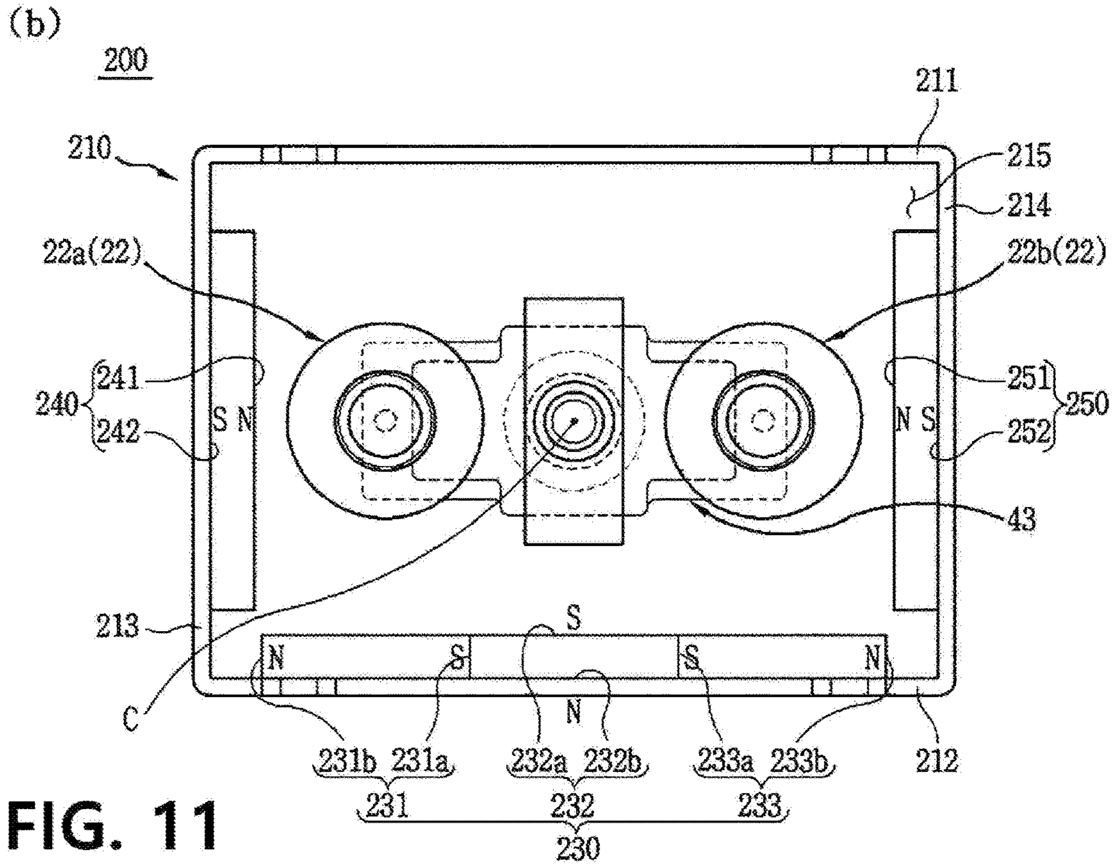

Referring to FIGS. 9 to 11, the arc path generation unit 200 according to the illustrated exemplary embodiment includes a magnetic frame 210, a first Halbach array 220, a second Halbach array 230, a first magnet part 240 and a second magnet part 250.

The magnetic frame 210 according to the present exemplary embodiment has the same structure and function as the magnetic frame 210 according to the above-described exemplary embodiment. However, there is a difference in the arrangement method of the first Halbach array 220, the second Halbach array 230, the first magnet part 240 and the second magnet part 250 disposed on the magnetic frame 210 according to the present exemplary embodiment.

Accordingly, the description of the magnetic frame 210 will be replaced with the description of the magnetic frame 210 according to the above-described exemplary embodiment.

In the illustrated exemplary embodiment, a plurality of magnetic materials constituting the first Halbach array 220 are sequentially arranged side by side from left to right. That is, in the illustrated exemplary embodiment, the first Halbach array 220 is formed to extend in the left-right direction.

The first Halbach array 220 may form a magnetic field together with other magnetic materials. In the illustrated exemplary embodiment, the first Halbach array 220 may form a magnetic field together with the second Halbach array 230 and the first and second magnet parts 240, 250.

The first Halbach array 220 may be positioned adjacent to any one surface of the first and second surfaces 211, 212. In an exemplary embodiment, the first Halbach array 220 may be coupled to the inner side of the any one surface (i.e., a direction toward the space part 215).

In the exemplary embodiment illustrated in FIGS. 9 and 10, the first Halbach array 220 is disposed on the inner side of the first surface 211, adjacent to the first surface 211, so as to face the second Halbach array 230 which is positioned on the inner side of the second surface 212.

Between the first Halbach array 220 and the second Halbach array 230, the space part 215 and the fixed contact 22 and the movable contact 43 accommodated in the space part 215 are positioned.

The first Halbach array 220 may be positioned at a central portion of the first surface 211. In other words, the shortest distance between the first Halbach array 220 and the third surface 213 and the shortest distance between the first Halbach array 220 and the fourth surface 214 may be the same.

The first Halbach array 220 may enhance the strength of the magnetic field formed by itself and the magnetic field formed with the second Halbach array 230 and the first and second magnet parts 240, 250. Since the direction of the magnetic field formed by the first Halbach array 220 and the process of strengthening the magnetic field are well-known techniques, the detailed description thereof will be omitted.

In the illustrated exemplary embodiment, the first Halbach array 220 includes a first block 221, a second block 222 and a third block 223. It will be understood that a plurality of magnetic materials constituting the first Halbach array 220 are each named blocks 221, 222, 223, respectively.

The first to third blocks 221, 222, 223 may be formed of a magnetic material. In an exemplary embodiment, the first to third blocks 221, 222, 223 may be provided as permanent magnets or electromagnets.

The first to third blocks 221, 222, 223 may be arranged side by side in one direction. In the illustrated exemplary embodiment, the first to third blocks 221, 222, 223 are arranged side by side in the extending direction of the first surface 211, that is, in the left-right direction.

The first block 221 is positioned on the leftmost side. That is, the first block 221 is positioned adjacent to the third surface 213. In addition, the third block 223 is positioned on the rightmost side. That is, the third block 223 is positioned adjacent to the fourth surface 214. The second block 222 is positioned between the first block 221 and the third block 223.

That is, the first to third blocks 221, 222, 223 are arranged side by side in order from left to right.

In an exemplary embodiment, each of the blocks 221, 222, 223 adjacent to each other may contact each other.

The first block 221 may be disposed to overlap the first fixed contact 22*a* and the first block 231 of the second Halbach array 230 in a direction toward the second Halbach array 230 or the space part 215, which is the front-rear direction in the illustrated exemplary embodiment.

The second block 222 may be disposed to overlap the center (C) and the second block 232 of the second Halbach array 230 in a direction toward the second Halbach array 230 or the space part 215, which is the front-rear direction in the illustrated exemplary embodiment.

The third block 223 may be disposed to overlap the second fixed contact 22*b* and the third block 233 of the second Halbach array 230 in a direction toward the second Halbach array 230 or the space part 215, which is the front-rear direction in the illustrated exemplary embodiment.

Each of the blocks 221, 222, 223 includes a plurality of surfaces.

Specifically, the first block 221 includes a first inner surface 221*a* facing the second block 222 and a first outer surface 221*b* opposite to the second block 222.

The second block 222 includes a second inner surface 222*a* facing the space part 215 or the second Halbach array 230 and a second outer surface 222*b* opposite to the space part 215 or the second Halbach array 230.

The third block 223 includes a third inner surface 223*a* facing the second block 222 and a third outer surface 223*b* opposite to the second block 222.

The plurality of surfaces of each of the blocks 221, 222, 223 may be magnetized according to a predetermined rule to constitute a Halbach array.

Specifically, the first to third inner surfaces 221*a*, 222*a*, 223*a* may be magnetized with the same polarity. Similarly, the first to third outer surfaces 221*b*, 222*b*, 223*b* may be magnetized with a polarity different from the polarity.

In this case, the first to third inner surfaces 221*a*, 222*a*, 223*a* may be magnetized with the same polarity as the first to third inner surfaces 231*a*, 232*a*, 233*a* of the second Halbach array 230.

Furthermore, the first to third inner surfaces 221*a*, 222*a*, 223*a* may be magnetized with the same polarity as the opposing surfaces 241, 251 of the first and second magnet parts 240, 250.

In the illustrated exemplary embodiment, a plurality of magnetic materials constituting the second Halbach array 230 are sequentially arranged side by side from left to right. That is, in the illustrated exemplary embodiment, the second Halbach array 230 is formed to extend in the left-right direction.

The second Halbach array 230 may form a magnetic field together with other magnetic materials. In the illustrated exemplary embodiment, the second Halbach array 230 may form a magnetic field together with the first Halbach array 220 and the first and second magnet parts 240, 250.

The second Halbach array 230 may be positioned adjacent to the other one surface of the first and second surfaces 211, 212. In an exemplary embodiment, the second Halbach array 230 may be coupled to the inner side of the other one surface (i.e., a direction toward the space part 215).

In the exemplary embodiment illustrated in FIGS. 9 and 11, the second Halbach array 230 is disposed on the inner side of the second surface 212, adjacent to the second surface 212, so as to face the first Halbach array 220 which is positioned on the inner side of the first surface 211.

Between the second Halbach array 230 and the first Halbach array 220, the space part 215 and the fixed contact 22 and the movable contact 43 accommodated in the space part 215 are positioned.

The second Halbach array 230 may be positioned at a central portion of the second surface 212. In other words, the shortest distance between the second Halbach array 230 and the third surface 213 and the shortest distance between the second Halbach array 230 and the fourth surface 214 may be the same.

The second Halbach array 230 may enhance the strength of the magnetic field formed by itself and the magnetic field formed with the first Halbach array 220 and the first and second magnet parts 240, 250. Since the direction of the magnetic field formed by the second Halbach array 230 and the process of strengthening the magnetic field are well-known techniques, the detailed description thereof will be omitted.

In the illustrated exemplary embodiment, the second Halbach array 230 includes a first block 231, a second block 232 and a third block 233. It will be understood that a plurality of magnetic materials constituting the second Halbach array 230 are each named blocks 231, 232, 233, respectively.

The first to third blocks 231, 232, 233 may be formed of a magnetic material. In an exemplary embodiment, the first to third blocks 231, 232, 233 may be provided as permanent magnets or electromagnets.

The first to third blocks 231, 232, 233 may be arranged side by side in one direction. In the illustrated exemplary embodiment, the first to third blocks 231, 232, 233 are arranged side by side in the extending direction of the first surface 211, that is, in the left-right direction.

The first block 231 is positioned on the leftmost side. That is, the first block 231 is positioned adjacent to the third surface 213. In addition, the third block 233 is positioned on the rightmost side. That is, the third block 233 is positioned adjacent to the fourth surface 214. The second block 232 is positioned between the first block 231 and the third block 233.

That is, the first to third blocks 231, 232, 233 are sequentially arranged side by side from left to right.

In an exemplary embodiment, each of the blocks 231, 232, 233 adjacent to each other may contact each other.

The first block 231 may be disposed to overlap the first fixed contact 22*a* and the first block 221 of the first Halbach array 220 in a direction toward the first Halbach array 220 or the space part 215, which is the front-rear direction in the illustrated exemplary embodiment.

The second block 232 may be disposed to overlap the center (C) and the second block 222 of the first Halbach array 220 in a direction toward the first Halbach array 220 or the space part 215, which is the front-rear direction in the illustrated exemplary embodiment.

The third block 233 may be disposed to overlap the second fixed contact 22*b* and the third block 223 of the first Halbach array 220 in a direction toward the first Halbach array 220 or the space part 215, which is the front-rear direction in the illustrated exemplary embodiment.

Each of the blocks 231, 232, 233 includes a plurality of surfaces.

Specifically, the first block 231 includes a first inner surface 231*a* facing the second block 232 and a first outer surface 231*b* opposite to the second block 232.

The second block 232 includes a second inner surface 232*a* facing the space part 215 or the first Halbach array 220 and a second outer surface 232*b* opposite to the space part 215 or the first Halbach array 220.

The third block 233 includes a third inner surface 233*a* facing the second block 232 and a third outer surface 233*b* opposite to the second block 232.

The plurality of surfaces of each of the blocks 231, 232, 233 may be magnetized according to a predetermined rule to constitute a Halbach array.

Specifically, the first to third inner surfaces 231*a*, 232*a*, 233*a* may be magnetized with the same polarity. Similarly, the first to third outer surfaces 231*b*, 232*b*, 233*b* may be magnetized with a polarity different from the polarity.

In this case, the first to third inner surfaces 231*a*, 232*a*, 233*a* may be magnetized with the same polarity as the first to third inner surfaces 221*a*, 222*a*, 223*a* of the first Halbach array 220.

Furthermore, the first to third inner surfaces 231*a*, 232*a*, 233*a* may be magnetized with the same polarity as each of the opposing surfaces 241, 251 of the first and second magnet parts 240, 250.

One or more of the first Halbach array 220 and the second Halbach array 230 may be provided. That is, in the exemplary embodiment illustrated in FIG. 9, all of the first and second Halbach arrays 220, 230 are provided.

In the exemplary embodiment illustrated in FIG. 10, only the first Halbach array 220 is provided. Further, in the exemplary embodiment illustrated in FIG. 11, only the second Halbach array 230 may be provided.

The first and second magnet parts 240, 250 form a magnetic field by themselves or together with the first and second Halbach arrays 220, 230 and different magnet parts 240, 250 from each other. An arc path (A.P) may be formed inside the arc chamber 21 by the magnetic field formed by the first and second magnet parts 240, 250.

The first and second magnet parts 240, 250 may be provided in any shape capable of forming a magnetic field by being magnetized. In an exemplary embodiment, the first and second magnet parts 240, 250 may be provided as permanent magnets or electromagnets.

The first and second magnet parts 240, 250 may be positioned adjacent to any one surface of the first to fourth surfaces 211, 212, 213, 214, respectively.

In the illustrated exemplary embodiment, the first magnet part 240 is positioned adjacent to the third surface 213. The second magnet part 250 is positioned adjacent to the fourth surface 214. The first magnet part 240 and the second magnet part 250 are disposed to face each other with the space part 215 interposed therebetween.

The first magnet part 240 and the second magnet part 250 are formed to extend in one direction. In the illustrated exemplary embodiment, the first magnet part 240 and the second magnet part 250 are formed to extend in the front-rear direction.

The first and second magnet parts 240, 250 respectively include a plurality of surfaces.

Specifically, the first magnet part 240 includes a first opposing surface 241 facing the space part 215 or the fixed contact 22 and a first opposite surface 242 opposite to the space part 215 or the fixed contact 22.

The second magnet part 250 includes a second opposing surface 251 facing the space part 215 or fixed contact 22 and a second opposite surface 252 opposite to the space part 215 or fixed contact 22.

Each surface of the first and second magnet parts 240, 250 may be magnetized according to a predetermined rule.

Specifically, the first opposing surface 241 and the second opposing surface 251 may be magnetized with the same polarity. In this case, the first opposing surface 241 and the second opposing surface 251 may be magnetized with the same polarity as the second outer surface 222*b* of the first Halbach array 220 and the second outer surface 232*b* of the second Halbach array 230.

Similarly, the first opposite surface 242 and the second opposite surface 252 may be magnetized with a polarity different from the polarity. In this case, the first opposite surface 242 and the second opposite surface 252 may be magnetized with the same polarity as the second inner surface 222*a* of the first Halbach array 220 and the second inner surface 232*a* of the second Halbach array 230.

Hereinafter, the arc path (A.P) formed by the arc path generation unit 200 according to the present exemplary embodiment will be described in detail with reference to FIG. 12.

Figure 12:
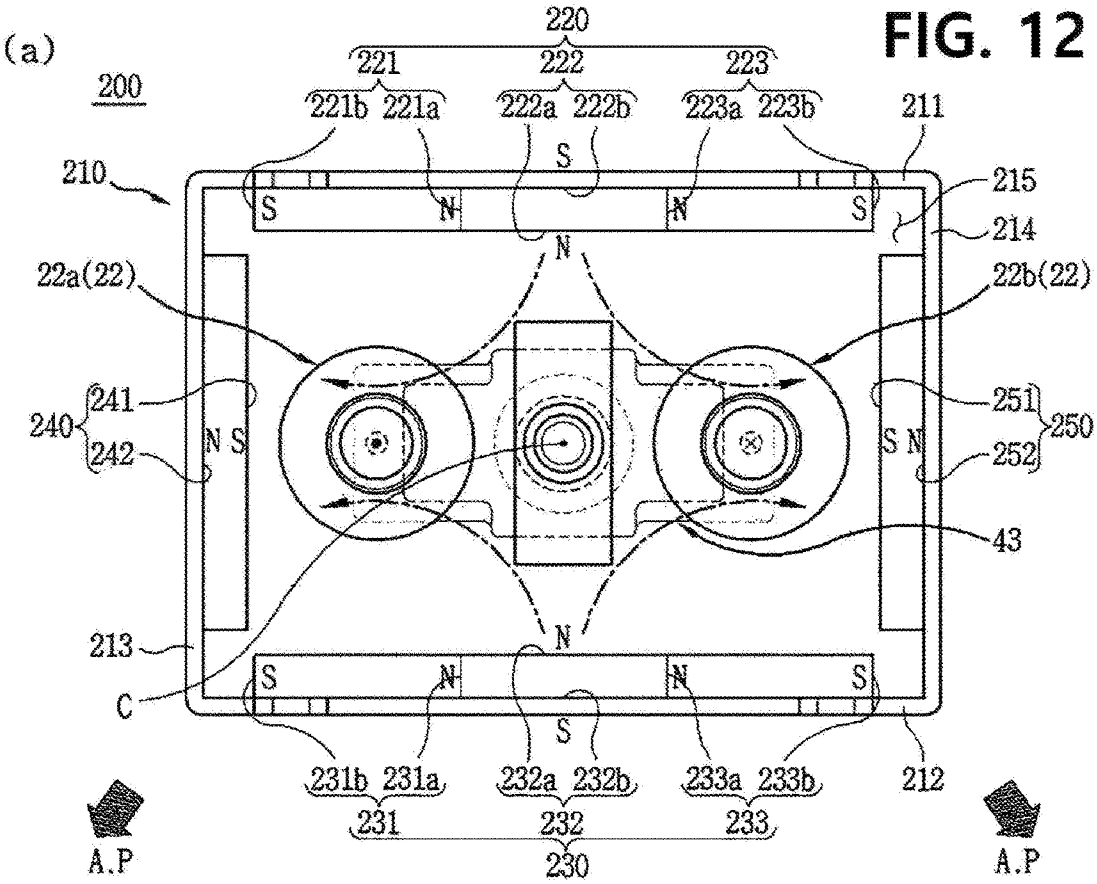
FIG. 12 is a conceptual view illustrating the paths of a magnetic field and an arc formed by the arc path generation unit according to the exemplary embodiment of FIGS. 9 to 11.
Figure 12:
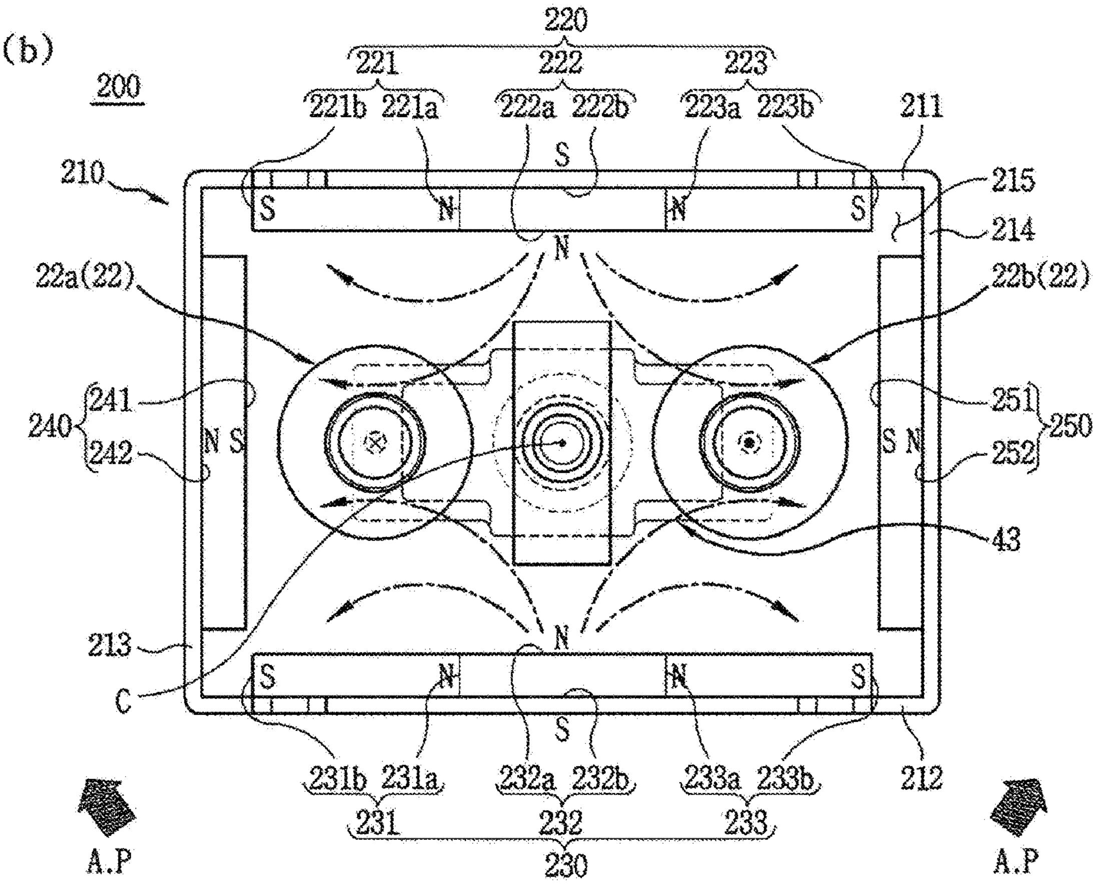

Referring to FIG. 12, the first to third inner surfaces 221*a*, 222*a*, 223*a* of the first Halbach array 220 are magnetized to the N pole. In addition, the first to third outer surfaces 221*b*, 222*b*, 223*b* are magnetized to the S pole.

According to the above rule, the first to third inner surfaces 231*a*, 232*a*, 233*a* of the second Halbach array 230 are magnetized to the N pole. In addition, the first to third outer surfaces 231*b*, 232*b*, 233*b* are magnetized to the S pole.

Furthermore, according to the above rule, the first opposing surface 241 of the first magnet part 240 and the second opposing surface 251 of the second magnet part 250 are magnetized to the S pole.

Accordingly, in the first Halbach array 220, a magnetic field in a direction from the second inner surface 222*a* toward the first and third outer surfaces 221*b* and 223*b* is formed. Similarly, in the second Halbach array 230, a magnetic field in a direction from the second inner surface 232*a* toward the first and third outer surfaces 231*b*, 233*b* is formed.

Accordingly, a magnetic field in a direction to repel each other is formed between the first Halbach array 220 and the second Halbach array 230.

Between the first Halbach array 220 and the first and second magnet parts 240, 250, a magnetic field is formed in a direction from the second inner surface 222*a* to each of the opposing surfaces 241, 251.

Between the second Halbach array 230 and the first and second magnet parts 240, 250, a magnetic field in a direction from the second inner surface 232*a* toward the opposing surfaces 241, 251 is formed.

In the exemplary embodiment illustrated in (a) of FIG. 12, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment shown in (b) of FIG. 12, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 220, 230 and the first and second magnet parts 240, 250 is changed, the directions of the magnetic fields formed by each of the Halbach arrays 220, 230 and each of the magnet parts 240, 250 become reversed. Accordingly, the path (A.P) of the generated electromagnetic force and arc is also formed to be reversed in the front-rear direction.

That is, in the energized situation as shown in (a) of FIG. 12, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 12, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Although not illustrated, it will be understood that even when only one of the first and second Halbach arrays 220, 230 is provided, the path (A.P) of the magnetic field and arc is formed as described above.

Therefore, regardless of the polarity of the first and second Halbach arrays 220, 230 and the first and second magnet parts 240, 250 or the direction of the current flowing through the current relay 1, the arc path generation unit 200 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(3) Description of the Arc Path Generation Unit 300 According to Another Exemplary Embodiment of the Present Disclosure Hereinafter, the arc path generation unit 300 according to another exemplary embodiment of the present disclosure will be described in detail with reference to FIGS. 13 to 16.

Figure 13:
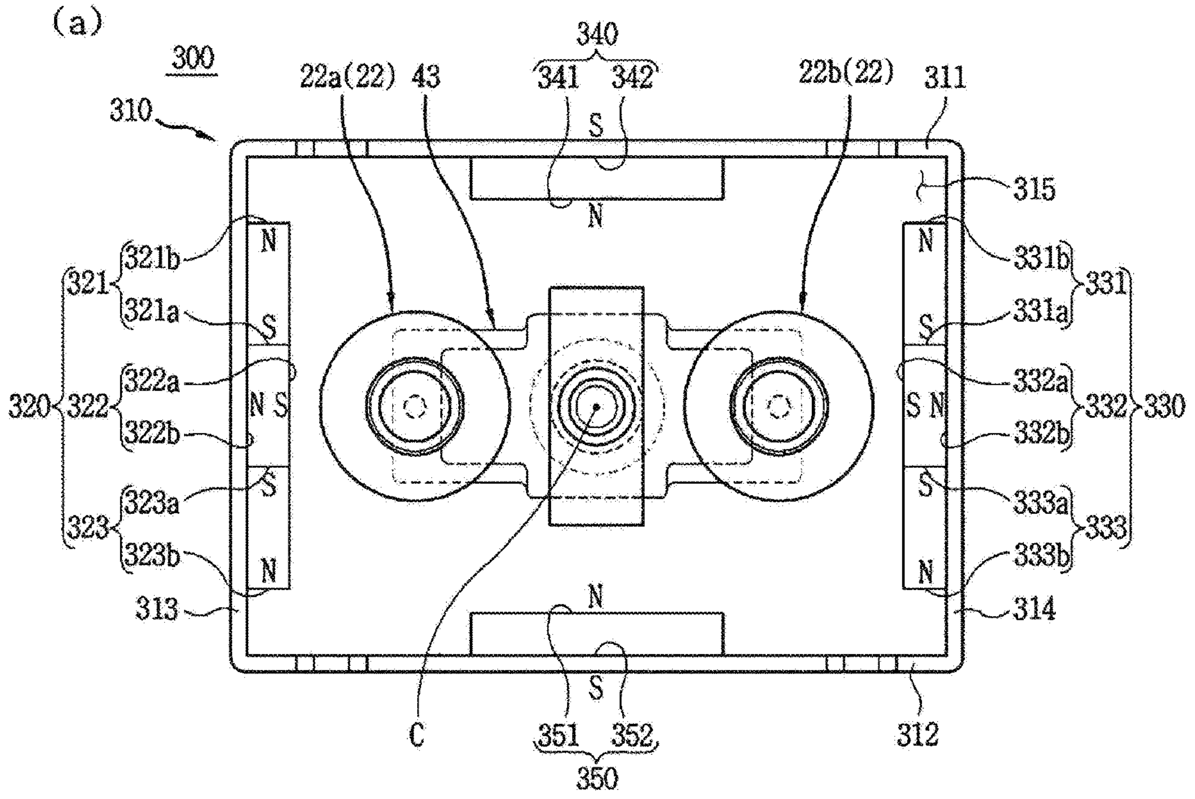
FIGS. 13 to 15 are conceptual views illustrating the arc path generation unit according to another exemplary embodiment of the present disclosure.
Figure 13:
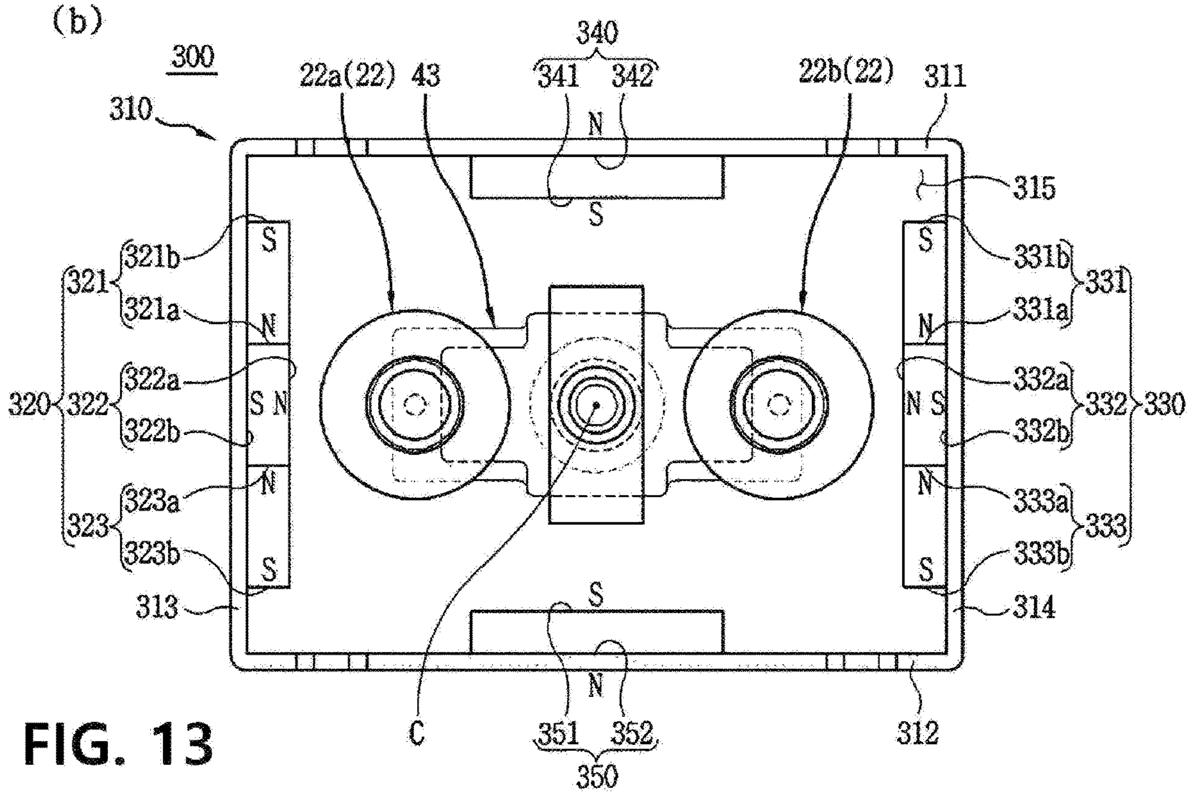
Figure 14:
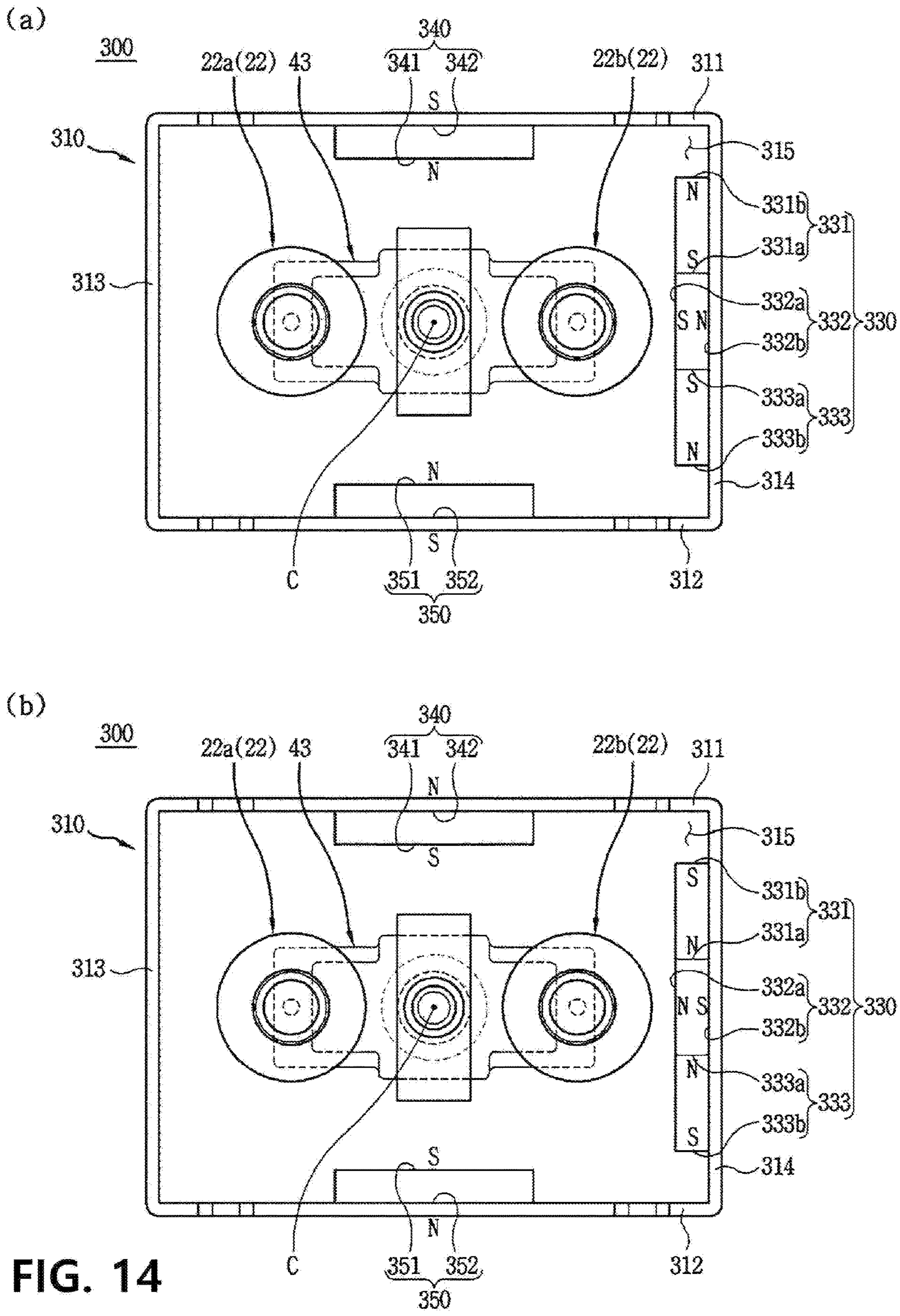
Figure 15:
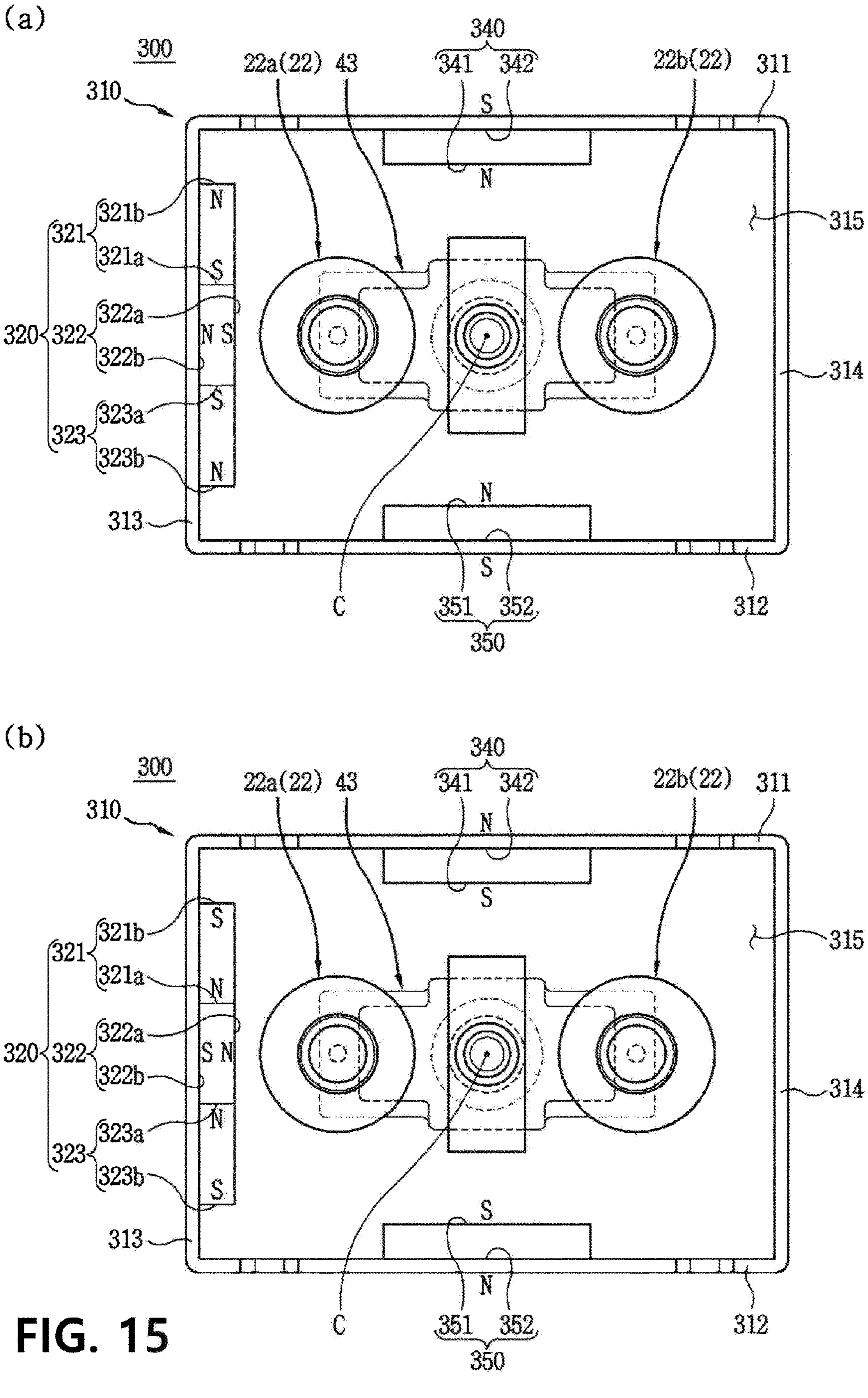

Referring to FIGS. 13 to 15, the arc path generation unit 300 according to the illustrated exemplary embodiment includes a magnetic frame 310, a first Halbach array 320, a second Halbach array 330, and a first magnet part 340 and a second magnet part 350.

The magnetic frame 310 according to the present exemplary embodiment has the same structure and function as the magnetic frame 310 according to the above-described exemplary embodiment. However, there is a difference in the arrangement method of the first Halbach array 320, the second Halbach array 330, the first magnet part 340 and the second magnet part 350 disposed on the magnetic frame 310 according to the present exemplary embodiment.

Accordingly, the description of the magnetic frame 310 will be replaced with the description of the magnetic frame 310 according to the above-described exemplary embodiment.

In the illustrated exemplary embodiment, a plurality of magnetic materials constituting the first Halbach array 320 are sequentially arranged side by side from the front side to the rear side. That is, in the illustrated exemplary embodiment, the first Halbach array 320 is formed to extend in the front-rear direction.

The first Halbach array 320 may form a magnetic field together with other magnetic materials. In the illustrated exemplary embodiment, the first Halbach array 320 may form a magnetic field together with the second Halbach array 330 and the first and second magnet parts 340, 350.

The first Halbach array 320 may be positioned adjacent to any one surface of the third surface 313 and the fourth surface 314. In an exemplary embodiment, the first Halbach array 320 may be coupled to the inner side of the any one surface (i.e., a direction toward the space part 315).

In the exemplary embodiment illustrated in FIGS. 13 and 15, the first Halbach array 320 is disposed on the inner side of the third surface 313, adjacent to the third surface 313, so as to face the second Halbach array 330 which is positioned on the inner side of the fourth surface 314.

Between the first Halbach array 320 and the second Halbach array 330, the space part 315 and the fixed contact 22 and the movable contact 43 accommodated in the space part 315 are positioned.

The first Halbach array 320 may be positioned at a central portion of the third surface 313 in the front-rear direction. In other words, the shortest distance between the first Halbach array 320 and the first surface 311 and the shortest distance between the first Halbach array 320 and the second surface 312 may be the same.

The first Halbach array 320 may enhance the strength of the magnetic field formed by itself and the magnetic field formed with the second Halbach array 330 and the first and second magnet parts 340, 350. Since the direction of the magnetic field formed by the first Halbach array 320 and the process of strengthening the magnetic field are well-known techniques, the detailed description thereof will be omitted.

In the illustrated exemplary embodiment, the first Halbach array 320 includes a first block 321, a second block 322 and a third block 323. It will be understood that the plurality of magnetic materials constituting the first Halbach array 320 are each named blocks 321, 322, 323, respectively.

The first to third blocks 321, 322, 323 may be formed of a magnetic material. In an exemplary embodiment, the first to third blocks 321, 322, 323 may be provided as permanent magnets or electromagnets.

The first to third blocks 321, 322, 323 may be arranged side by side in one direction. In the illustrated exemplary embodiment, the first to third blocks 321, 322, 323 are arranged side by side in the extending direction of the third surface 313, that is, in the front-rear direction.

The first block 321 is positioned on the rearmost side. That is, the first block 321 is positioned adjacent to the first surface 311. In addition, the third block 323 is positioned on the frontmost side. That is, the third block 323 is positioned adjacent to the second surface 312. The second block 322 is positioned between the first block 321 and the third block 323.

That is, the first to third blocks 321, 322, 323 are sequentially arranged side by side from the rear side toward the front side.

In an exemplary embodiment, each of the blocks 321, 322, 323 adjacent to each other may contact each other.

The first block 321 may be disposed to overlap the first block 331 of the second Halbach array 330 in a direction toward the second Halbach array 330 or the space part 315, which is the left-right direction in the illustrated exemplary embodiment.

The second block 322 may be disposed to overlap each of the fixed contacts 22*a*, 22*b*, the center (C) and the second block 232 of the second Halbach array 330 in a direction toward the second Halbach array 330, which is the left-right direction in the illustrated exemplary embodiment.

The third block 323 may be disposed to overlap the third block 333 of the second Halbach array 330 in a direction toward the second Halbach array 330 or the space part 315, which is the left-right direction in the illustrated exemplary embodiment.

Each of the blocks 321, 322, 323 includes a plurality of surfaces.

Specifically, the first block 321 includes a first inner surface 321*a* facing the second block 322 and a first outer surface 321*b* opposite to the second block 322.

The second block 322 includes a second inner surface 322*a* facing the space part 315 or the second Halbach array 330 and a second outer surface 322*b* opposite to the space part 315 or the second Halbach array 330.

The third block 323 includes a third inner surface 323*a* facing the second block 322 and a third outer surface 323*b* opposite to the second block 322.

The plurality of surfaces of each of the blocks 321, 322, 323 may be magnetized according to a predetermined rule to constitute a Halbach array.

Specifically, the first to third inner surfaces 321*a*, 322*a*, 323*a* may be magnetized with the same polarity. Similarly, the first to third outer surfaces 321*b*, 322*b*, 323*b* may be magnetized with a polarity different from the polarity.

In this case, the first to third inner surfaces 321*a*, 322*a*, 323*a* may be magnetized with the same polarity as the first to third inner surfaces 331*a*, 332*a*, 333*a* of the second Halbach array 330.

Furthermore, the first to third inner surfaces 321*a*, 322*a*, 323*a* may be magnetized with a polarity different from that of each of the opposing surfaces 341, 351 of the first and second magnet parts 340, 350. That is, the first to third inner surfaces 321*a*, 322*a*, 323*a* are magnetized with the same polarity as each of the opposite surfaces 342, 352 of the first and second magnet parts 340, 350.

In the illustrated exemplary embodiment, a plurality of magnetic materials constituting the second Halbach array 330 are sequentially arranged side by side from the front side to the rear side. That is, in the illustrated exemplary embodiment, the second Halbach array 330 is formed to extend in the front-rear direction.

The second Halbach array 330 may form a magnetic field together with other magnetic materials. In the illustrated exemplary embodiment, the second Halbach array 330 may form a magnetic field together with the first Halbach array 320 and the first and second magnet parts 340, 350.

The second Halbach array 330 may be positioned adjacent to the other one surface of the third surface 313 and the fourth surface 314. In an exemplary embodiment, the second Halbach array 330 may be coupled to the inner side of the other one surface (i.e., a direction toward the space part 315).

In the exemplary embodiment illustrated in FIGS. 13 and 14, the second Halbach array 330 is disposed on the inner side of the fourth face 314, adjacent to the fourth face 314, so as to face the first Halbach array 320 which is positioned on the inner side of the third surface 313.

Between the second Halbach array 330 and the first Halbach array 320, the space part 315 and the fixed contact 22 and the movable contact 43 accommodated in the space part 315 are positioned.

The second Halbach array 330 may be positioned at a central portion of the fourth surface 314. In other words, the shortest distance between the second Halbach array 330 and the first surface 311 and the shortest distance between the second Halbach array 330 and the second surface 312 may be the same.

The second Halbach array 330 may enhance the strength of the magnetic field formed by itself and the magnetic field formed with the first Halbach array 320 and the first and second magnet parts 340, 350. Since the direction of the magnetic field formed by the second Halbach array 330 and the process of strengthening the magnetic field are well-known techniques, the detailed description thereof will be omitted.

In the illustrated exemplary embodiment, the second Halbach array 330 includes a first block 331, a second block 332 and a third block 333. It will be understood that the plurality of magnetic materials constituting the second Halbach array 330 are each named blocks 331, 332, 333, respectively.

The first to third blocks 331, 332, 333 may be formed of a magnetic material. In an exemplary embodiment, the first to third blocks 331, 332, 333 may be provided as permanent magnets or electromagnets.

The first to third blocks 331, 332, 333 may be arranged side by side in one direction. In the illustrated exemplary embodiment, the first to third blocks 331, 332, 333 are arranged side by side in the extending direction of the fourth surface 314, that is, in the front-rear direction.

The first block 331 is positioned on the rearmost side. That is, the first block 331 is positioned adjacent to the first surface 311. In addition, the third block 333 is positioned on the frontmost side. That is, the third block 333 is positioned adjacent to the second surface 312. The second block 332 is positioned between the first block 331 and the third block 333.

That is, the first to third blocks 331, 332, 333 are sequentially arranged side by side from the rear side toward the front side.

In an exemplary embodiment, each of the blocks 331, 332, 333 adjacent to each other may contact each other.

The first block 331 may be disposed to overlap the first block 321 of the first Halbach array 320 in a direction toward the first Halbach array 320 or the space part 315, which is the left-right direction in the illustrated exemplary embodiment.

The second block 332 may be disposed to overlap each of the fixed contacts 22*a*, 22*b*, the center (C) and the second block 322 of the first Halbach array in a direction toward the first Halbach array 320 or the space part 315, which is the left-right direction in the illustrated exemplary embodiment.

The third block 333 may be disposed to overlap the third block 323 of the first Halbach array 320 in a direction toward the first Halbach array 320 or the space part 315, which is the left-right direction in the illustrated exemplary embodiment.

Each of the blocks 331, 332, 333 includes a plurality of surfaces.

Specifically, the first block 331 includes a first inner surface 331*a* facing the second block 332 and a first outer surface 331*b* opposite to the second block 332.

The second block 332 includes a second inner surface 332*a* facing the space part 315 or the first Halbach array 320 and a second outer surface 332*b* opposite to the space part 315 or the first Halbach array 320.

The third block 333 includes a third inner surface 333*a* facing the second block 332 and a third outer surface 333*b* opposite to the second block 332.

The plurality of surfaces of each of the blocks 331, 332, 333 may be magnetized according to a predetermined rule to constitute a Halbach array.

Specifically, the first to third inner surfaces 331*a*, 332*a*, 333*a* may be magnetized with the same polarity. Similarly, the first to third outer surfaces 331*b*, 332*b*, 333*b* may be magnetized with a polarity different from the polarity.

In this case, the first to third inner surfaces 331*a*, 332*a*, 333*a* may be magnetized with the same polarity as the first to third inner surfaces 321*a*, 322*a*, 323*a* of the first Halbach array 320.

Furthermore, the first to third inner surfaces 331*a*, 332*a*, 333*a* may be magnetized with a polarity different from that of each of the opposing surfaces 341, 351 of the first and second magnet parts 340, 350. That is, the first to third inner surfaces 331*a*, 332*a*, 333*a* may be magnetized with the same polarity as the opposite surfaces 342, 352 of the first and second magnet parts 340, 350.

One or more of the first Halbach array 320 and the second Halbach array 330 may be provided. That is, in the exemplary embodiment illustrated in FIG. 13, all of the first and second Halbach arrays 320, 330 are provided.

In the exemplary embodiment illustrated in FIG. 14, only the second Halbach array 330 may be provided. Further, in the exemplary embodiment illustrated in FIG. 15, only the first Halbach array 320 is provided.

The first and second magnet parts 340, 350 form a magnetic field by themselves or together with the first and second Halbach arrays 320, 330 and different magnet parts 340, 350. An arc path (A.P) may be formed inside the arc chamber 21 by the magnetic field formed by the first and second magnet parts 340, 350.

The first and second magnet parts 340, 350 may be provided in any shape capable of forming a magnetic field by being magnetized. In an exemplary embodiment, the first and second magnet parts 340, 350 may be provided as permanent magnets or electromagnets.

The first and second magnet parts 340, 350 may be positioned adjacent to any one surface of the first to fourth surfaces 311, 312, 313, 314, respectively.

In the illustrated exemplary embodiment, the first magnet part 340 is positioned adjacent to the first surface 311. The second magnet part 350 is positioned adjacent to the second surface 312. The first magnet part 340 and the second magnet part 350 are disposed to face each other with the space part 315 interposed therebetween.

A fixed contact 22 and a movable contact 43 are positioned between the first magnet part 340 and the second magnet part 350.

The first magnet part 340 and the second magnet part 350 are formed to extend in one direction. In the illustrated exemplary embodiment, the first magnet part 340 and the second magnet part 350 are formed to extend in the left-right directions.

The first and second magnet parts 340, 350 respectively include a plurality of surfaces.

Specifically, the first magnet part 340 includes a first opposing surface 341 facing the space part 315 or the fixed contact 22 and a first opposite surface 342 opposite to the space part 315 or the fixed contact 22.

The second magnet part 350 includes a second opposing surface 351 facing the space part 315 or the fixed contact 22 and a second opposite surface 352 opposite to the space part 315 or the fixed contact 22.

Each surface of the first and second magnet parts 340, 350 may be magnetized according to a predetermined rule.

Specifically, the first opposing surface 341 and the second opposing surface 351 may be magnetized with the same polarity. In this case, the first opposing surface 341 and the second opposing surface 351 may be magnetized with the same polarity as the first to third outer surfaces 321*b*, 322*b*, 323*b* of the first Halbach array 320. In addition, the first opposing surface 341 and the second opposing surface 351 may be magnetized with the same polarity as the first to third outer surfaces 331*b*, 332*b*, 333*b* of the second Halbach array 330.

That is, the first opposing surface 341 and the second opposing surface 351 may be magnetized with a polarity different from that of the first to third inner surfaces 321*a*, 322*a*, 323*a* of the first Halbach array 320 and the first to third inner surfaces 331*a*, 332*a*, 333*a* of the second Halbach array 330.

Hereinafter, the arc path (A.P) formed by the arc path generation unit 300 according to the present exemplary embodiment will be described in detail with reference to FIG. 16.

Figure 16:
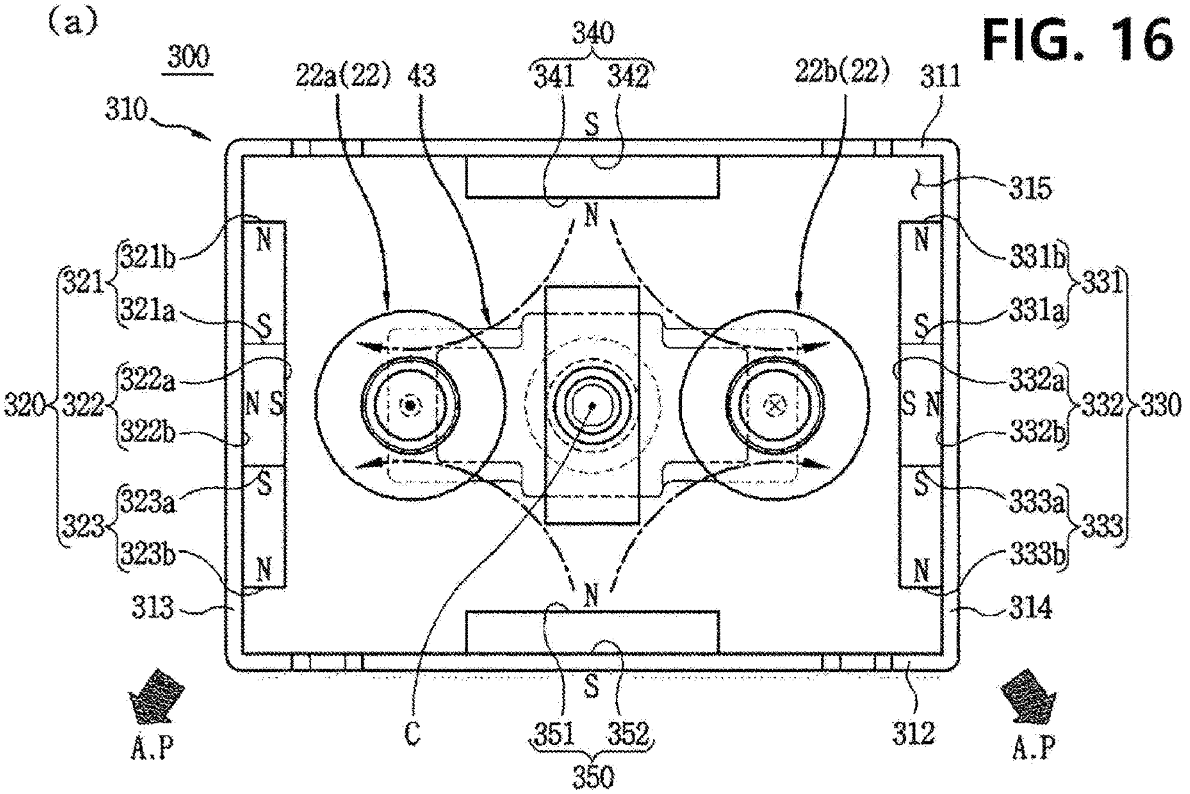
FIG. 16 is a conceptual view illustrating the paths of a magnetic field and an arc formed by the arc path generation unit according to the exemplary embodiment of FIGS. 13 to 16.
Figure 16:
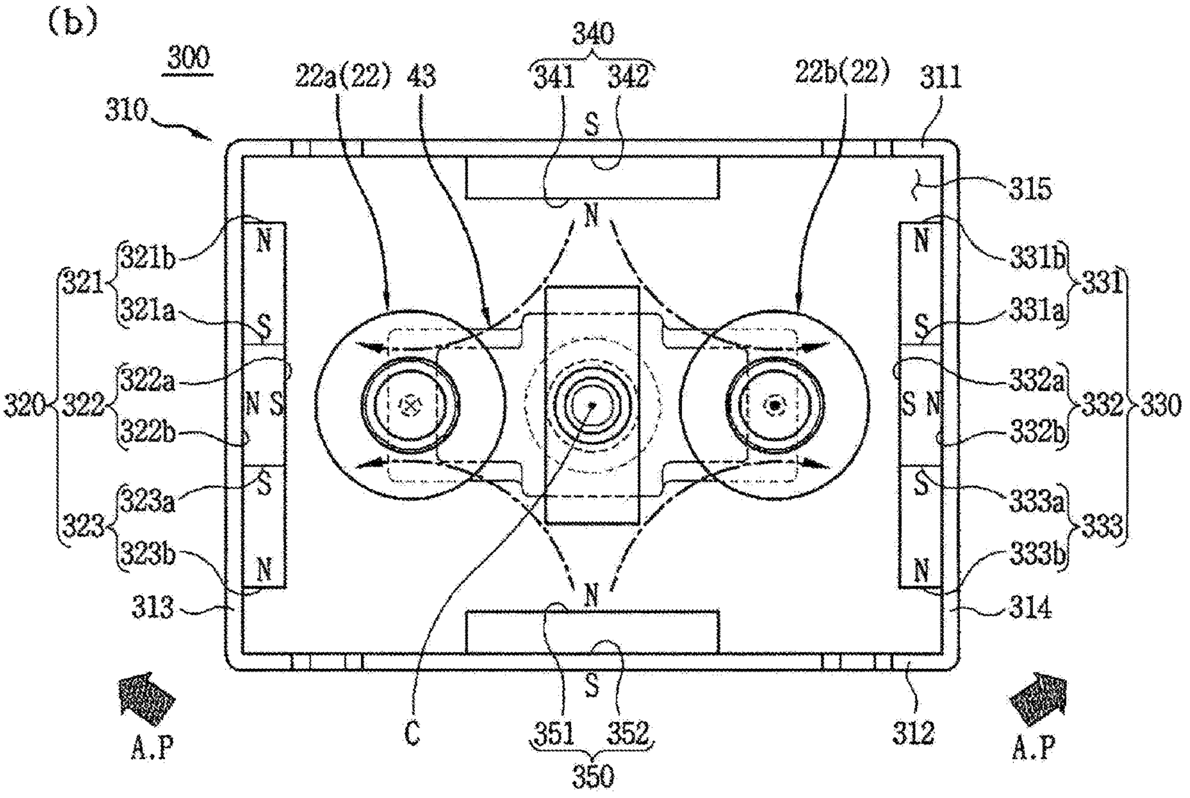
Figure 17:
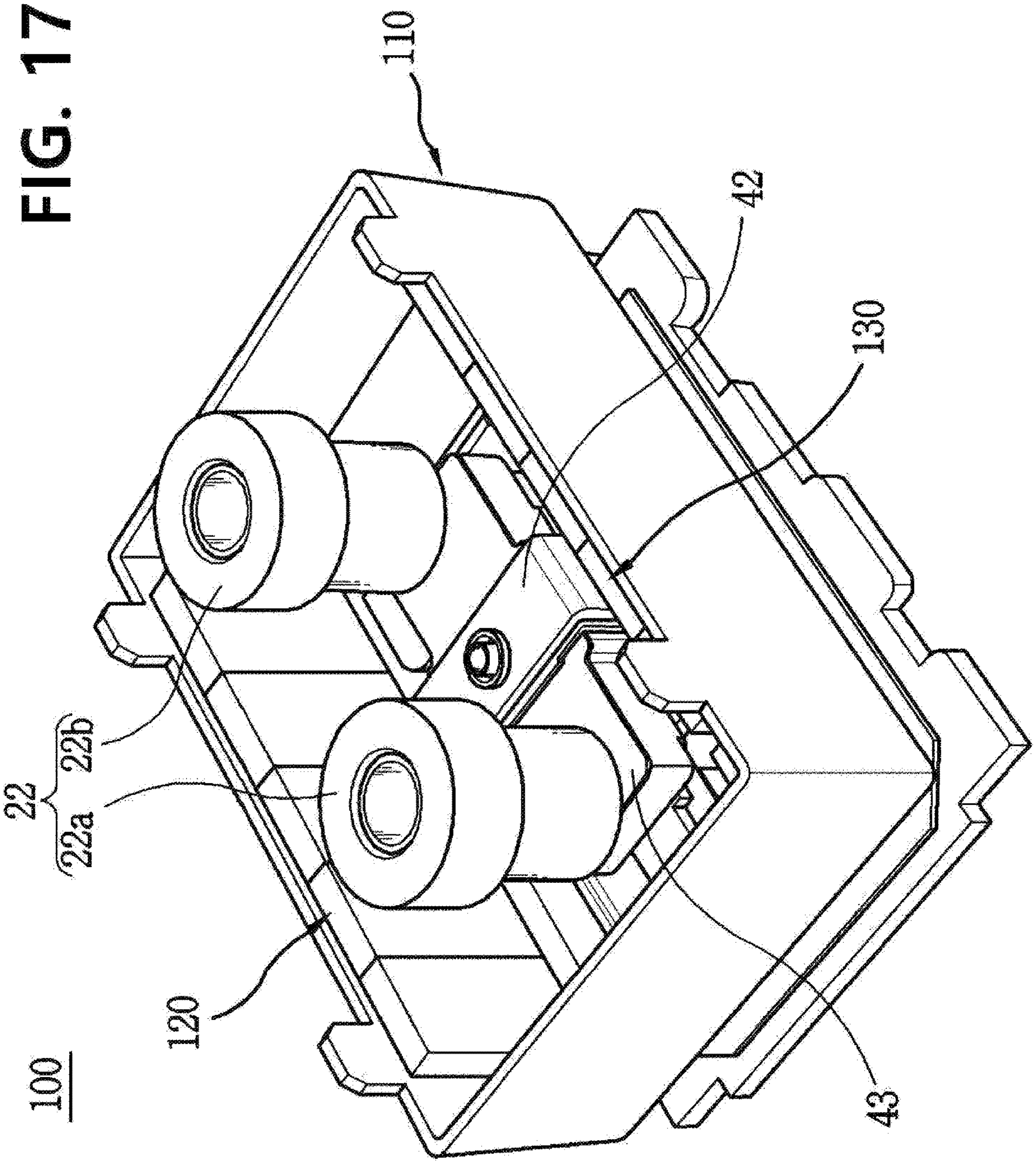
FIG. 17 is an open perspective view illustrating the second example of an arc path generation unit provided in the DC relay of FIG. 2.

Referring to FIG. 16, the first to third inner surfaces 321*a*, 322*a*, 323*a* of the first Halbach array 320 are magnetized to the S pole. In addition, the first to third outer surfaces 321*b*, 322*b*, 323*b* are magnetized to the N pole.

According to the above rule, the first to third inner surfaces 331*a*, 332*a*, 333*a* of the second Halbach array 330 are magnetized to the S pole. In addition, the first to third outer surfaces 331*b*, 332*b*, 333*b* are magnetized to the N pole.

Furthermore, according to the above rule, the first opposing surface 341 of the first magnet part 340 and the second opposing surface 351 of the second magnet part 350 are magnetized to the N pole.

Accordingly, in the first Halbach array 320, a magnetic field in a direction from the first and third outer surfaces 321*b*, 323*b* toward the second inner surface 322*a* is formed. Similarly, in the second Halbach array 330, a magnetic field in a direction from the first and third outer surfaces 331*b*, 333*b* toward the second inner surface 332*a* is formed.

Accordingly, a magnetic field in a direction to repel each other is formed between the first Halbach array 320 and the second Halbach array 330.

Between the first Halbach array 320 and the first and second magnet parts 340, 350, a magnetic field in a direction from each of the opposing surfaces 341, 351 to the second inner surface 322*a* is formed.

Between the second Halbach array 330 and the first and second magnet parts 340, 350, a magnetic field in a direction from each of the opposing surfaces 341, 351 to the second inner surface 332*a* is formed.

In the exemplary embodiment illustrated in (a) of FIG. 16, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the front left side.

Accordingly, the arc path (A.P) in the vicinity of the first fixed contact 22*a* is also formed toward the front left side.

Similarly, when Fleming's Left-Hand Rule is applied to the second fixed contact 22*b*, the electromagnetic force generated in the vicinity of the second fixed contact 22*b* is formed toward the front right side.

Accordingly, the arc path (A.P) in the vicinity of the second fixed contact 22*b* is also formed toward the front right side.

In the exemplary embodiment illustrated in (b) of FIG. 16, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the rear left side.

Accordingly, the arc path (A.P) in the vicinity of the first fixed contact 22*a* is also formed toward the rear left side.

Similarly, when Fleming's Left-Hand Rule is applied to the second fixed contact 22*b*, the electromagnetic force generated in the vicinity of the second fixed contact 22*b* is formed toward the rear right side.

Accordingly, the arc path (A.P) in the vicinity of the second fixed contact 22*b* is also formed toward the rear right side.

Although not illustrated, when the polarity of each surface of the first and second Halbach arrays 320, 330 and the first and second magnet parts 340, 350 is changed, the directions of the magnetic fields formed by each of the Halbach arrays 320, 330 and each of the magnets 340, 350 become reversed. Accordingly, the path (A.P) of the generated electromagnetic force and arc is also formed to be reversed in the front-rear direction.

That is, in the energized situation as shown in (a) of FIG. 16, the path (A.P) of the electromagnetic force and arc in the vicinity of the first fixed contact 22*a* is formed toward the rear left side. In addition, the path (A.P) of the electromagnetic force and arc in the vicinity of the second fixed contact 22*b* is formed toward the rear right side.

Similarly, in the energized situation as shown in (b) of FIG. 16, the path (A.P) of the electromagnetic force and arc in the vicinity of the first fixed contact 22*a* is formed toward the front left side. In addition, the path (A.P) of the electromagnetic force and arc in the vicinity of the second fixed contact 22*b* is formed toward the front right side.

Although not illustrated, even when only one of the first and second Halbach arrays 320, 330 is provided, it will be understood that the path (A.P) of the magnetic field and arc is formed as described above.

Therefore, regardless of the polarity of the first and second Halbach arrays 320, 330 and the first and second magnet parts 340, 350 or the direction of the current flowing through the DC relay 1, the arc path generation unit 300 according to the present exemplary embodiment may form the path (A.P) of the electromagnetic force and the arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

4. Description of the Arc Path Generation Unit According to the Second Example of the Present Disclosure Referring to FIGS. 17 to 24, the arc path generation units 100, 200, 300 according to various exemplary embodiments of the present disclosure are illustrated. Each of the arc path generation units 100, 200, 300 forms a magnetic field inside the arc chamber 21. An electromagnetic force is formed inside the arc chamber 21 by the current flowing through the DC relay 1 and the formed magnetic field.

The arc generated as the fixed contact 22 and the movable contact 43 are spaced apart is moved to the outside of the arc chamber 21 by the formed electromagnetic force. Specifically, the generated arc is moved along the direction of the formed electromagnetic force. Accordingly, it may be said that the arc path generation units 100, 200, 300 form the arc path (A.P), which is a path through which the generated arc flows.

The arc path generation units 100, 200, 300 are positioned in a space formed inside the upper frame 11. The arc path generation units 100, 200, 300 are disposed to surround the arc chamber 21. In other words, the arc chamber 21 is positioned inside the arc path generation units 100, 200, 300.

A fixed contact 22 and a movable contact 43 are positioned inside the arc path generation units 100, 200, 300. The arc generated by the fixed contact 22 and the movable contact 43 being spaced apart may be induced by an electromagnetic force formed by the arc path generation units 100, 200, 300.

The arc path generation units 100, 200, 300 according to various exemplary embodiments of the present disclosure include a Halbach array or a magnet part. The Halbach array or the magnet part forms a magnetic field inside the arc path generation units 100, 200, 300 in which the fixed contact 22 and the movable contact 43 are accommodated. In this case, the Halbach array or the magnet part may form a magnetic field by itself and between each other.

The magnetic field formed by the Halbach array and the magnet part forms an electromagnetic force together with the current passed through the fixed contact 22 and the movable contact 43. The formed electromagnetic force induces an arc generated when the fixed contact 22 and the movable contact 43 are spaced apart.

In this case, the arc path generation units 100, 200, 300 form an electromagnetic force in a direction away from the center (C) of the space parts 115, 215, 315. Accordingly, the arc path (A.P) is also formed in a direction away from the center (C) of the space part.

As a result, each component provided in the DC relay 1 is not damaged by the generated arc. Furthermore, the generated arc may be rapidly discharged to the outside of the arc chamber 21.

Hereinafter, the configuration of each of the arc path generation units 100, 200, 300 and the arc path (A.P) formed by each of the arc path generation units 100, 200, 300 will be described in detail with reference to the accompanying drawings.

The arc path generation units 100, 200, 300 according to various exemplary embodiments to be described below may have a Halbach array positioned on at least one of the front side and the rear side.

As will be described below, the rear side may be defined as a direction adjacent to the first surfaces 111, 211, 311, and the front side may be defined as a direction adjacent to the second surfaces 112, 212, 312.

In addition, the left side may be defined as a direction adjacent to the third surfaces 113, 213, 313, and the right side may be defined as a direction adjacent to the fourth surfaces 114, 214, 314.

(1) Description of the Configuration of the Arc Path Generation Unit 100 According to an Exemplary Embodiment of the Present Disclosure Hereinafter, the arc path generation unit 100 according to an exemplary embodiment of the present disclosure will be described in detail with reference to FIGS. 18 and 19.

Figure 18:
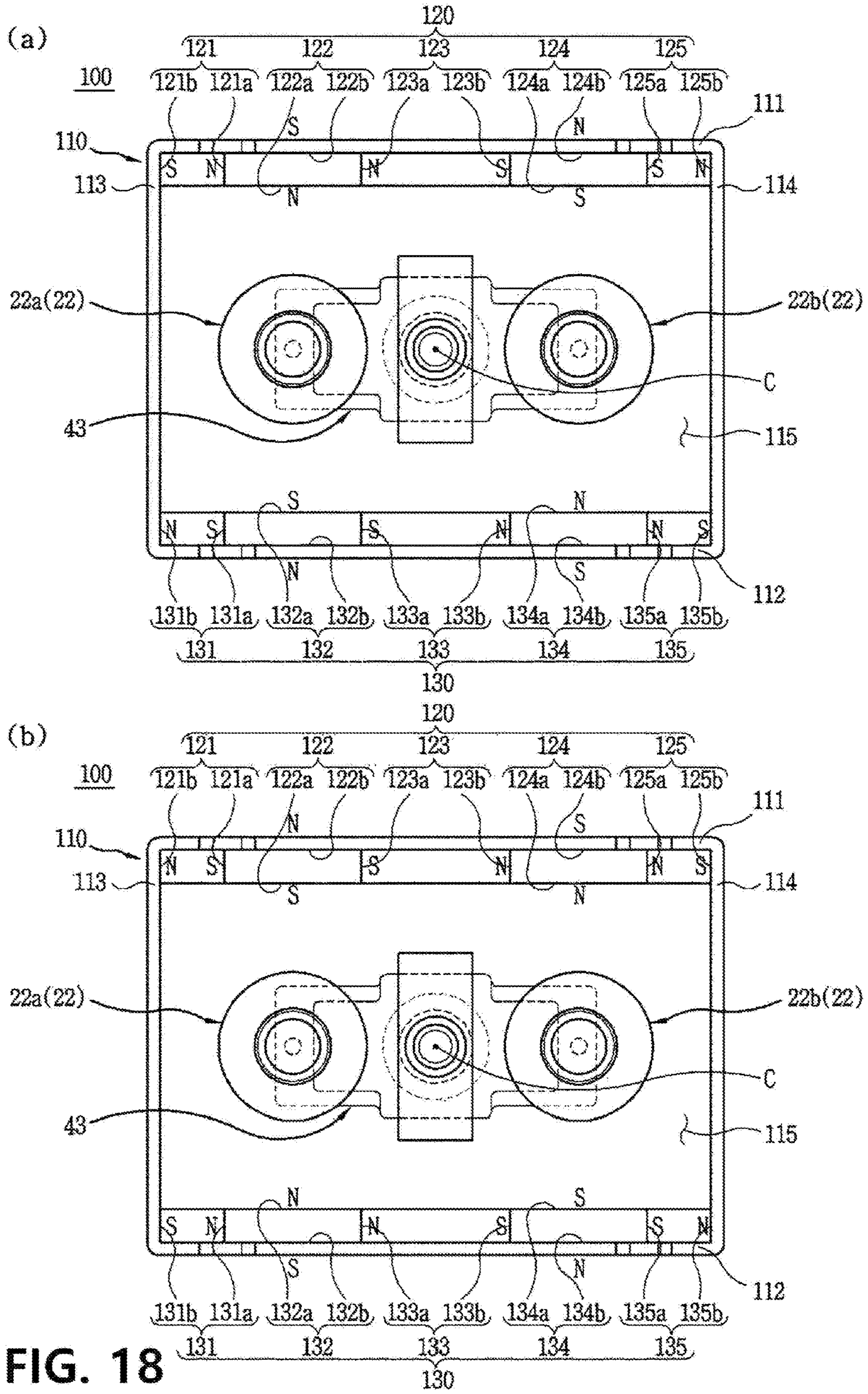
FIG. 18 is a conceptual view illustrating the arc path generation unit according to an exemplary embodiment of the present disclosure.

Referring to FIG. 18, the arc path generation unit 100 according to the illustrated exemplary embodiment includes a magnetic frame 110, a first Halbach array 120 and a second Halbach array 130.

The magnetic frame 110 forms a skeleton of the arc path generation unit 100. A first Halbach array 120 and a second Halbach array 130 are disposed on the magnetic frame 110.

In an exemplary embodiment, the first Halbach array 120 and the second Halbach array 130 may be coupled to the magnetic frame 110.

The magnetic frame 110 has a rectangular cross-section extending in the longitudinal direction, which is the left-right direction the illustrated exemplary embodiment. The shape of the magnetic frame 110 may be changed according to the shapes of the upper frame 11 and the arc chamber 21.

The magnetic frame 110 includes a first surface 111, a second surface 112, a third surface 113, a fourth surface 114 and a space part 115.

The first surface 111, the second surface 112, the third surface 113 and the fourth surface 114 form an outer peripheral surface of the magnetic frame 110. That is, the first surface 111, the second surface 112, the third surface 113 and the fourth surface 114 function as walls of the magnetic frame 110.

The outer side of the first surface 111, the second surface 112, the third surface 113 and the fourth surface 114 may be in contact with or fixedly coupled to the inner surface of the upper frame 11. In addition, on the inner sides of the first surface 111, the second surface 112, the third surface 113 and the fourth surface 114, the first Halbach array 120 and the second Halbach array 130 may be positioned.

In the illustrated exemplary embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an exemplary embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an exemplary embodiment, the predetermined angle may be a right angle.

Each edge at which the first surface 111 to the fourth surface 114 are connected to each other may be tapered.

A fastening member (not illustrated) may be provided for coupling each of the surfaces 111, 112, 113, 114 with the first and second Halbach arrays 120, 130.

Although not illustrated, an arc discharge hole (not illustrated) may be formed through at least one of the first surface 111, the second surface 112, the third surface 113 and the fourth surface 114. The arc discharge hole (not illustrated) may function as a passage through which the arc generated in the space part 115 is discharged.

The space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or a direction away from the fixed contact 22 (i.e., an upward direction).

In addition, a path (A.P) of the arc generated in the arc chamber 21 is formed in the space part 115. This is achieved by the magnetic field formed by the first Halbach array 120 and the second Halbach array 130.

A central portion of the space part 115 may be defined as a center (C). Straight-line distances from each edge where the first to fourth surfaces 111, 112, 113, 114 are connected to each other to the center (C) may be formed to be the same.

The center (C) is positioned between the first fixed contact 22*a* and the second fixed contact 22*b*. In addition, the central portion of the movable contact part 40 is positioned vertically below the center (C). That is, the central portions of the housing 41, the cover 42, the movable contact 43, the shaft 44 and the elastic part 45 are positioned vertically below the center (C).

Accordingly, when the generated arc is moved toward the center (C), the above components may be damaged. In order to prevent this, the arc path generation unit 100 according to the present exemplary embodiment includes a first Halbach array 120 and a second Halbach array 130.

In the illustrated exemplary embodiment, a plurality of magnetic materials constituting the first Halbach array 120 are sequentially arranged side by side from left to right. That is, in the illustrated exemplary embodiment, the first Halbach array 120 is formed to extend in the left-right direction.

The first Halbach array 120 may form a magnetic field together with other magnetic materials. In the illustrated exemplary embodiment, the first Halbach array 120 may form a magnetic field together with the second Halbach array 130.

The first Halbach array 120 may be positioned adjacent to any one surface of the first and second surfaces 111, 112. In an exemplary embodiment, the first Halbach array 120 may be coupled to the inner side of the any one surface (i.e., a direction toward the space part 115).

In the illustrated exemplary embodiment, the first Halbach array 120 is disposed on the inner side of the first surface 111, adjacent to the first surface 111, so as to face the second Halbach array 130 which is positioned on the inner side of the second surface 112.

Between the first Halbach array 120 and the second Halbach array 130, the space part 115 and the fixed contact 22 and the movable contact 43 accommodated in the space part 115 are positioned.

The first Halbach array 120 may enhance the strength of the magnetic field formed by itself and the magnetic field formed with the second Halbach array 130. Since the direction of the magnetic field formed by the first Halbach array 120 and the process of strengthening the magnetic field are well-known techniques, the detailed description thereof will be omitted.

In the illustrated exemplary embodiment, the first Halbach array 120 includes a first block 121, a second block 122, a third block 123, a fourth block 124 and a fifth block 125. It will be understood that the plurality of magnetic materials constituting the first Halbach array 120 are each named blocks 121, 122, 123, 124, 125, respectively.

The first to fifth blocks 121, 122, 123, 124, 125 may be formed of a magnetic material. In an exemplary embodiment, the first to fifth blocks 121, 122, 123, 124, 125 may be provided as permanent magnets or electromagnets.

The first to fifth blocks 121, 122, 123, 124, 125 may be arranged side by side in one direction. In the illustrated exemplary embodiment, the first to fifth blocks 121, 122, 123, 124, 125 are arranged side by side in the extending direction of the first surface 111, that is, in the left-right direction.

The first block 121 is positioned on the leftmost side. That is, the first block 121 is positioned adjacent to the third surface 113. In addition, the fifth block 125 is positioned on the rightmost side. That is, the third block 123 is positioned adjacent to the fourth surface 114.

The second to fourth blocks 122, 123, 124 are sequentially positioned side by side in a direction from left to right between the first block 121 and the fifth block 125.

In an exemplary embodiment, each of the blocks 121, 122, 123, 124, 125 adjacent to each other may contact each other.

The second block 122 may be disposed to overlap the first fixed contact 22*a* and the second block 132 of the second Halbach array 130 in a direction toward the second Halbach array 130 or the space part 115, which is the front-rear direction in the illustrated exemplary embodiment.

The fourth block 124 may be disposed to overlap the second fixed contact 22*b* and the fourth block 134 of the second Halbach array 130 in a direction toward the second Halbach array 130 or the space part 115, which is the front-rear direction in the illustrated exemplary embodiment.

Each of the blocks 121, 122, 123, 124, 125 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the second Halbach array 130 and a second outer surface 122*b* opposite to the space part 115 or the second Halbach array 130.

The third block 123 includes a third inner surface 123*a* facing the second block 122 and a third outer surface 123*b* facing the fourth block 124.

The fourth block 124 includes a fourth inner surface 124*a* facing the space part 115 or the second Halbach array 130 and a fourth outer surface 124*b* opposite to the space part 115 or the second Halbach array 130.

The fifth block 125 includes a fifth inner surface 125*a* facing the fourth block 124 and a fifth outer surface 125*b* opposite to the fourth block 124.

The plurality of surfaces of each of the blocks 121, 122, 123, 124, 125 may be magnetized according to a predetermined rule to constitute a Halbach array.

Specifically, the first to third inner surfaces 121*a*, 122*a*, 123*a* and the fourth and fifth outer surfaces 124*b*, 125*b* may be magnetized with the same polarity. In addition, the first to third outer surfaces 121*b*, 122*b*, 123*b* and the fourth and fifth inner surfaces 124*a*, 125*a* may be magnetized with a polarity different from the polarity.

In this case, the first to third inner surfaces 121*a*, 122*a*, 123*a* and the fourth and fifth outer surfaces 124*b*, 125*b* may be magnetized with the same polarity as the first to third outer surfaces 131*b*, 132*b*, 133*b* and the fourth and fifth inner surfaces 134*a*, 135*a* of the second Halbach array 130.

Similarly, the first to third outer surfaces 121*b*, 122*b*, 123*b* and the fourth and fifth inner surfaces 124*a*, 125*a* may be magnetized with the same polarity as the first to third inner surfaces 131*a*, 132*a*, 133*a* and the fourth and fifth outer surfaces 134*b*, 135*b* of the second Halbach array 130.

In the illustrated exemplary embodiment, a plurality of magnetic materials constituting the second Halbach array 130 are sequentially arranged side by side from left to right. That is, in the illustrated exemplary embodiment, the second Halbach array 130 is formed to extend in the left-right direction.

The second Halbach array 130 may form a magnetic field together with other magnetic materials. In the illustrated exemplary embodiment, the second Halbach array 130 may form a magnetic field together with the first Halbach array 120.

The second Halbach array 130 may be positioned adjacent to the other one surface of the first and second surfaces 111, 112. In an exemplary embodiment, the second Halbach array 130 may be coupled to the inner side of the other one surface (i.e., a direction toward the space part 115).

In the illustrated exemplary embodiment, the second Halbach array 130 is disposed on the inner side of the second surface 112, adjacent to the second surface 112, so as to face the first Halbach array 120 which is positioned on the inner side of the first surface 111.

Between the second Halbach array 130 and the first Halbach array 120, the space part 115 and the fixed contact 22 and the movable contact 43 accommodated in the space part 115 are positioned.

The second Halbach array 130 may enhance the strength of the magnetic field formed by itself and the magnetic field formed with the first Halbach array 120. Since the direction of the magnetic field formed by the second Halbach array 130 and the process of strengthening the magnetic field are well-known techniques, the detailed description thereof will be omitted.

In the illustrated exemplary embodiment, the second Halbach array 130 includes a first block 131, a second block 132, a third block 133, a fourth block 134 and a fifth block 135. It will be understood that the plurality of magnetic materials constituting the second Halbach array 130 are each named blocks 131, 132, 133, 134, 135, respectively.

The first to fifth blocks 131, 132, 133, 134, 135 may be formed of a magnetic material. In an exemplary embodiment, the first to fifth blocks 131, 132, 133, 134, 135 may be provided as permanent magnets or electromagnets.

The first to fifth blocks 131, 132, 133, 134, 135 may be arranged side by side in one direction. In the illustrated exemplary embodiment, the first to fifth blocks 131, 132, 133, 134, 135 are arranged side by side in the extending direction of the first surface 111, that is, in the left-right direction.

The first block 131 is positioned on the leftmost side. That is, the first block 131 is positioned adjacent to the third surface 113. In addition, the fifth block 135 is positioned on the rightmost side. That is, the third block 133 is positioned adjacent to the fourth surface 114.

The second to fourth blocks 132, 133, 134 are sequentially positioned side by side in a direction from left to right between the first block 131 and the fifth block 135.

In an exemplary embodiment, each of the blocks 131, 132, 133, 134, 135 adjacent to each other may contact each other.

The second block 132 may be disposed to overlap the first fixed contact 22*a* and the second block 122 of the first Halbach array 120 in a direction toward the first Halbach array 120 or the space part 115, which is the front-rear direction in the illustrated exemplary embodiment.

The fourth block 134 may be disclosed to overlap the second fixed contact 22*b* and the fourth block 124 of the first Halbach array 120 in a direction toward the first Halbach array 120 or the space part 115, which is the front-rear direction in the illustrated exemplary embodiment.

Each of the blocks 131, 132, 133, 134, 135 includes a plurality of surfaces.

Specifically, the first block 131 includes a first inner surface 131*a* facing the second block 132 and a first outer surface 131*b* opposite to the second block 132.

The second block 132 includes a second inner surface 132*a* facing the space part 115 or the first Halbach array 120 and a second outer surface 132*b* opposite to the space part 115 or the first Halbach array 120.

The third block 133 includes a third inner surface 133*a* facing the second block 132 and a third outer surface 133*b* facing the fourth block 134.

The fourth block 134 includes a fourth inner surface 134*a* facing the space part 115 or the first Halbach array 120 and a fourth outer surface 134*b* opposite to the space part 115 or the first Halbach array 120.

The fifth block 135 includes a fifth inner surface 135*a* facing the fourth block 134 and a fifth outer surface 135*b* opposite to the fourth block 134.

The plurality of surfaces of each of the blocks 131, 132, 133, 134, 135 may be magnetized according to a predetermined rule to constitute a Halbach array.

Specifically, the first to third inner surfaces 131*a*, 132*a*, 133*a* and the fourth and fifth outer surfaces 134*b*, 135*b* may be magnetized with the same polarity. In addition, the first to third outer surfaces 131*b*, 132*b*, 133*b* and the fourth and fifth inner surfaces 134*a*, 135*a* may be magnetized with a polarity different from the polarity.

In this case, the first to third inner surfaces 131*a*, 132*a*, 133*a* and the fourth and fifth outer surfaces 134*b*, 135*b* may be magnetized with the same polarity as the first to third outer surfaces 121*b*, 122*b*, 123*b* and the fourth and fifth inner surfaces 124*a*, 125*a* of the first Halbach array 120.

Similarly, the first to third outer surfaces 131*b*, 132*b*, 133*b* and the fourth and fifth inner surfaces 134*a*, 135*a* may be magnetized with the same polarity as the first to third inner surfaces 131*a*, 132*a*, 133*a* and the fourth and fifth outer surfaces 134*b*, 135*b* of the second Halbach array 130.

Hereinafter, the arc path (A.P) formed by the arc path generation unit 100 according to the present exemplary embodiment will be described in detail with reference to FIG. 19.

Figure 19:
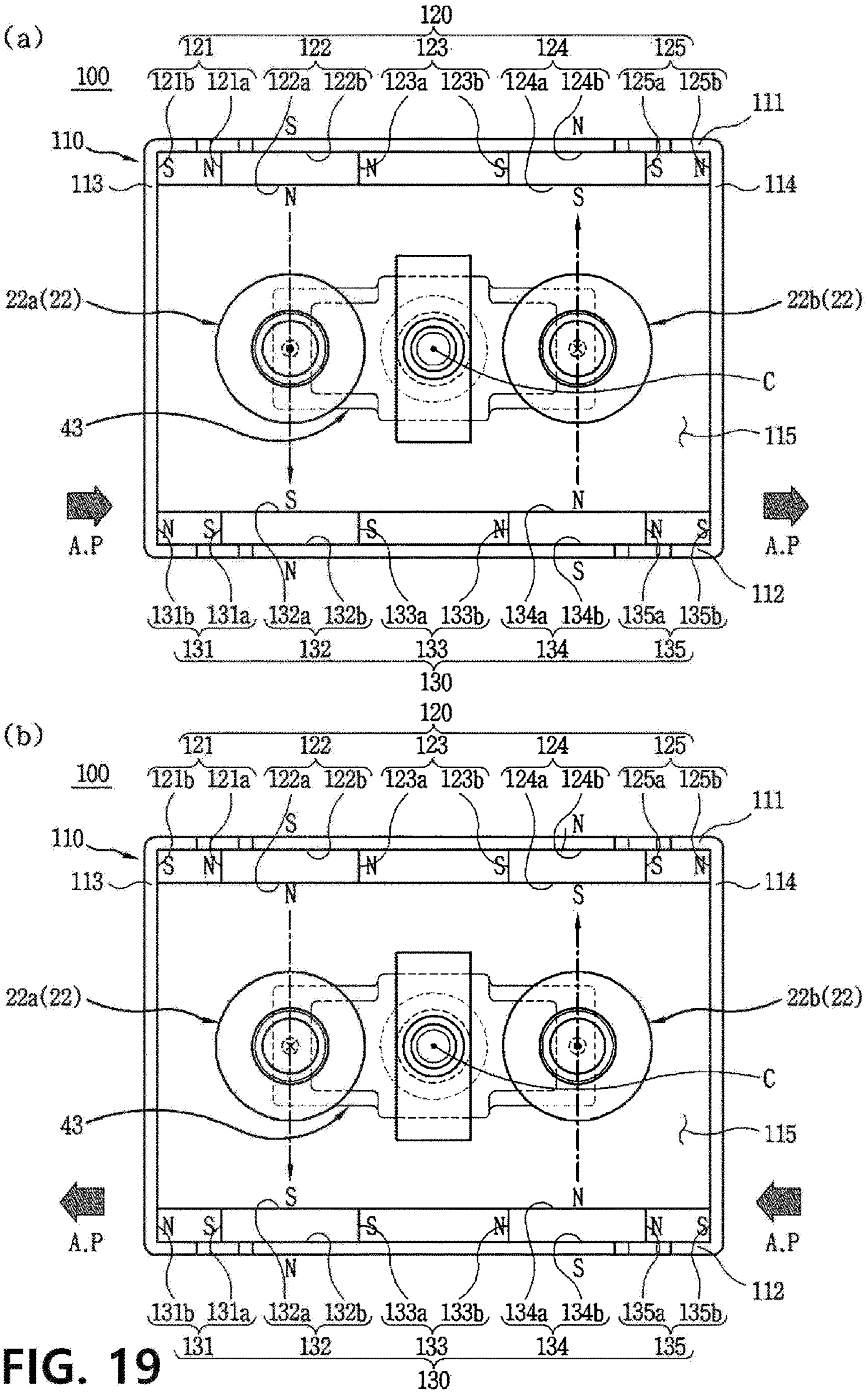
FIG. 19 is a conceptual view illustrating the paths of a magnetic field and an arc formed by the arc path generation unit according to the exemplary embodiment of FIG. 18.

Referring to FIG. 19, the first to third inner surfaces 121*a*, 122*a*, 123*a* of the first Halbach array 120 are magnetized to the N pole. In addition, the fourth and fifth inner surfaces 124*a*, 125*a* of the first Halbach array 120 are magnetized to the S pole.

In addition, according to the above rule, the first to third inner surfaces 131*a*, 132*a*, 133*a* of the second Halbach array 130 are magnetized to the S pole. In addition, the fourth and fifth inner surfaces 134*a*, 135*a* of the second Halbach array 130 are magnetized to the N pole.

Accordingly, between the second block 122 of the first Halbach array 120 and the second block 132 of the second Halbach array 130, a magnetic field in a direction from the second inner surface 122*a* toward the second inner surface 132*a* is formed.

In addition, between the fourth block 124 of the first Halbach array 120 and the fourth block 134 of the second Halbach array 130, a magnetic field in a direction from the fourth inner surface 134*a* toward the fourth inner surface 124*a* is formed.

In the exemplary embodiment illustrated in (a) of FIG. 19, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the right side.

Accordingly, the arc path (A.P) in the vicinity of the first fixed contact 22*a* is also formed toward the right side.

Similarly, when Fleming's Left-Hand Rule is applied to the second fixed contact 22*b*, the electromagnetic force generated in the vicinity of the second fixed contact 22*b* is formed toward the right side.

Accordingly, the arc path (A.P) in the vicinity of the second fixed contact 22*b* is also formed toward the right side.

In the exemplary embodiment illustrated in (b) of FIG. 19, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the left side.

Accordingly, the arc path (A.P) in the vicinity of the first fixed contact 22*a* is also formed toward the left side.

Similarly, when Fleming's Left-Hand Rule is applied to the second fixed contact 22*b*, the electromagnetic force generated in the vicinity of the second fixed contact 22*b* is formed toward the left side.

Accordingly, the path (A.P) of the arc in the vicinity of the second fixed contact 22*b* is also formed toward the left side.

Although not illustrated, when the polarity of each surface of the first and second Halbach arrays 120, 130 is changed, the directions of the magnetic fields formed by the first and second Halbach arrays 120, 130 become reversed. Accordingly, the path (A.P) of the generated electromagnetic force and arc is also formed to be reversed in the front-rear direction.

That is, in the energized situation as shown in (a) of FIG. 19, the path (A.P) of the electromagnetic force and arc in the vicinity of the first fixed contact 22*a* is formed toward the left side. In addition, the path (A.P) of the electromagnetic force and arc in the vicinity of the second fixed contact 22*b* is formed toward the left side.

Similarly, in the energized situation as shown in (b) of FIG. 19, the path (A.P) of the electromagnetic force and arc in the vicinity of the first fixed contact 22*a* is formed toward the right side. In addition, the path (A.P) of the electromagnetic force and arc in the vicinity of the second fixed contact 22*b* is formed toward the right side.

As a result, the paths (A.P) of arcs formed in the vicinity of each of the fixed contacts 22*a*, 22*b* do not meet each other.

Therefore, regardless of the polarity of the first and second Halbach arrays 120, 130 or the direction of the current flowing through the DC relay 1, the arc path generation unit 100 according to the present exemplary embodiment may form the path (A.P) of the electromagnetic force and arc in a direction away from the center (C).

Accordingly, damage to each component of the DC relay 1 disposed adjacent to the center (C) may be prevented. Furthermore, the generated arc may be quickly discharged to the outside such that the operation reliability of the DC relay 1 can be improved.

(2) Description of the Arc Path Generation Unit 200 According to Another Exemplary Embodiment of the Present Disclosure Hereinafter, the arc path generation unit 200 according to another exemplary embodiment of the present disclosure will be described in detail with reference to FIGS. 20 to 10.

Figure 20:
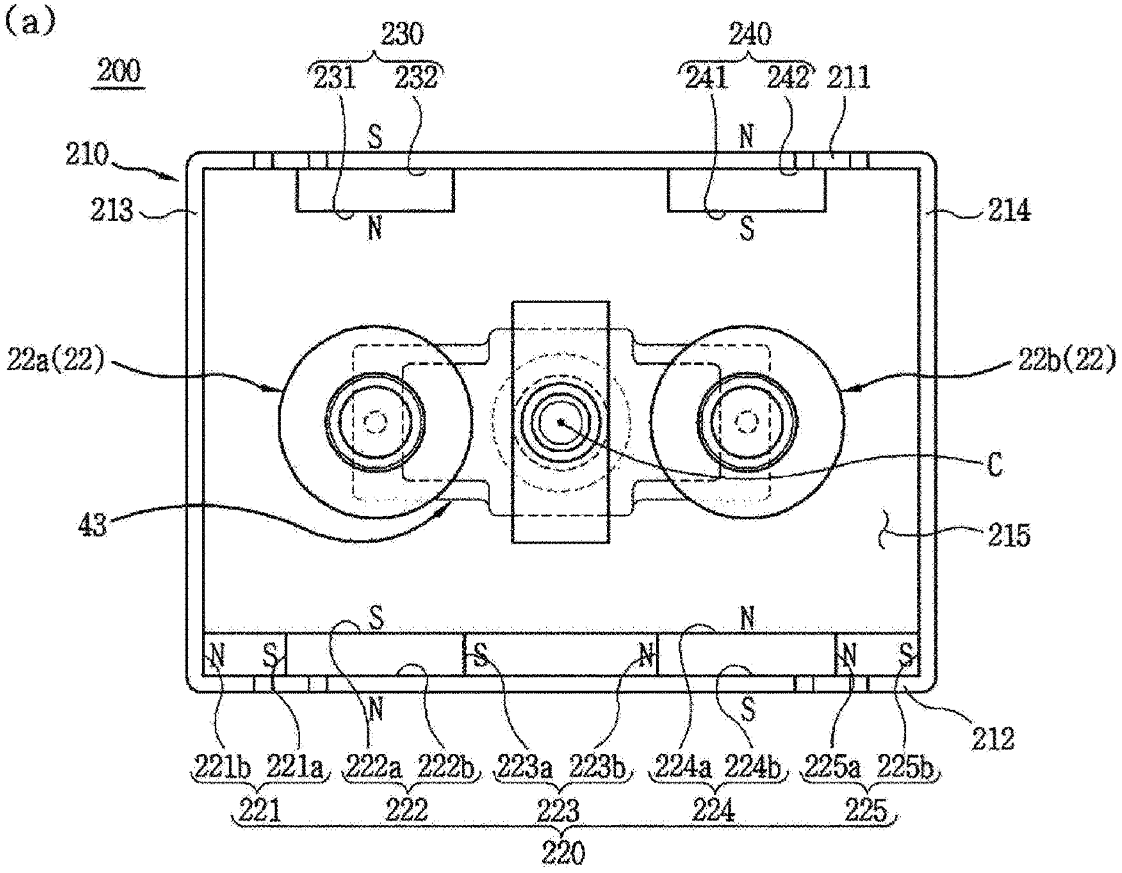
FIGS. 20 and 21 are conceptual views illustrating the arc path generation unit according to another exemplary embodiment of the present disclosure.
Figure 20:
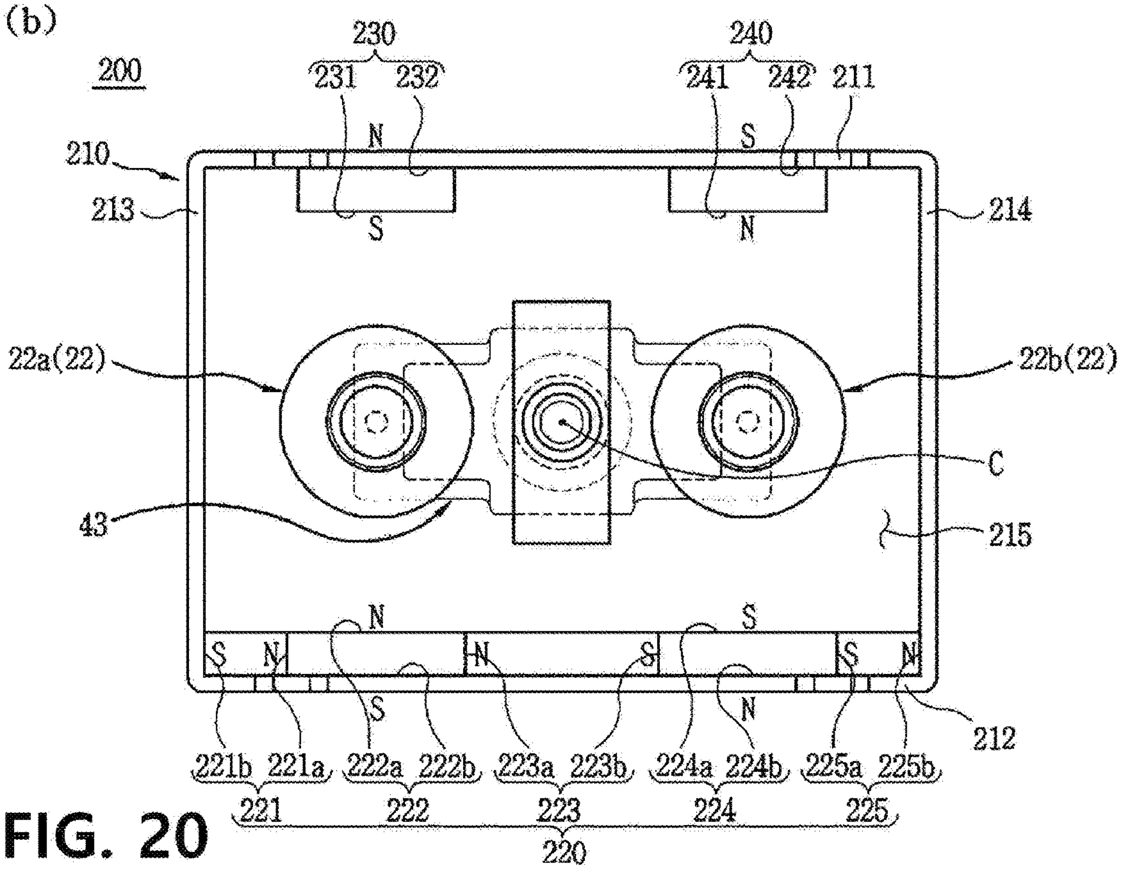
Figure 21:
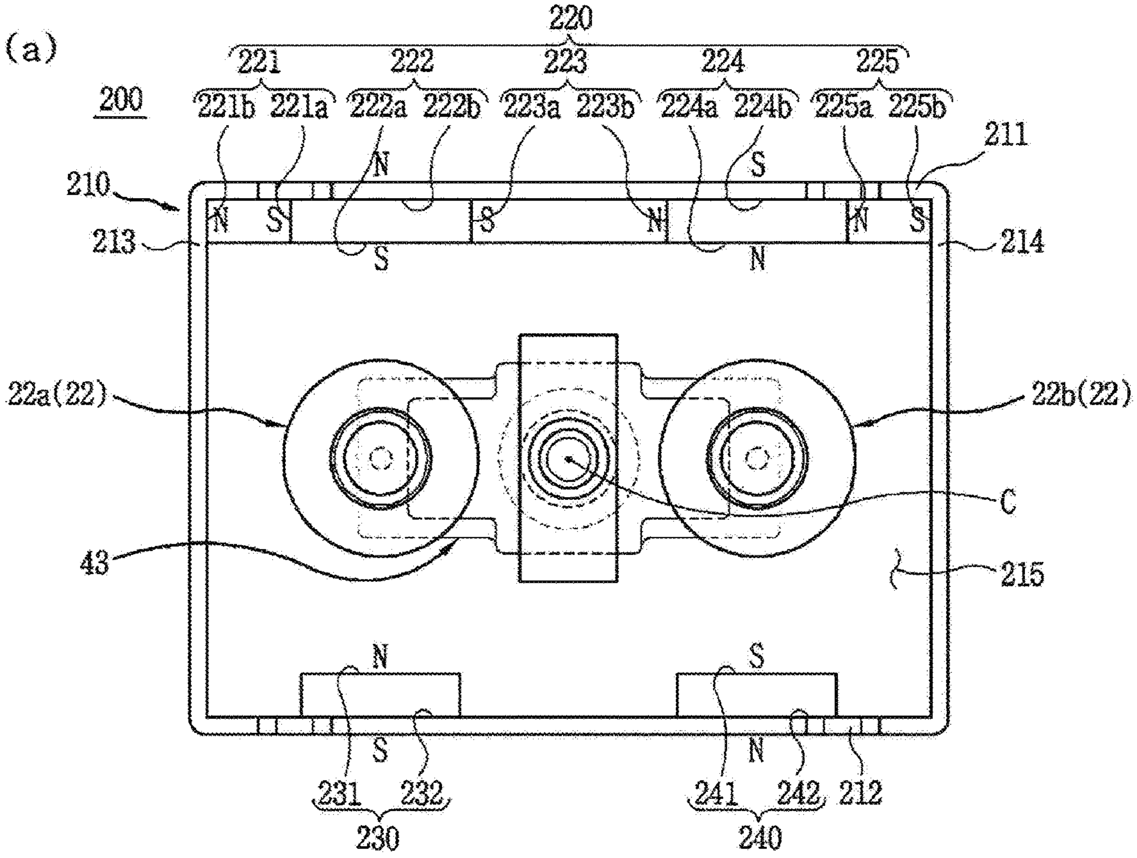
Figure 21:
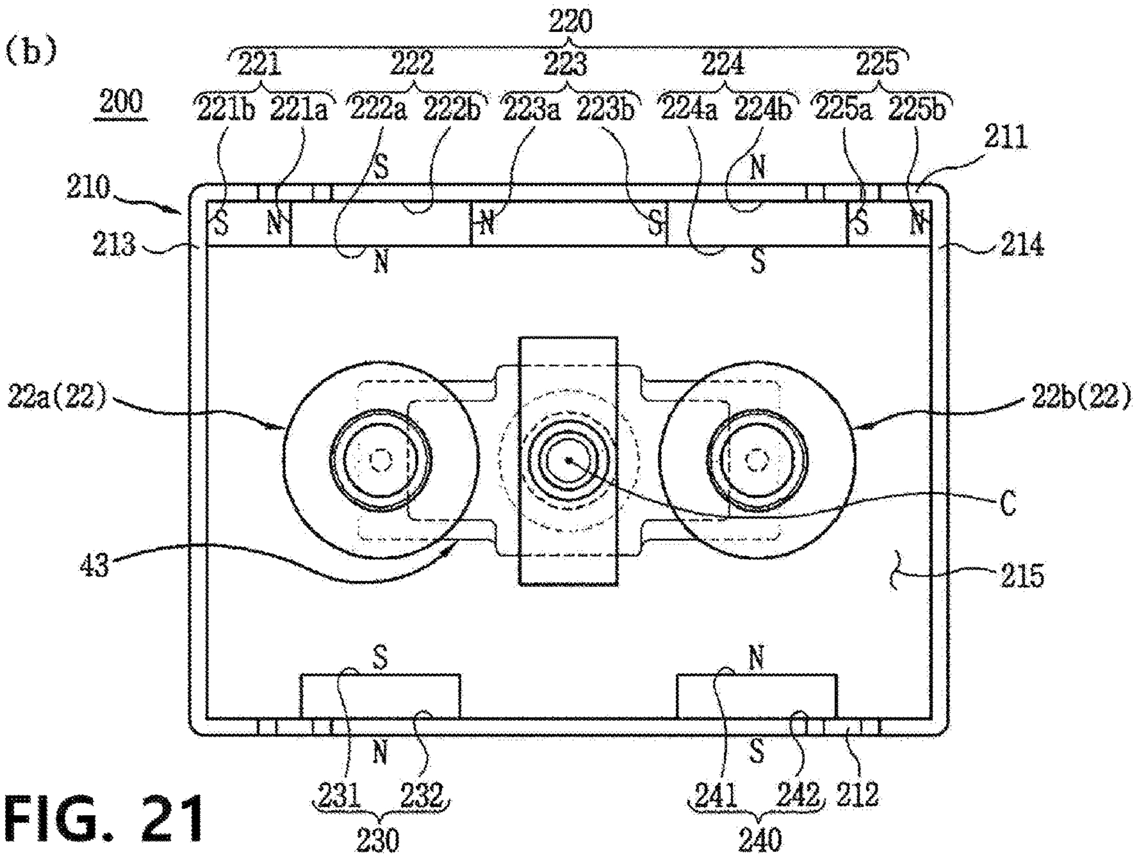

Referring to FIGS. 20 and 21, the arc path generation unit 200 according to the illustrated exemplary embodiment includes a magnetic frame 210, a Halbach array 220, a first magnet part 230 and a second magnet part 240.

The magnetic frame 210 according to the present exemplary embodiment has the same structure and function as the magnetic frame 210 according to the above-described exemplary embodiment. However, there is a difference in the arrangement method of the Halbach array 220 and the first and second magnet parts 230, 240 disposed on the magnetic frame 210 according to the present exemplary embodiment.

Accordingly, the description of the magnetic frame 210 will be replaced with the description of the magnetic frame 210 according to the above-described exemplary embodiment.

In the illustrated exemplary embodiment, a plurality of magnetic materials constituting the Halbach array 220 are sequentially arranged side by side from left to right. That is, in the illustrated exemplary embodiment, the Halbach array 220 is formed to extend in the left-right direction.

The Halbach array 220 may form a magnetic field together with other magnetic materials. In the illustrated exemplary embodiment, the Halbach array 220 may form a magnetic field together with the first and second magnet parts 230, 240.

The Halbach array 220 may be positioned adjacent to any one surface of the first and second surfaces 211, 212. In an exemplary embodiment, the Halbach array 220 may be coupled to the inner side of the any one surface (i.e., a direction toward the space part 215).

In the exemplary embodiment illustrated in FIG. 20, the Halbach array 220 is disposed on the inner side of the second surface 212, adjacent to the second surface 212, so as to face the first and second magnet parts 230, 240 which are positioned on the inner side of the first surface 211.

In the exemplary embodiment illustrated in FIG. 21, the Halbach array 220 is disposed on the inner side of the first surface 211, adjacent to the first surface 211, so as to face the first and second magnet parts 230, 240 which are positioned on the inner side of the second surface 212.

Between the Halbach array 220 and the first and second magnet parts 230, 240, the space part 215 and the fixed contact 22 and the movable contact 43 accommodated in the space part 215 are positioned.

The Halbach array 220 may enhance the strength of the magnetic field formed by itself and the magnetic field formed with the first and second magnet parts 230, 240. Since the direction of the magnetic field formed by the Halbach array 220 and the process of strengthening the magnetic field are well-known techniques, the detailed description thereof will be omitted.

In the illustrated exemplary embodiment, the Halbach array 220 includes a first block 221, a second block 222, a third block 223, a fourth block 224 and a fifth block 225. It will be understood that a plurality of magnetic materials constituting the Halbach array 220 are each named blocks 221, 222, 223, 224, 225, respectively.

The first to fifth blocks 221, 222, 223, 224, 225 may be formed of a magnetic material. In an exemplary embodiment, the first to fifth blocks 221, 222, 223, 224, 225 may be provided as permanent magnets or electromagnets.

The first to fifth blocks 221, 222, 223, 224, 225 may be arranged side by side in one direction. In the illustrated exemplary embodiment, the first to fifth blocks 221, 222, 223, 224, 225 are arranged side by side in the extending direction of the first surface 211, that is, in the left-right direction.

The first block 221 is positioned on the leftmost side. That is, the first block 221 is positioned adjacent to the third surface 213. In addition, the fifth block 225 is positioned on the rightmost side. That is, the third block 223 is positioned adjacent to the fourth surface 214.

The second to fourth blocks 222, 223, 224 are sequentially arranged in a direction from left to right between the first block 221 and the fifth block 225.

In an exemplary embodiment, each of the blocks 221, 222, 223, 224, 225 adjacent to each other may contact each other.

The second block 222 may be disposed to overlap the first fixed contact **22*a* and the first magnet part 230 in a direction toward the first and second magnet parts 230, 240 or the space part 215**, which is the front-rear direction in the illustrated exemplary embodiment.

The fourth block 224 may be disposed to overlap the second fixed contact **22*b* and the second magnet part 240 in a direction toward the first and second magnet parts 230, 240 or the space part 215**, which is the front-rear direction in the illustrated exemplary embodiment.

Each of the blocks 221, 222, 223, 224, 225 includes a plurality of surfaces.

Specifically, the first block 221 includes a first inner surface **221*a* facing the second block 222 and a first outer surface 221*b* opposite to the second block 222**.

The second block 222 includes a second inner surface **222*a* facing the space part 215 or the first and second magnet parts 230, 240 or a second outer surface 222*b* opposite to the space part 215 or the first and second magnet parts 230, 240**.

The third block 223 includes a third inner surface **223*a* facing the second block 222 and a third outer surface 223*b* facing the fourth block 224**.

The fourth block 224 includes a fourth inner surface **224*a* facing the space part 215 or the first and second magnet parts 230, 240 and a fourth outer surface 224*b* opposite to the space part 215 or the first and second magnet parts 230, 240**.

The fifth block 225 includes a fifth inner surface **225*a* facing the fourth block 224 and a fifth outer surface 225*b* opposite to the fourth block 224**.

The plurality of surfaces of each of the blocks 221, 222, 223, 224, 225 may be magnetized according to a predetermined rule to constitute a Halbach array.

Specifically, the first to third inner surfaces **221*a*, 222*a*, 223*a* and the fourth and fifth outer surfaces 224*b*, 225*b* may be magnetized with the same polarity. In addition, the first to third outer surfaces 221*b*, 222*b*, 223*b* and the fourth and fifth inner surfaces 224*a*, 225*a*** may be magnetized with a polarity different from the polarity.

In this case, the first to third inner surfaces **221*a*, 222*a*, 223*a* and the fourth and fifth outer surfaces 224*b*, 225*b* may be magnetized with the same polarity as the first opposing surface 231 of the first magnet part 230**.

Similarly, the first to third outer surfaces **221*b*, 222*b*, 223*b* and the fourth and fifth inner surfaces 224*a*, 225*a* may be magnetized with the same polarity as the second opposing surface 241 of the second magnet part 240**.

The first and second magnet parts 230, 240 form a magnetic field by themselves or with the Halbach array 220. The arc path (A.P) may be formed inside the arc chamber 21 by the magnetic field formed by the first and second magnet parts 230, 240.

The first and second magnet parts 230, 240 may be provided in any shape capable of forming a magnetic field by being magnetized. In an exemplary embodiment, the first and second magnet parts 230, 240 may be provided as permanent magnets or electromagnets.

The first and second magnet parts 230, 240 may be positioned adjacent to the other one surface of the first and second surfaces 211, 212. In an exemplary embodiment, the first and second magnet parts 230, 240 may be coupled to the inside of the other one surface (i.e., a direction toward the space part 215).

In the exemplary embodiment illustrated in FIG. 20, the first and second magnet parts 230, 240 are positioned on the first surface 211, so as to face the Halbach array 220 which is positioned adjacent to the second surface 212.

In the exemplary embodiment illustrated in FIG. 21, the first and second magnet parts 230, 240 are positioned on the second surface 212, so as to face the Halbach array 220 which is positioned adjacent to the first surface 211.

The first and second magnet parts 230, 240 are arranged side by side in the extending direction thereof. In the illustrated exemplary embodiment, the first and second magnet parts 230, 240 extend in the left-right direction (i.e., a direction in which the first surface 211 or the second surface 212 extends), respectively. In addition, the first and second magnet parts 230, 240 are disposed side by side to be adjacent to each other in the left-right direction.

In an exemplary embodiment, the first and second magnet parts 230, 240 may be in contact with each other.

The first and second magnet parts 230, 240 may be positioned to be biased toward different surfaces of the third and fourth surfaces 213, 214, respectively.

In the illustrated exemplary embodiment, the first magnet part 230 is positioned to be biased toward the third surface 213. The first magnet part 230 may be disposed to overlap the first fixed contact **22*a* and the second block 222 of the Halbach array 220 in a direction toward the space part 215 or the Halbach array 220**, which is the front-rear direction in the illustrated exemplary embodiment.

In the illustrated exemplary embodiment, the second magnet part 240 is positioned to be biased toward the fourth surface 214. The second magnet part 240 may be disposed to overlap the second fixed contact **22*b* and the fourth block 224 of the Halbach array 220 in a direction toward the space part 215 or the Halbach array 220**, which is the front-rear direction in the illustrated exemplary embodiment.

The first and second magnet parts 230, 240 are disposed to face the Halbach array 220 with the space part 215 interposed therebetween.

The first and second magnet parts 230, 240 may enhance the strength of the magnetic field formed by themselves and the strength of the magnetic field formed with the Halbach array 220. Since the direction of the magnetic field formed by the first and second magnet parts 230, 240 and the process of strengthening the magnetic field are well-known techniques, the detailed description thereof will be omitted.

The first and second magnet parts 230, 240 respectively include a plurality of surfaces.

Specifically, the first magnet part 230 includes a first opposing surface 231 facing the space part 215 or Halbach array 220 and a first opposite surface 232 opposite to the space part 215 or Halbach array 220.

In addition, the second magnet part 240 includes a second opposing surface 241 facing the space part 215 or Halbach array 220 and a second opposite surface 242 opposite to the space part 215 or Halbach array 220.

Each surface of the first and second magnet parts 230, 240 may be magnetized according to a predetermined rule.

Specifically, the first opposing surface 231 may be magnetized with the same polarity as the second opposite surface 242. In addition, the first opposing surface 231 may be magnetized with a polarity opposite to that of the first to third inner surfaces **221*a*, 222*a*, 223*a* of the Halbach array 220. Furthermore, the first opposing surface 231 may be magnetized with the same polarity as the fourth and fifth outer surfaces 224***b*, 225*b* of the Halbach array 220.

The second opposing surface 241 may be magnetized with the same polarity as the first opposite surface 232. In addition, the second opposing surface 241 may be magnetized with a polarity opposite to that of the fourth and fifth inner surfaces 224*a*, 225*a* of the Halbach array 220. Furthermore, the second opposing surface 241 may be magnetized with the same polarity as the first to third outer surfaces 221*b*, 222*b*, 223*b* of the Halbach array 220.

Hereinafter, the arc path (A.P) formed by the arc path generation unit 200 according to the present exemplary embodiment will be described in detail with reference to FIGS. 22 and 23.

Figure 22:
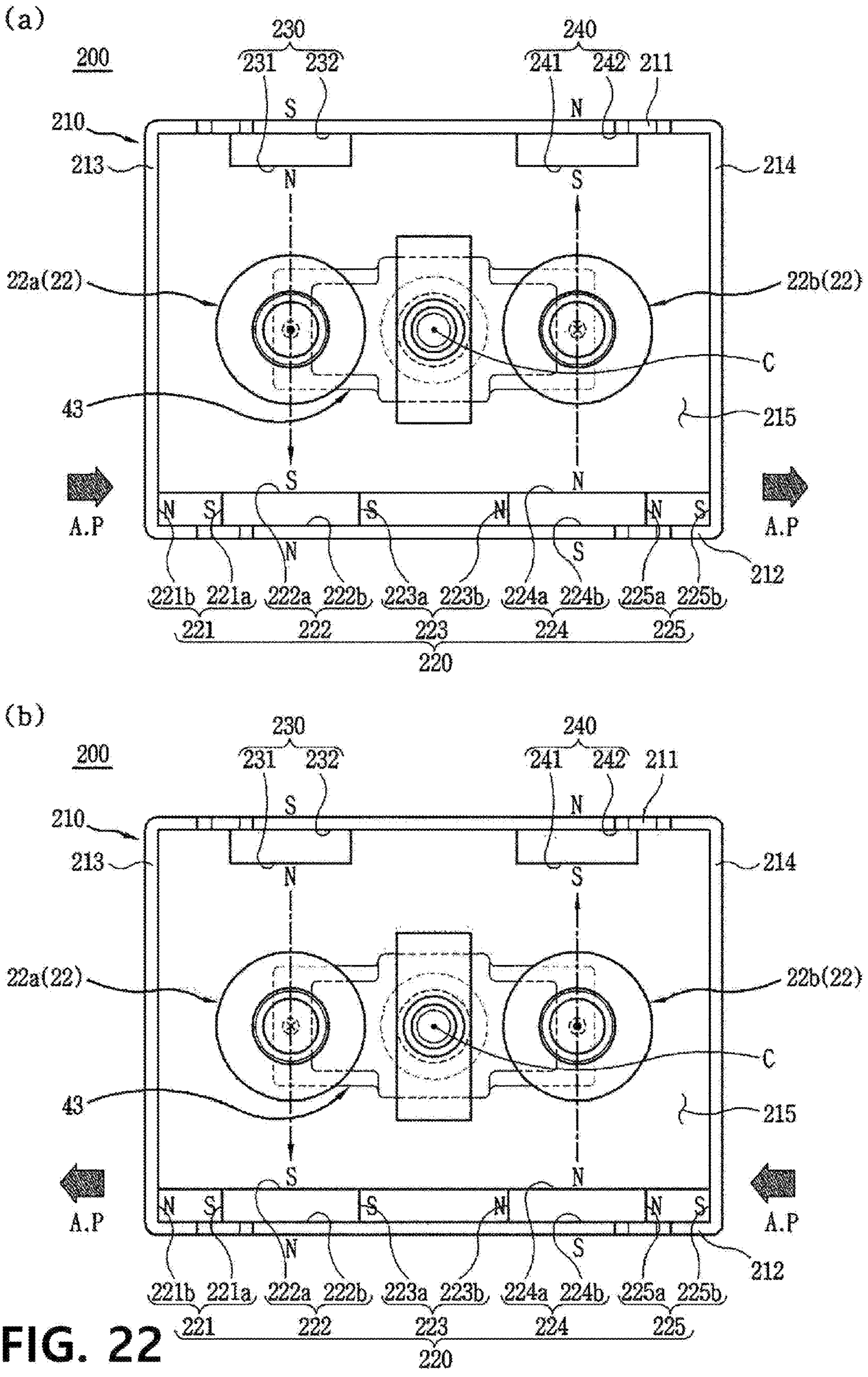
FIGS. 22 and 23 are conceptual views illustrating the paths of a magnetic field and an arc formed by the arc path generation unit according to the exemplary embodiment of FIGS. 21 and 22.
Figure 23:
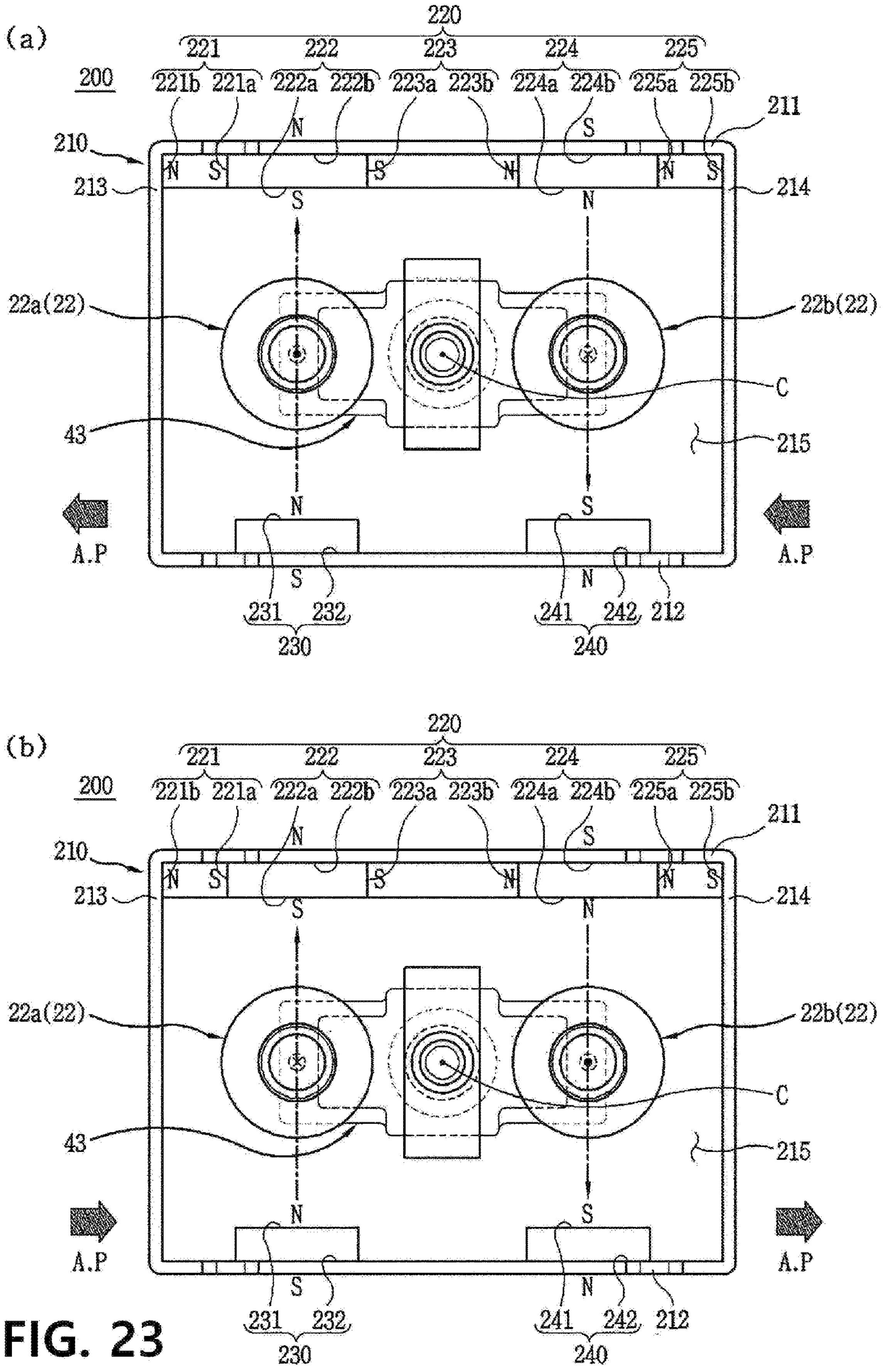

Referring to FIGS. 22 and 23, the first to third inner surfaces 221*a*, 222*a*, 223*a* of the Halbach array 220 are magnetized to the S pole. In addition, the fourth and fifth inner surfaces 224*a*, 225*a* of the Halbach array 220 are magnetized to the N pole.

According to the above rule, the first opposing surface 231 of the first magnet part 230 is magnetized to the N pole, and the second opposing surface 241 of the second magnet part 240 is magnetized to the S pole.

Accordingly, between the second block 222 of the Halbach array 220 and the first magnet part 230, a magnetic field in a direction from the first opposing surface 231 toward the second inner surface 222*a* is formed.

In addition, between the fourth block 224 of the Halbach array 220 and the second magnet part 240, a magnetic field in a direction from the fourth inner surface 224*a* toward the second opposing surface 241 is formed.

In the exemplary embodiment illustrated in (a) of FIG. 22, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the right side.

Accordingly, the arc path (A.P) in the vicinity of the first fixed contact 22*a* is also formed toward the right side.

Similarly, when Fleming's Left-Hand Rule is applied to the second fixed contact 22*b*, the electromagnetic force generated in the vicinity of the second fixed contact 22*b* is formed toward the right side.

Accordingly, the arc path (A.P) in the vicinity of the second fixed contact 22*b* is also formed toward the right side.

In the exemplary embodiment illustrated in (b) of FIG. 22, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the left side.

Accordingly, the arc path (A.P) in the vicinity of the first fixed contact 22*a* is also formed toward the left side.

Similarly, when Fleming's Left-Hand Rule is applied to the second fixed contact 22*b*, the electromagnetic force generated in the vicinity of the second fixed contact 22*b* is formed toward the left side.

Accordingly, the path (A.P) of the arc in the vicinity of the second fixed contact 22*b* is also formed toward the left side.

In the exemplary embodiment illustrated in (a) of FIG. 23, the direction of the current is a direction from the second fixed contact 22*b* through the movable contact 43 out to the first fixed contact 22*a*.

When Fleming's Left-Hand Rule is applied to the first fixed contact 22*a*, the electromagnetic force generated in the vicinity of the first fixed contact 22*a* is formed toward the left side.

Accordingly, the arc path (A.P) in the vicinity of the first fixed contact 22*a* is also formed toward the left side.

Similarly, when Fleming's Left-Hand Rule is applied to the second fixed contact 22*b*, the electromagnetic force generated in the vicinity of the second fixed contact 22*b* is formed toward the left side.

Accordingly, the path (A.P) of the arc in the vicinity of the second fixed contact 22*b* is also formed toward the left side.

In the exemplary embodiment illustrated in (b) of FIG. 23, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the right side.

Accordingly, the arc path (A.P) in the vicinity of the first fixed contact 22*a* is also formed toward the right side.

Similarly, when Fleming's Left-Hand Rule is applied to the second fixed contact 22*b*, the electromagnetic force generated in the vicinity of the second fixed contact 22*b* is formed toward the right side.

Accordingly, the path (A.P) of the arc in the vicinity of the second fixed contact 22*b* is also formed toward the left side.

Although not illustrated, when the polarity of each surface of the Halbach array 220 and the first and second magnet parts 230, 240 is changed, the directions of the magnetic fields formed by the Halbach array 220 and the first and second magnet parts 230, 240 become reversed. Accordingly, the path (A.P) of the generated electromagnetic force and arc is also formed to be reversed in the front-rear direction.

That is, in the energized situation as shown in (a) of FIG. 22, the path (A.P) of the electromagnetic force and arc in the vicinity of the first fixed contact 22*a* is formed toward the left side. In addition, the path (A.P) of the electromagnetic force and arc in the vicinity of the second fixed contact 22*b* is formed toward the left side.

Similarly, in the energized situation as shown in (b) of FIG. 22, the path (A.P) of the electromagnetic force and arc in the vicinity of the first fixed contact 22*a* is formed toward the right side. In addition, the path (A.P) of the electromagnetic force and arc in the vicinity of the second fixed contact 22*b* is formed toward the right side.

Further, in the energized situation as shown in (a) of FIG. 23, the path (A.P) of the electromagnetic force and arc in the vicinity of the first fixed contact 22*a* is formed toward the right side. In addition, the path (A.P) of the electromagnetic force and arc in the vicinity of the second fixed contact 22*b* is formed toward the right side.

Similarly, in the energized situation as shown in (b) of FIG. 23, the path (A.P) of the electromagnetic force and arc in the vicinity of the first fixed contact 22*a* is formed toward the left side. In addition, the path (A.P) of the electromagnetic force and arc in the vicinity of the second fixed contact 22*b* is formed toward the left side.

As a result, the paths (A.P) of arcs formed in the vicinity of each of the fixed contacts 22*a*, 22*b* do not meet each other.

Therefore, regardless of the polarity of the Halbach array 220 and the first and second magnet parts 230, 240 or the direction of the current flowing through the DC relay 2, the arc path generation unit 200 according to the present exemplary embodiment may form the path (A.P) of the electromagnetic force and arc in a direction away from the center (C).

Accordingly, damage to each component of the DC relay 2 disposed adjacent to the center (C) may be prevented. Furthermore, the generated arc may be quickly discharged to the outside such that the operation reliability of the DC relay 2 can be improved.

(3) Description of the Arc Path Generation Unit 300 According to Another Exemplary Embodiment of the Present Disclosure Hereinafter, the arc path generation unit 300 according to another exemplary embodiment of the present disclosure will be described in detail with reference to FIG. 24.

Figure 24:
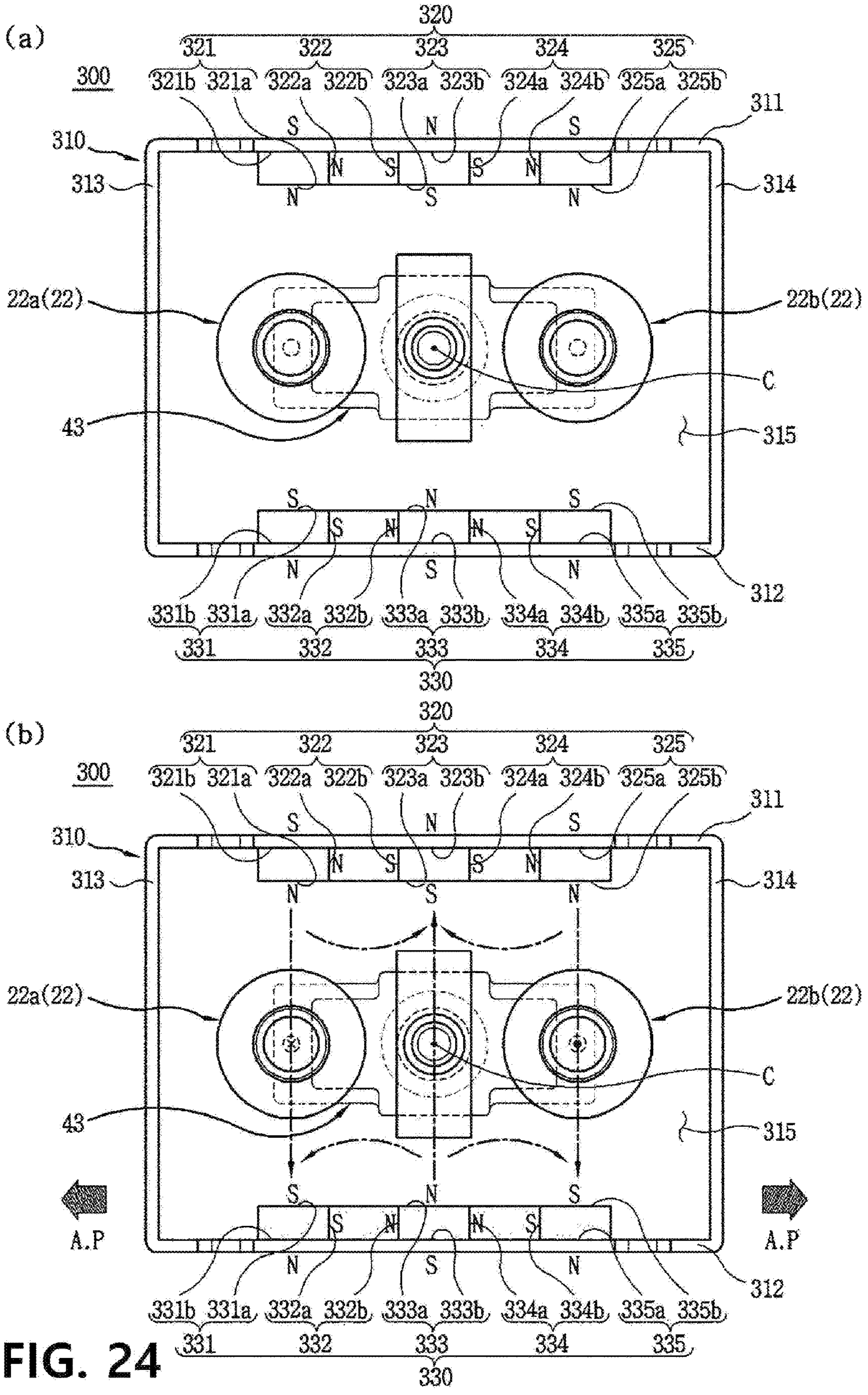
FIG. 24 is a conceptual view illustrating the arc path generation unit and the paths of a magnetic field and an arc formed by the arc path generation unit according to another exemplary embodiment of the present disclosure.

Referring to (a) of FIG. 24, the arc path generation unit 300 according to the illustrated exemplary embodiment includes a magnetic frame 310, a first Halbach array 320 and a second Halbach array 330.

The magnetic frame 310 according to the present exemplary embodiment has the same structure and function as the magnetic frame 310 according to the above-described exemplary embodiment. However, there is a difference in the arrangement method of the first and second Halbach arrays 320 and 330 disposed on the magnetic frame 310 according to the present exemplary embodiment.

Accordingly, the description of the magnetic frame 310 will be replaced with the description of the magnetic frame 310 according to the above-described exemplary embodiment.

In the illustrated exemplary embodiment, a plurality of magnetic materials constituting the first Halbach array 320 are sequentially arranged side by side from left to right. That is, in the illustrated exemplary embodiment, the first Halbach array 320 is formed to extend in the left-right direction.

The first Halbach array 320 may form a magnetic field together with other magnetic materials. In the illustrated exemplary embodiment, the first Halbach array 320 may form a magnetic field together with the second Halbach array 330.

The first Halbach array 320 may be positioned adjacent to any one surface of the first and second surfaces 311, 312. In an exemplary embodiment, the first Halbach array 320 may be coupled to the inner side of the any one surface (i.e., a direction toward the space part 315).

In the illustrated exemplary embodiment, the first Halbach array 320 is disposed on the inner side of the first surface 311, adjacent to the first surface 311, so as to face the second Halbach array 330 which is positioned on the inner side of the second surface 312.

Between the first Halbach array 320 and the second Halbach array 330, the space part 315 and the fixed contact 22 and the movable contact 43 accommodated in the space part 315 are positioned.

The first Halbach array 320 may enhance the strength of the magnetic field formed by itself and the magnetic field formed with the second Halbach array 330. Since the direction of the magnetic field formed by the first Halbach array 320 and the process of strengthening the magnetic field are well-known techniques, the detailed description thereof will be omitted.

In the illustrated exemplary embodiment, the first Halbach array 320 includes a first block 321, a second block 322, a third block 323, a fourth block 324 and a fifth block 325. It will be understood that a plurality of magnetic materials constituting the first Halbach array 320 are each named blocks 321, 322, 323, 324, 325, respectively.

The first to fifth blocks 321, 322, 323, 324, 325 may be formed of a magnetic material. In an exemplary embodiment, the first to fifth blocks 321, 322, 323, 324, 325 may be provided as permanent magnets or electromagnets.

The first to fifth blocks 321, 322, 323, 324, 325 may be arranged side by side in one direction. In the illustrated exemplary embodiment, the first to fifth blocks 321, 322, 323, 324, 325 are arranged side by side in the extending direction of the first surface 311, that is, in the left-right direction.

The first block 321 is positioned on the leftmost side. That is, the first block 321 is positioned adjacent to the third surface 313. In addition, the fifth block 325 is positioned on the rightmost side. That is, the third block 323 is positioned adjacent to the fourth surface 314.

The second to fourth blocks 322, 323, and 324 are sequentially positioned side by side in a direction from left to right between the first block 321 and the fifth block 325.

In an exemplary embodiment, each of the blocks 321, 322, 323, 324, 325 adjacent to each other may contact each other.

The first block 321 may be disposed to overlap the first fixed contact 22*a* and the first block 331 of the second Halbach array 330 in a direction toward the second Halbach array 330 or the space part 315, which is the front-rear direction in the illustrated exemplary embodiment.

The third block 323 may be disposed to overlap the center (C) and the third block 333 of the second Halbach array 330 in a direction toward the second Halbach array 330 or the space part 315, which is the front-rear direction in the illustrated exemplary embodiment.

The fifth block 325 may be disposed to overlap the second fixed contact 22*b* and the fifth block 335 of the second Halbach array 330 in a direction toward the second Halbach array 330 or the space part 315, which is the front-rear direction in the illustrated exemplary embodiment.

Each of the blocks 321, 322, 323, 324, 325 includes a plurality of surfaces.

Specifically, the first block 321 includes a first inner surface 321*a* facing the space part 315 or the second Halbach array 330 and a first outer surface 321*b* opposite to the space part 315 or the second Halbach array 330.

The second block 322 includes a second inner surface 322*a* facing the first block 321 and a second outer surface 322*b* facing the third block 323.

The third block 323 includes a third inner surface 323*a* facing the space part 315 or the second Halbach array 330 and a third outer surface 323*b* opposite to the space part 315 or the second Halbach array 330.

The fourth block 324 includes a fourth inner surface 324*a* facing the third block 323 and a fourth outer surface 324*b* facing the fifth block 325.

The fifth block 325 includes a fifth inner surface 325*a* facing the space part 315 or the second Halbach array 330 and a fifth outer surface 325*b* opposite to the space part 315 or the second Halbach array 330.

Each surface of the first to fifth blocks 321, 322, 323, 324, 325 may be magnetized according to a predetermined rule.

Specifically, the first, second and fifth inner surfaces 321*a*, 322*a*, 325*a* and the third and fourth outer surfaces 323*b*, 324*b* may be magnetized with the same polarity. In addition, the first, second and fifth outer surfaces 321*b*, 322*b*, 325*b* and the third and fourth inner surfaces 323*a*, 324*a* may be magnetized with a polarity different from the polarity.

In this case, the first, second and fifth inner surfaces 321*a*, 322*a*, 325*a* and the third and fourth outer surfaces 323*b*, 324*b* may be magnetized with the same polarity as the third and fourth inner surfaces 333*a*, 334*a* and the first, second and fifth outer surfaces 331*b*, 332*b*, 335*b* of the second Halbach array 330.

Similarly, the first, second and fifth outer surfaces 321*b*, 322*b*, 325*b* and the third and fourth inner surfaces 323*a*, 324*a* may be magnetized with the same polarity of the first, second and fifth inner surfaces 331*a*, 332*a*, 335*a* and the third and fourth outer surfaces 323*b*, 324*b* of the second Halbach array 330.

In the illustrated exemplary embodiment, a plurality of magnetic materials constituting the second Halbach array 330 are sequentially arranged side by side from left to right. That is, in the illustrated exemplary embodiment, the second Halbach array 330 is formed to extend in the left-right direction.

The second Halbach array 330 may form a magnetic field together with other magnetic materials. In the illustrated exemplary embodiment, the second Halbach array 330 may form a magnetic field together with the first Halbach array 320.

The second Halbach array 330 may be positioned adjacent to the other one surface of the first and second surfaces 311, 312. In an exemplary embodiment, the second Halbach array 330 may be coupled to the inner side of the other one surface (i.e., a direction toward the space part 315).

In the illustrated exemplary embodiment, the second Halbach array 330 is disposed on the inner side of the second surface 312, adjacent to the second surface 312, so as to face the first Halbach array 320 which is positioned on the inner side of the first surface 311.

Between the second Halbach array 330 and the first Halbach array 320, the space part 315 and the fixed contact 22 and the movable contact 43 accommodated in the space part 315 are positioned.

The second Halbach array 330 may enhance the strength of the magnetic field formed by itself and the magnetic field formed with the first Halbach array 320. Since the direction of the magnetic field formed by the second Halbach array 330 and the process of strengthening the magnetic field are well-known techniques, the detailed description thereof will be omitted.

In the illustrated exemplary embodiment, the second Halbach array 330 includes a first block 331, a second block 332, a third block 333, a fourth block 334 and a fifth block 335. It will be understood that a plurality of magnetic materials constituting the second Halbach array 330 are each named blocks 331, 332, 333, 334, 335, respectively.

The first to fifth blocks 331, 332, 333, 334, 335 may be formed of a magnetic material. In an exemplary embodiment, the first to fifth blocks 331, 332, 333, 334, 335 may be provided as permanent magnets or electromagnets.

The first to fifth blocks 331, 332, 333, 334, 335 may be arranged side by side in one direction. In the illustrated exemplary embodiment, the first to fifth blocks 331, 332, 333, 334, 335 are arranged side by side in the extending direction of the first surface 311, that is, in the left-right direction.

The first block 331 is positioned on the leftmost side. That is, the first block 331 is positioned adjacent to the third surface 313. In addition, the fifth block 335 is positioned on the rightmost side. That is, the third block 333 is positioned adjacent to the fourth surface 314.

The second to fourth blocks 332, 333, 334 are sequentially positioned side by side in a direction from left to right between the first block 331 and the fifth block 335.

In an exemplary embodiment, each of the blocks 331, 332, 333, 334, 335 adjacent to each other may contact each other.

The first block 331 may be disposed to overlap the first fixed contact 22*a* and the first block 321 of the first Halbach array 320 in a direction toward the first Halbach array 320 or the space part 315, which is the front-rear direction in the illustrated exemplary embodiment.

The third block 333 may be disposed to overlap the center (C) and the third block 323 of the first Halbach array 320 in a direction toward the first Halbach array 320 or the space part 315, which is the front-rear direction in the illustrated exemplary embodiment.

The fifth block 335 may be disposed to overlap the second fixed contact 22*b* and the fifth block 325 of the first Halbach array 320 in a direction toward the first Halbach array 320 or the space part 315, which is the front-rear direction in the illustrated exemplary embodiment.

Each of the blocks 331, 332, 333, 334, 335 includes a plurality of surfaces.

Specifically, the first block 331 includes a first inner surface 331*a* facing the space part 315 or the first Halbach array 320 and a first outer surface 331*b* opposite to the space part 315 or the first Halbach array 320.

The second block 332 includes a second inner surface 332*a* facing the first block 331 and a second outer surface 332*b* facing the third block 333.

The third block 333 includes a third inner surface 333*a* facing the space part 315 or the first Halbach array 320 and a third outer surface 333*b* opposite to the space part 315 or the first Halbach array 320.

The fourth block 334 includes a fourth inner surface 334*a* facing the third block 333 and a fourth outer surface 334*b* facing the fifth block 335.

The fifth block 335 includes a fifth inner surface 335*a* facing the space part 315 or the first Halbach array 320 and a fifth outer surface 335*b* opposite to the space part 315 or the first Halbach array 320.

Each surface of the first to fifth blocks 331, 332, 333, 334, 335 may be magnetized according to a predetermined rule.

Specifically, the first, second and fifth inner surfaces 331*a*, 332*a*, 335*a* and the third and fourth outer surfaces 333*b*, 334*b* may be magnetized with the same polarity. In addition, the first, second and fifth outer surfaces 331*b*, 332*b*, 335*b* and the third and fourth inner surfaces 333*a*, 334*a* may be magnetized with a polarity different from the polarity.

In this case, the first, second and fifth inner surfaces 331*a*, 332*a*, 335*a* and the third and fourth outer surfaces 333*b*, 334*b* may be magnetized with the same polarity as the third and fourth inner surfaces 323*a*, 324*a* and the first, second and fifth outer surfaces 321*b*, 323*b* and 325*b* of the first Halbach array 320.

Similarly, the first, second and fifth outer surfaces 331*b*, 332*b*, 335*b* and the third and fourth inner surfaces 333*a*, 334*a* may be magnetized with the same polarity as the first, second and fifth inner surfaces 321*a*, 323*a*, 325*a* and the third and fourth outer surfaces 323*b*, 324*b* of the first Halbach array 320.

Hereinafter, the arc path (A.P) formed by the arc path generation unit 300 according to the present exemplary embodiment will be described in detail with reference to (b) of FIG. 24.

Referring to (b) of FIG. 24, the first and fifth inner surfaces 321*a*, 325*a* of the first Halbach array 320 are magnetized to the N pole, and the third inner surface 323*a* is magnetized to the S pole.

According to the above rule, the first and fifth inner surfaces 331*a*, 335*a* of the second Halbach array 330 are magnetized to the S pole, and the third inner surface 333*a* is magnetized to the N pole.

Accordingly, between the first block 321 of the first Halbach array 320 and the first block 331 of the second Halbach array 330, a magnetic field in a direction from the first inner surface 321*a* toward the first inner surface 331*a* is formed.

In addition, between the third block 323 of the first Halbach array 320 and the third block 333 of the second Halbach array 330, a magnetic field in a direction from the third inner surface 333*a* toward the third inner surface 323*a* is formed.

Furthermore, between the fifth block 325 of the first Halbach array 320 and the fifth block 335 of the second Halbach array 330, a magnetic field in a direction from the fifth inner surface 325*a* toward the fifth inner surface 335*a* is formed.

Further, in the first Halbach array 320, a magnetic field in a direction from the first and fifth inner surfaces 321*a*, 325*a* toward the third inner surface 323*a* is formed. Similarly, in the second Halbach array 330, a magnetic field in a direction from the third inner surface 333*a* toward the first and fifth inner surfaces 331*a*, 335*a* is formed.

In the exemplary embodiment illustrated in (b) of FIG. 24, the direction of the current is a direction from the first fixed contact 22*a* through the movable contact 43 out to the second fixed contact 22*b*.

When Fleming's Left-Hand Rule is applied to the first fixed contact 22*a*, the electromagnetic force generated in the vicinity of the first fixed contact 22*a* is formed toward the left side.

Accordingly, the arc path (A.P) in the vicinity of the first fixed contact 22*a* is also formed toward the left side.

Similarly, when Fleming's Left-Hand Rule is applied to the second fixed contact 22*b*, the electromagnetic force generated in the vicinity of the second fixed contact 22*b* is formed toward the right side.

Accordingly, the arc path (A.P) in the vicinity of the second fixed contact 22*b* is also formed toward the right side.

Therefore, in the arc path generation unit 300 according to the present exemplary embodiment, the arc paths (A.P) in the vicinity of each of the fixed contacts 22*a*, 22*b* are formed in opposite directions. Accordingly, the generated arcs do not meet each other such that the arc may be extinguished and discharged effectively.

Accordingly, in the arc path generation unit 300 according to the present exemplary embodiment, the generated arc may proceed in different directions without meeting each other inside the arc chamber 21. Simultaneously, the generated arc may be moved in a direction away from the center (C) where the various components are positioned.

Accordingly, damage to each component of the DC relay 3 disposed adjacent to the center (C) may be prevented. Furthermore, the generated arc may be quickly discharged to the outside such that the operation reliability of the DC relay 3 can be improved.

In particular, the arc path generation unit 300 according to the present exemplary embodiment may be more effectively applied to a one-direction relay.

Although the present disclosure has been described above with reference to the preferred exemplary embodiments of the present disclosure, it will be understood that those of ordinary skill in the art can variously modify and change the present disclosure within the scope without departing from the spirit and scope of the present disclosure described in the claims below.

The invention claimed is:

1. An arc path generation unit, comprising:

a magnetic frame having a space part in which a plurality of fixed contacts and a movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises a plurality of blocks which are arranged side by side in the one direction and formed of a magnetic material, and is provided in plurality, and a plurality of Halbach arrays are positioned adjacent to any one or more surfaces of the first surface and the second surface, and wherein the magnet part extends in the other direction and is provided in plurality, and a plurality of magnet parts are disposed adjacent to any one or more surfaces of the third surface and the fourth surface.

2. The arc path generation unit of claim 1, wherein each surface on which the plurality of Halbach arrays face each other is magnetized with the same polarity, and wherein each surface on which the plurality of magnet parts face each other is magnetized with a polarity different from the polarity.

3. The arc path generation unit of claim 1, wherein the Halbach array comprises:

a first Halbach array which is positioned adjacent to any one surface of the first surface and the second surface; and a second Halbach array which is positioned adjacent to the other one surface of the first surface and the second surface, and wherein the magnet part comprises:

a first magnet part which is positioned adjacent to any one surface of the third surface and the fourth surface; and a second magnet part which is positioned adjacent to the other one surface of the third surface and the fourth surface.

4. The arc path generation unit of claim 3, wherein the first Halbach array and the second Halbach array respectively comprise:

a first block which is positioned to be biased toward the any one surface of the third surface and the fourth surface;

a third block which is positioned to be biased toward the other one surface of the third surface and the fourth surface; and a second block which is positioned between the first block and the third block.

5. The arc path generation unit of claim 4, wherein each surface on which the second block of the first Halbach array and the second block of the second Halbach array face each other is magnetized with the same polarity, and wherein each surface on which the first magnet part and the second magnet part face each other is magnetized with a polarity different from the polarity.

6. The arc path generation unit of claim 3, wherein the Halbach array comprises:

a first block which is positioned to be biased toward any one surface of the third surface and the fourth surface;

a fifth block which is positioned to be biased toward the other one surface of the third surface and the fourth surface;

a third block which is positioned between the first block and the fifth block;

a second block which is positioned between the first block and the third block; and a fourth block which is positioned between the third block and the fifth block.

7. The arc path generation unit of claim 6, wherein each surface on which the third block of the first Halbach array and the third block of the second Halbach array face each other is magnetized with the same polarity, and wherein each surface on which the first block of the first Halbach array and the first block of the second Halbach array face each other, each surface on which the fifth block of the first Halbach array and the fifth block of the second Halbach array face each other and each surface on which the first magnet part and the second magnet part face each other are magnetized with a polarity different from the polarity.

8. An arc path generation unit, comprising:

a magnetic frame having a space part in which a plurality of fixed contacts and a movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises a plurality of blocks which are arranged side by side in the other direction and formed of a magnetic material, and is provided in plurality, and a plurality of Halbach arrays are positioned adjacent to any one or more surfaces of the third surface and the fourth surface, and wherein the magnet part extends in the one direction and is provided in plurality, and a plurality of magnet parts are disposed adjacent to any one or more surfaces of the first surface and the second surface.

9. The arc path generation unit of claim 8, wherein each surface on which the plurality of Halbach arrays face each other is magnetized with the same polarity, and wherein each surface on which the plurality of magnet parts face each other is magnetized with a polarity different from the polarity.

10. The arc path generation unit of claim 8, wherein the Halbach array comprises:

a first Halbach array which is positioned adjacent to any one surface of the third surface and the fourth surface; and a second Halbach array which is positioned adjacent to the other one surface of the third surface and the fourth surface, and wherein the magnet part comprises:

a first magnet part which is positioned adjacent to any one surface of the first surface and the second surface; and a second magnet part which is positioned adjacent to the other one surface of the first surface and the second surface.

11. The arc path generation unit of claim 10, wherein the first Halbach array and the second Halbach array respectively comprise:

a first block which is positioned to be biased toward the any one surface of the first surface and the second surface;

a third block which is positioned to be biased toward the other one surface of the first surface and the second surface; and a second block which is positioned between the first block and the third block.

12. The arc path generation unit of claim 11, wherein each surface on which the second block of the first Halbach array and the second block of the second Halbach array face each other is magnetized with the same polarity, and wherein each surface on which the first magnet part and the second magnet part face each other is magnetized with a polarity different from the polarity.

13. A direct current relay, comprising:

a plurality of fixed contacts which are positioned to be spaced apart in one direction;

a movable contact which is in contact with or spaced apart from the fixed contact;

a magnetic frame having a space part in which the plurality of fixed contacts and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises a plurality of blocks which are arranged side by side in the one direction and formed of a magnetic material, and is provided in plurality, and a plurality of Halbach arrays are positioned adjacent to any one or more surfaces of the first surface and the second surface, and wherein the magnet part extends in the one direction and is provided in plurality, and a plurality of magnet parts are disposed adjacent to any one or more surfaces of the third surface and the fourth surface.

14. The direct current relay of claim 13, wherein each surface on which the plurality of Halbach arrays face each other is magnetized with the same polarity, and wherein each surface on which the plurality of magnet parts face each other is magnetized with a polarity different from the polarity.

15. A direct current relay, comprising:

a plurality of fixed contacts which are positioned to be spaced apart in one direction;

a movable contact which is in contact with or spaced apart from the fixed contact;

a magnetic frame having a space part in which the plurality of fixed contacts and the movable contact are accommodated; and a Halbach array which is positioned in the space part of the magnetic frame to form a magnetic field in the space part, and a magnet part which is provided separately from the Halbach array, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the Halbach array comprises a plurality of blocks which are arranged side by side in the other direction and formed of a magnetic material, and is provided in plurality, and a plurality of Halbach arrays are positioned adjacent to any one or more surfaces of the third surface and the fourth surface, and wherein the magnet part extends in the one direction and is provided in plurality, and a plurality of magnet parts are disposed adjacent to any one or more surfaces of the first surface and the second surface.

16. The direct current relay of claim 15, wherein each surface on which the plurality of Halbach arrays face each other is magnetized with the same polarity, and wherein each surface on which the plurality of magnet parts face each other is magnetized with a polarity different from the polarity.

17. An arc path generation unit, comprising:

a magnetic frame having a space part in which a fixed contact and a movable contact are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, wherein the fixed contact is provided in plurality, and a plurality of fixed contacts are disposed to be spaced apart from each other in the one direction, and wherein the Halbach array comprises a plurality of blocks which are arranged side by side in the one direction and formed of a magnetic material, are positioned adjacent to any one or more surfaces of the first surface and the second surface, and are disposed to overlap the plurality of fixed contacts along the other direction.

18. The arc path generation unit of claim 17, wherein the Halbach array comprises:

a first Halbach array which is disposed adjacent to any one surface of the first surface and the second surface; and a second Halbach array which is disposed adjacent to the other one surface of the first surface and the second surface to face the first Halbach array with the space part therebetween.

19. The arc path generation unit of claim 18, wherein a surface of the surfaces of the first Halbach array facing the second Halbach array and a surface of the surfaces of the second Halbach array facing the first Halbach array are magnetized with different polarities from each other.

20. The arc path generation unit of claim 18, wherein the first Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and arranged side by side in order in a direction from the first block to the fifth block, and wherein the second Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and arranged side by side in order in a direction from the first block to the fifth block.

21. The arc path generation unit of claim 20, wherein in the first Halbach array, a surface of the surfaces of the first block facing the second block and a surface of the surfaces of the third block facing the second block, and a surface of the surfaces of the second block facing the second Halbach array are magnetized with the same polarity, and a surface of the surfaces of the third block facing the fourth block and a surface of the surfaces of the fifth block facing the fourth block, and a surface of the surfaces of the fourth block facing the second Halbach array are magnetized with a polarity different from the polarity, and wherein in the second Halbach array, a surface of the surfaces of the first block facing the second block and a surface of the surfaces of the third block facing the second block, and a surface of the surfaces of the second block facing the second Halbach array are magnetized with the different polarity, and a surface of the surfaces of the third block facing the fourth block and a surface of the surfaces of the fifth block facing the fourth block, and a surface of the surfaces of the fourth block facing the second Halbach array are magnetized with the polarity.

22. The arc path generation unit of claim 17, further comprising:

a first magnet part which is disposed adjacent to the other one surface of the first surface and the second surface, so as to face the Halbach array with the space part therebetween, and is disposed to be biased toward any one surface of the third surface and the fourth surface; and a second magnet part which is disposed adjacent to the other one surface of the first surface and the second surface, so as to face the Halbach array with the space part therebetween, and is disposed to be biased toward the other one surface of the third surface and the fourth surface.

23. The arc path generation unit of claim 22, wherein a surface of the surfaces of the Halbach array facing the first magnet part and a surface of the surfaces of the first magnet part facing the Halbach array are magnetized with different polarities from each other, wherein a surface of the surfaces of the Halbach array facing the second magnet part and a surface of the surfaces of the second magnet part facing the Halbach array are magnetized with different polarities from each other, and wherein a surface of the surfaces of the Halbach array facing the first magnet part and a surface of the surfaces of the second magnet part facing the Halbach array are magnetized with the same polarity.

24. The arc path generation unit of claim 22, wherein the Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and arranged side by side in order in a direction from the first block to the fifth block, wherein the second block is disposed to face the first magnet part, and wherein the fourth block is disposed to face the second magnet part.

25. The arc path generation unit of claim 24, wherein a surface of the surfaces of the second block facing the first magnet part and a surface of the surfaces of the first magnet part facing the second block are magnetized with different polarities from each other, wherein a surface of the surfaces of the fourth block facing the second magnet part and a surface of the surfaces of the second magnet part facing the fourth block are magnetized with different polarities from each other, and wherein a surface of the surfaces of the second block facing the first magnet part and a surface of the surfaces of the fourth block facing the second magnet part are magnetized with different polarities from each other.

26. The arc path generation unit of claim 17, wherein the Halbach array comprises:

a first Halbach array which is disposed adjacent to any one surface of the first surface and the second surface; and a second Halbach array which is disposed adjacent to the other one surface of the first surface and the second surface, so as to face the first Halbach array with the space part therebetween, wherein the number of blocks forming a magnetic field in the one direction among the plurality of blocks of the first Halbach array is greater than the number of blocks forming a magnetic field in the other direction.

27. The arc path generation unit of claim 26, wherein a surface of the surfaces of the first Halbach array facing the second Halbach array and a surface of the surfaces of the second Halbach array facing the first Halbach array are magnetized with different polarities from each other.

28. The arc path generation unit of claim 26, wherein the first Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and arranged side by side in order in a direction from the first block to the fifth block, and wherein the second Halbach array comprises:

a first block which is positioned to be biased toward any one surface of the third surface and the fourth surface;

a fifth block which is positioned to be biased toward the other one surface of the third surface and the fourth surface; and a second block, a third block and a fourth block which are positioned between the first block and the fifth block and arranged side by side in order in a direction from the first block to the fifth block.

29. The arc path generation unit of claim 28, wherein in the first Halbach array, a surface of the surfaces of the first block facing the second Halbach array, a surface of the surfaces of the second block facing the first block, a surface of the surfaces of the fourth block facing the fifth block and a surface of the surfaces of the fifth block facing the second Halbach array are magnetized with the same polarity, and a surface of the surfaces of the second block facing the third block, a surface of the surfaces of the fourth block facing the third block and a surface of the surfaces of the third block facing the second Halbach array are magnetized with a polarity different from the polarity, and wherein in the second Halbach array, a surface of the surfaces of the first block facing the second Halbach array, a surface of the surfaces of the second block facing the first block, a surface of the surfaces of the fourth block facing the fifth block and a surface of the surfaces of the fifth block facing the second Halbach array are magnetized with the different polarity, and a surface of the surfaces of the second block facing the third block, a surface of the surfaces of the fourth block facing the third block and a surface of the surfaces of the third block facing the second Halbach array are magnetized with the polarity.

30. A direct current relay, comprising:

a plurality of fixed contacts which are positioned to be spaced apart in one direction;

a movable contact which is in contact with or spaced apart from the fixed contact;

a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array comprises a plurality of blocks which are arranged side by side in the one direction and formed of a magnetic material, is positioned adjacent to any one or more surfaces of the first surface and the second surface, and is disposed to overlap the plurality of fixed contacts along the other direction;

a first magnet part which is disposed adjacent to the other one surface of the first surface and the second surface, so as to face the Halbach array with the space part therebetween, and is disposed to be biased toward any one surface of the third surface and the fourth surface; and a second magnet part which is disposed adjacent to the other one surface of the first surface and the second surface, so as to face the Halbach array with the space part therebetween, and is disposed to be biased toward the other one surface of the third surface and the fourth surface, wherein a surface of the surfaces of the Halbach array facing the first magnet part and a surface of the surfaces of the first magnet part facing the Halbach array are magnetized with different polarities from each other, wherein a surface of the surfaces of the Halbach array facing the second magnet part and a surface of the surfaces of the second magnet part facing the Halbach array are magnetized with different polarities from each other, and wherein a surface of the surfaces of the Halbach array facing the first magnet part and a surface of the surfaces of the second magnet part facing the Halbach array are magnetized with the same polarity.

31. A direct current relay, comprising:

a plurality of fixed contacts which are positioned to be spaced apart in one direction;

a movable contact which is in contact with or spaced apart from the fixed contact;

a magnetic frame having a space part in which the fixed contact and the movable contact are accommodated; and a Halbach array which is positioned in the space part of the magnetic frame to form a magnetic field in the space part, wherein the space part has a length in one direction formed to be longer than a length in the other direction, wherein the magnetic frame comprises:

a first surface and a second surface which extend in the one direction and are disposed to face each other to enclose a portion of the space part; and a third surface and a fourth surface which extend in the other direction, are continuous with the first surface and the second surface, respectively, and are disposed to face each other to enclose the remaining portion of the space part, and wherein the Halbach array comprises a plurality of blocks which are arranged side by side in the one direction and formed of a magnetic material, is positioned adjacent to any one or more surfaces of the first surface and the second surface, and is disposed to overlap the plurality of fixed contacts along the other direction;

wherein the Halbach array further comprises:

a first Halbach array which is disposed adjacent to any one surface of the first surface and the second surface; and a second Halbach array which is disposed adjacent to the other one surface of the first surface and the second surface to face the first Halbach array with the space part therebetween, wherein the number of blocks forming a magnetic field in the one direction among the plurality of blocks of the first Halbach array is greater than the number of blocks forming a magnetic field in the other direction, and wherein a surface of the surfaces of the first Halbach array facing the second Halbach array and a surface of the surfaces of the second Halbach array facing the first Halbach array are magnetized with different polarities from each other.

* * * * *